(12) United States Patent
Viken et al.

(10) Patent No.: US 7,004,206 B2
(45) Date of Patent: Feb. 28, 2006

(54) AUTOMATIC FLUID EXCHANGER

(76) Inventors: James P. Viken, 9890 Crestwood Ter., Eden Prairie, MN (US) 55344; Jon A. Lang, 640 Carver Beach Rd., Chanhassen, MN (US) 55317

( * ) Notice: Subject to any disclaimer, the term of this patent is extended or adjusted under 35 U.S.C. 154(b) by 88 days.

(21) Appl. No.: 10/769,145

(22) Filed: Jan. 29, 2004

(65) Prior Publication Data

US 2005/0166993 A1    Aug. 4, 2005

(51) Int. Cl.
*B65B 1/04* (2006.01)
(52) U.S. Cl. .............................. 141/1; 141/65; 141/98; 141/198
(58) Field of Classification Search .................... 141/1, 141/2, 18, 94, 95, 98, 192, 198; 184/1.5, 184/106
See application file for complete search history.

(56) References Cited

U.S. PATENT DOCUMENTS 5,853,068 A * 12/1998 Dixon et al. ................. 184/1.5
6,446,682 B1 * 9/2002 Viken ........................... 141/59
6,830,083 B1 * 12/2004 Hollub et al. ................. 141/65

* cited by examiner

*Primary Examiner*—Timothy L. Maust
(74) *Attorney, Agent, or Firm*—Fulbright & Jaworski L.L.P.

(57) ABSTRACT

A fluid exchanger for servicing the fluid circuits of vehicular power steering systems and other fluid circulating or hydraulic circuits. The fluid exchanger uses a float operated fluid control valve to harness fluid pressure provided by a pump of an accessed hydraulic circuit. The fluid control valve uses both negative and positive pressure of the circuit's pump to control fluid flow patterns. The float and fluid control valve are matched to be either mechanical/hydraulic or electrical/hydraulic in design. If the exchanger is provided with a mechanically operated fluid control valve, a mechanical float is provided in the exchanger's fresh fluid reservoir and is directly connected to the valve slide of the fluid control valve. If the exchanger is provided with an electric solenoid operated fluid control valve, a float operated electrical switch is provided in the exchanger's fresh fluid reservoir and is wired to control the solenoid of the valve.

13 Claims, 27 Drawing Sheets

AUTOMATIC FLUID EXCHANGER

A float operated automatic fluid exchanger for servicing the fluid circuits of vehicular power steering systems and other fluid circulating or hydraulic circuits and the like which have an accessible fluid reservoir which can be removed or adapted to provide vent free access to the negative pressure side of the circuit's pump through a hose or conduit for introducing fresh fluid while simultaneously receiving used fluid discharged by the circuit's pump. The fluid exchanger does not need its own integral on-board fluid pump for exchanging the fluid of these circuits which include vehicular power steering systems. Instead, the fluid exchanger uses a float operated fluid control valve to harness negative pressure provided by the circuit's pump to deliver fresh fluid from the exchanger's fresh fluid reservoir into the circuit and harnesses positive pressure provided by the circuit's pump to deliver used fluid from the circuit into the exchanger's used fluid receiver. The fluid control valve uses both negative and positive pressure of the circuit's pump to control fluid flow patterns while it is exchanging its fresh fluid for the used fluid of the circuit or when automatically establishing or maintaining a closed fluid circulation circuit for the circuit's pump at the completion of the fluid exchange. When the exchanger has an adequate fresh fluid supply and is properly connected to a power steering circuit by use of special adapters, the fluid control valve establishes a fluid flow pattern for exchanging the fresh fluid of the exchanger for the used fluid of the power steering circuit. When the fresh fluid supply of the exchanger becomes depleted, the fluid control valve establishes a closed fluid circulation circuit between the power steering system and the exchanger which allows the outlet port of power steering pump to communicate with its inlet port without the infusion of air or extracted used fluid. The exchanger's automatic providing of a closed fluid circulation circuit upon its fresh fluid depletion allows the service equipment operator sufficient time to reach the ignition switch of the vehicle to turn the engine off without having to worry about air becoming quickly infused and entrained in the power steering system. The float and fluid control valve are matched to be either mechanical/hydraulic or electrical/hydraulic in design. If the exchanger is provided with a mechanically operated fluid control valve, a mechanical float is provided in the exchanger's fresh fluid reservoir and is directly connected to the valve slide of the fluid control valve. If the exchanger is provided with an electric solenoid operated fluid control valve, a float operated electrical switch is provided in the exchanger's fresh fluid reservoir and is wired to control the solenoid of the valve. The positive and negative pressures provided by the power steering pump can also be harnessed and used to assist in the operation of the exchanger's fluid control valve when provided in a mechanical/hydraulic form.

BACKGROUND OF THE INVENTION

With the current popularity of quick lubrication type services and the current emphasis on effective vehicle maintenance by the public, there has been an increasing market for the periodic changing the fluid in vehicular power steering systems as a regular maintenance procedure. A number of power steering fluid exchangers are currently being manufactured, but the need remains for an automatic power steering fluid exchanger which has all of the following desirable characteristics: the exchanger does not require connection to a vehicle's electrical system or other source of electrical power or to a compressed air supply; the fluid exchanger has the power needed for the exchange provided by either the positive and negative pressures of the power steering pump and/or provided by the exchanger's own battery power; the fluid exchanger is compact, lightweight, portable, easy to position, simple to connect, and easy to operate; the fluid exchanger is able to automatically exchange its fresh fluid for the power steering system's used fluid in approximately equivalent volumes and rates of flow; the fluid exchanger automatically and reliably establishes a closed fluid circulation circuit between the inlet port and the outlet port of the power steering pump at the completion of the fluid exchange and maintains it until the service equipment operator turns off the vehicle's engine.

Fluid exchange units for power steering currently available to vehicular service centers typically consist of two categories of units, the small and portable inexpensive units and the larger much more expensive units. The units in the first category are at the lower end of the expense continuum and are small, compact toolbox sized units which can be placed on the fender or engine of the vehicle for service use. These small, compact units typically consist of two electric pumps connected to the vehicle's battery and which are simultaneously operated to extract used fluid from the reservoir of the power steering system while also injecting fresh fluid into that reservoir to replace it. This simultaneous injection of fresh fluid and extraction of used fluid is instituted through the fill cap/dipstick opening of the power steering fluid reservoir after the reservoir cap is removed and with the engine idling to make the power steering unit operative.

This first category of units have been disclosed in the Knorr in U.S. Pat. No. 5,415,247 and by Dixon in U.S. Pat. No. 6,035,902. Both feature two electrically operated pumps, each of which is connected to an associated fluid delivery hose, with one hose-pump combination conducting fresh fluid into the power steering reservoir and the other hose-pump combination extracting used fluid out of the power steering reservoir. During the fluid exchange both conduits are placed inside the reservoir at different levels and both pumps are operated simultaneously. This type of unit is compact and easy to position but because it is manually operated it must be closely monitored to prevent air infusion into the power steering system upon depletion of the fresh fluid supply. A significant drawback of this type of unit is the need to connect the unit to the vehicle's electrical system. Another drawback is its concurrent mixing of fresh fluid with contaminated used fluid in the power steering reservoir right before it is delivered to the low pressure port of the power steering pump. This tends to result in an incomplete fluid exchange typically characterized by a correspondingly lower proportion of fresh fluid exchanged for the used fluid in the circuit, compared to the second category of power steering fluid exchange units which are much more expensive and, if used properly, typically exchange a higher percentage of the used fluid for fresh. Therefore, the units of the first category, best described as "mixing type" units are only minimally effective and of limited suitability for periodic fluid exchange maintenance of power steering systems when compared to larger, more expensive units.

The units of the second category, larger and more expensive, are therefore more desirable than the small mixing type units due to their higher effectiveness in exchanging fluid. However, their higher price is a drawback which can make them less available to vehicular service centers with limited funds for service equipment acquisitions. An additional drawback is that units of this second category tend to be significantly larger, heavier, less portable and therefore less convenient to operate than the smaller, compact and much less expensive units described above to be in the first category. This second category of units includes a power steering fluid exchanger disclosed by Dixon et al in U.S. Pat. Nos. 5,806,629 and 5,583,068. This unit is connected to communicate fluidly with the power steering system's low side positive pressure discharge hose to receive used fluid there from, and is connected to communicate with the power steering pump's negative pressure or suction hose to deliver fresh fluid thereto. In order for the fluid exchange to be instituted this device must be connected to the vehicle's battery so that the unit can be activated by the operator closing an electrical switch to institute the fluid exchange which is a drawback. This unit, as do all the units in this second category of units, requires its own onboard pump to deliver fresh fluid into the power steering system. In this example, the Dixon et al device uses the used fluid flow from the pump of the power steering system to power the onboard fresh fluid pump. The need for a power steering fluid exchanger to have its own onboard pump adds significantly to the cost of the unit.

In the power steering fluid changer depicted in U.S. Pat. Nos. 5,806,629 and 5,583,068, the most important function is to provide a pumping means which controls both the used fluid flow and the fresh fluid flow to be approximately equivalent in rate and volume. In these patents, the power steering fluid changer uses a positive displacement fresh fluid pump which is powered by the discharge pressure of the pump of the power steering system. Harnessing the used fluid flow from a vehicular hydraulic circuit's own pump to power a fluid exchanger's fresh fluid positive displacement pump was a novel concept first disclosed by Viken in U.S. Pat. No. 5,318,080 which related to exchanging the fluid of an automatic transmission. Power steering system fluid exchange units based on this principal are typically expensive not only because of the size of the case required, but their complexity makes the cost of manufacturing an exchanger with a positive displacement fresh fluid pump which harnesses the power of the power steering pump quite substantial. When the unit's fresh fluid supply in the power steering fluid changer depicted in U.S. Pat. Nos. 5,806,629 and 5,583,068, becomes depleted, an electrical float switch opens which then in turn deactivates the electrical solenoid of a three-way hydraulic valve to stop the fluid exchange and to shift the unit back to its original flush mode of operation which is a default closed loop circulation allowing the pump of the power steering system to circulate fluid from its discharge port back to its inlet port. Also disclosed in the Dixon et al U.S. Pat. No. 5,806,629 is a suggestion for an alternative embodiment which requires no electrical power for its operation by replacing the solenoid operated valve with a manually actuated valve that requires close operator attention to manually revert the machine from exchange mode to flush mode when delivery of the new ATF into the transmission is completed. It is also suggested that the manually actuated three-way valve can be spring loaded and manually latched into place by the service technician to remain in its exchange-mode position until a dropping float could then release a triggering device to release the spring loaded three way valve to return under spring power to its default flush mode of operation. Dixon et neither suggested or disclosed the use a three-way valve that is directly and responsively controlled by an attached float as it freely rises or falls in the fresh fluid reservoir in response to the fluid level as is disclosed in the preferred embodiment of this instant invention.

The devices of this second category, the larger more expensive units that actually exchange fluid without just mixing it in the power steering reservoir, are expensive to manufacture because they require costly electric solenoid operated valves which need electrical power. The need remains for a small, compact, lightweight, easily portable power steering fluid exchanger which does not require electrical power, does not require one or more of its own fresh fluid delivery pump(s) to operate, and does not require a costly automatic fluid flow control mechanism to approximately match the fresh and used fluid flow rates and volumes.

Both the first and second categories of devices, the less expensive and the more expensive, typically require connection to the vehicle's battery or electrical system in order to operate. It is desirable for a service center to acquire a power steering fluid exchanger which does not require connection to the vehicle's electrical system for a number of reasons. First, having to make connection to vehicle's battery requires the use of connection wires which can make contact with moving parts in the engine compartment if wrongly positioned or moved during the fluid exchange. Second, many currently manufactured vehicles have sophisticated onboard diagnostic computer systems (OBD systems) which can sense voltage changes, voltage spikes, and anomalies in the vehicle's electric system and which will then record a fault code. If the exchanger's wires are not securely connected to the battery or electrical system of the vehicle a spark may be generated or if a short develops in the exchanger's wiring, either of these occurrences can trigger a warning code in the vehicle's computer which may result in the vehicle's computer directing the vehicle to operate in a special default mode. There have been articles published in the automotive trade literature predicting that vehicles manufactured in the future will be increasingly dependent on even more sophisticated onboard diagnostic computer systems (OBD systems). It is expected that these advanced OBD systems may be increasingly sensitive to unnecessary, non-operational current fluctuations, which may cause false error codes or cause the vehicle to assume a default mode of operation which lowers the gas mileage of the vehicle until the computer system is reset, which typically requires the vehicle to be driven for a period of time. For example, some Chrysler OBD systems are so sensitive that if a single spark plug or spark plug wire fails, the vehicle will be placed in a default operational mode with the automatic transmission operable in second gear only. Third, there have articles published in the automotive trade literature which predict that in the not too distant future automotive manufacturers will likely utilize new, higher voltage systems accompanied by newly designed high output combination alternator/starters and electrically powered air conditioners, brakes and/or suspensions. If these expected voltage increases are implemented service equipment which has been manufactured for 12 volts direct current (DC) will become obsolete and unusable unless it is modified to accept these higher voltages. If it has to be modified or replaced this will be an added and undesirable expense.

Another type of power steering fluid changer which has been available in the past has been the unit depicted by Baylor et al in U.S. Pat. No. 5,015,301. This device is operated with the vehicle's engine off and the power steering pump inoperative. This device consists of a tank with a bladder type "pusher" which holds fresh fluid on the top side and receives compressed air as a powering medium on the lower side. The need for access to shop air can limit the service area used to provide the fluid exchange. Once this device of Baylor et al is connected to the power steering system, compressed air is then provided to the lower side of the diaphragm "pusher" to pressurize the fresh fluid to flow into and through the low pressure inlet hose (or conduit) of the power steering pump to then flow through the rest of the power steering system and then finally out of the low pressure reservoir return hose (or conduit) to the unit's open used fluid receiver.

The Baylor et al patent shows only a remotely arranged reservoir style power steering system in its figures and apparently neglects to illustrate, describe and explain how the unit would be specifically connected to service the more traditional type of power steering system which has a combination reservoir/pump assembly. The Baylor et al patent teaches that this unit is operated only with the engine of the vehicle off and the pump of the power steering system not operating. The unit is normally operated in two separate procedures, the first time to infuse a fresh flushing mixture into the power steering system. The unit is then disconnected temporarily while the vehicle's engine is run for awhile to therefore circulate the fluid flushing mixture through the power steering system to dissolve varnish buildup and contaminants. The engine is then turned off and the unit is reconnected and operated a second time to flush the power steering system, this time only using fresh power steering fluid with perhaps an additive package. This particular unit is somewhat bulky and cumbersome to use, and due to the multiple steps involved, takes an unnecessarily long time to operate. In addition it seems likely that the use of such a flushing procedure without the power steering pump operative would not be as effective in removing all the used fluid as would a fluid exchange procedure accomplished with the power steering pump operative. These drawbacks prevent it from being a preferred option for those service centers who want a unit that is compact, self contained with no need for compressed shop air or connection to a source of electrical power, simple to operate and capable of exchanging a high proportion of used fluid for fresh fluid in a relatively short period of time while the power steering pump is operative.

The Graham U.S. Pat. No. 5,971,021 discloses a method for filling a new and empty power steering system or other hydraulic circuit with fresh fluid by using a specialized valve. Graham also suggests that this method can be used to exchange used fluid for fresh fluid as a maintenance procedure. It is not known if this product is commercially available at this time. This patent appears to teach the connection of a specially designed valve device midstream into the high pressure conduit of a fluid system, such as a power steering system or cooling system for the purpose of filling that fluid system for the first time. This methods teaches pressurizing a fluid and then injecting that pressurized fluid through this specialized valve which has been installed into a two sided conduit. A substantially unidirectional flow pattern through a selected side of the intercepted conduit is established by injecting most of that pressurized fluid through the valve into that selected side of the intercepted conduit while allowing a small portion of that pressurized fresh fluid to be injected into the other side of that conduit by leaking around the slide of the specialized valve. As the pressurized fresh fluid is injected into the power steering system air contained in the system is also simultaneously driven out. This valve and its use are depicted as being particularly applicable to power steering fluid systems and one figure illustrates this valve as being interconnected to such a system between the power steering pump and "gearbox" midstream in the pump's high pressure outlet conduit, with the valve arranged to discharge its pressurized fluid in a substantially unidirectional flow in the direction of the conduit which leads to the gearbox.

After this valve is properly connected to a new but empty power steering system, a pre-pressurized source of fresh fluid is then connected to this valve which in turn causes the valve to operate to inject pressurized fresh power steering fluid in a substantially unidirectional flow to fill the system and to displace air out of the system, with the capability of simultaneously allowing some fluid to also be infused upstream, thus displacing the air from two directions. This pressurized fresh fluid remains pressurized as it flows into and through the steering mechanism.

It is also taught that this valve may be connected to a used power steering system which is filled with used fluid for the purpose of exchanging its used fluid for fresh fluid as a maintenance procedure. Installing this valve as depicted for routine power steering fluid exchanges would be somewhat difficult task in and of itself due to the tendency for the power steering pump's high pressure conduit (or hose) to have connections which are often be corroded and typically somewhat difficult to reach and disconnect.

It appears that no mention is made of whether the vehicle's engine is operative while the procedure is enacted. However, the suggested positioning at which the valve is connected as apparently disclosed in Graham's patent is downstream from the pump's outlet port, and therefore it is assumed that the power steering system must be inoperative while a new fluid fill or a fluid exchange is instituted, since operating the pump with the valve downstream would obstruct the output flow of the pump and perhaps could damage the power steering pump if it's relief valve was malfunctioning or its setting was too high. Unless the valve was purchased by customer and permanently installed, at each fluid exchange service, the valve would have to be installed and used after disconnecting the power steering systems' high pressure hose (conduit). After the fluid exchange was completed the high pressure line would have to be disconnected from the valve and reconnected in its proper configuration to the power steering pump. It appears then that use of this valve and method would be too slow and unduly cumbersome to be practical for use at most vehicle service centers as a regular power steering maintenance procedure.

The Sangret U.S. Pat. No. 5,664,416 discloses a new and improved method for filling a new power steering assembly with fluid for the first time on an auto assembly line. This patent discloses a method for pumping fluid from a bulk holding tank into the power steering system's reservoir to circulate in the power steering system with the engine operative under power of the power steering pump, after which that fluid is then discharged and returned to the bulk holding tank for redundant circulation back into and through the power steering system. When a new power steering system is filled for the first time air typically becomes entrained in the power steering fluid and this method offers a solution for remove that entrained air. The patent discloses that air entrained in a power steering system may cause unwanted noise and/or vibration which may be annoying to the driver who first operates the vehicle after the filling of the power steering system.

This method teaches that redundant circulation of fluid in and out of the bulk holding tank is instituted until the power steering system is completely filled with fluid and the entrained air has been removed. This method teaches the placing of a special connector assembly in the filler opening of a certain very select configuration of remotely arranged power steering reservoir, a reservoir which has its low pressure fluid return port directly placed below and on center of the filler neck of the reservoir. This connector assembly takes the position of the reservoir cap type and has both a fresh fluid delivery conduit and a used fluid receiving or discharge conduit passing through it into the filler opening of this select type of remote power steering system reservoir. This adapter is pushed into the filler neck of the reservoir which inserts its used fluid receiving conduit matingly down and into the used fluid return port of the reservoir which is directly below and on center to the filler neck of the reservoir. This used fluid receiving conduit then receives fluid which is discharged from the power steering pump being returned to the reservoir. The fresh fluid delivery conduit of the connector assembly is shorter than the discharge conduit and does not connect with the supply conduit port of the reservoir which is located off center of the reservoir, but it discharges fresh fluid into the reservoir after being pumped out of a bulk holding tank which is sealed and provided with a vacuum pump for extracting entrained air out of the fluid. The holding tank is shown with its own fresh fluid delivery pump for delivery fresh fluid through the special adapter into the power steering reservoir. The patent does not disclose using the power steering pump's low pressure inlet port side or its positive pressure outlet side for powering the pumping of fluid into and through the power steering system redundantly, even though the engine is running to render the power steering pump operative.

The fluid discharged by the pump is then delivered through the connector assembly and into the bulk holding tank which is actually a large additional fluid reservoir which both provides supply fluid for delivery into the power steering system and receives the fluid discharged from the power steering system. The method does not disclose or teach the exchange of used fluid for fresh fluid and is apparently limited to charging a power steering system for the first time while removing the air that inevitably becomes entrained.

The method of Sangret discloses an arrangement of one electrically operated valve and two electrically operated pumps which are simultaneously activated by an electronic control unit which energizes an inductive coil when the vehicle's engine is started. The valve is a flow control valve which stops fluid flow out of the bulk holding tank when the engine is turned off which inactivates the valve, and allows fluid flow out of the bulk holding tank and into the power steering reservoir when activated by the engine running. One pump is a vacuum pump which is connected to a port near the top of the bulk tank and provides enough low pressure to evacuate any air which has become entrained in the power steering fluid after it returns to the holding tank as the power steering system is filled for the first time. The other pump is a fluid delivery pump, referred to as a flow charge pump, which when activated by the electronic control unit will pump fluid from the bulk holding tank into the power steering reservoir where the low pressure provided by the power steering pump then delivers that fluid into the conduit supplying the power steering pump.

The flow charge pump appears to be necessary for two reasons. First, the patent depicts the fluid supply port at the bottom of the bulk holding tank to be at a level below that of the connector assembly, and the negative pressure provided by the power steering pump is not likely to be great enough to pump the fluid from the bulk holding tank without assistance by an auxiliary pump. Second, the low pressure provided by the vacuum pump will likely conflict with the low pressure provided by the power steering pump which would inhibit the flow of the fresh fluid into the conduit supplying the power steering pump. The special connector assembly which is inserted into the filler neck of the power steering reservoir is shown to have a set of three O'rings for sealing but is not shown to have a positively engaging set of tab locks like many power steering caps. It can be assumed that the connector is held in place only by sidewall friction between the cap, its O'rings and the filler neck of the reservoir and any low pressure provided by the power steering pump through that pump's inlet port. One potential drawback to the use of this method of filling a new power steering system with fresh fluid for the first time is that the flow charge pump must have a delivery output pressure great enough to overcome the low pressure provided by the vacuum pump but not so great as to deliver fluid at a greater flow rate to the reservoir than the power steering pump will accept it. If this occurs pressure can build up inside the reservoir which can disrupt the sealing of the connector into the reservoir filler neck and perhaps can cause leakage of fluid and displacement of the connector up and out of position in the filler neck.

The Brown U.S. Pat. No. 5,291,968 discloses an "Apparatus and Method for Changing Automatic Transmission Fluid in Motor Vehicles" and does not address changing fluid in power steering systems. It discloses the method of removing the pan of a transmission to access the intake port of the suction conduit of the transmission pump to then connect a pressurized fresh fluid supply to that intake port while idling the engine to operate the transmission and while providing a pan underneath the transmission to receive the fluid discharged from the transmission's pump. Because the fresh fluid reservoir of the apparatus is at floor level, and since the low pressure provided by the transmission's pump is inadequate to deliver the fresh fluid from floor level up and into to the port of that suction conduit and into the transmission, the unit requires its own on-board pump to deliver fresh fluid up to the port of the suction conduit of the transmission pump.

In addition, this method apparently requires close monitoring by the operator since the engine must be turned off as soon as the fresh fluid supply of the fluid exchanger is depleted to prevent air from being pumped into the transmission.

The Matta U.S. Pat. No. 4,342,328 depicts a two stage float valve which is connected to a suction tube. The purpose of this float valve is to close off a fuel tank from the suction tube when the fuel tank starts to run dry and fuel is being drawn from another tank. This float valve is configured to be resistant to closing prematurely from the effect of the suction provided by the suction tube. This is accomplished by providing an inner poppet which equalizes the negative pressure of the suction tube to both sides of the valve's primary seal thereby neutralizing the effects of the suction on the valve's primary seal. This allows the use of a smaller float than would otherwise be necessary and prevents the negative pressure provided from the suction tube from adversely affecting the operation of the valve. This patent disclosed the problem of establishing an air tight seal when a fluid supply is diminished and the importance of preventing low pressure or suction from prematurely closing the valve. The float valve disclosed in this patent by Matta is a fluid supply valve only and does not control any exchange of fluids.

The Colvin, et al. U.S. Pat. No. 6,477,886 discloses a test apparatus for measuring the amount of air entrained in the fluid of a power steering system. The apparatus also includes a vacuum pump for drawing air out of the power steering pump. It disclosed that air and other gases entrained in the power steering fluid may result in excessive noise during the operation of the pump and may include whining and hissing, and that these noises may be similar to noises caused by improperly functioning components. It is disclosed that it is useful to be able to use a measurement device to indicate if entrained air is significant enough to be causing such noises or if not that the power steering system is damaged. This lends further credence to the importance of not allowing air to become entrained by a power steering fluid exchanger when exchanging the fluid of a power steering system since it may mask the sounds created by damaged components.

SUMMARY OF THE INVENTION

The invention is a light, very compact, portable, easy to position, easy to connect, and easy to operate, automatic power steering fluid exchanger with a fresh fluid reservoir, a used fluid receiver, and a fluid control valve which directs the operation of the fluid exchanger and is itself operated by a float in the fresh fluid reservoir. The float which operates the mechanical/hydraulic fluid control valve is a mechanical float, while the float controlling the electrical/hydraulic is an electric float switch. In the preferred embodiment negative pressure provided by the power steering pump is used to assist in the operation of the fluid control valve. In one alternative mechanical/hydraulic embodiment positive pressure provided by the power steering pump is used to assist in the operation of the fluid control valve. In another alternative mechanical/hydraulic embodiment both negative pressure and positive pressure provided by the power steering pump are used to assist in the operation of the fluid control valve. The used fluid receiver of the fluid exchanger is emptied of used fluid from the prior fluid exchange. The fluid exchanger's fresh fluid reservoir is filled with an adequate volume of fresh fluid which causes the float in the fresh fluid reservoir to rise to its upward position. The power steering system's fluid circuit is opened to divide and isolate the power steering pump's inlet port or low pressure side from its outlet port or pressure, discharge side. The fluid exchanger is connected to the power steering system using suitable adapters after either removing the power steering reservoir from the power steering system or converting it to be essentially vent free and filled with fluid. The exchanger's fresh fluid exchange hose is connected to arrange its fresh fluid reservoir to supply the power steering pump's inlet port, and the exchanger's used fluid exchange hose is connected to arrange its used fluid receiver to receive used fluid discharged from the power steering pump's outlet port. The vehicle's engine is started which renders the power steering pump operative which causes the fluid exchanger to automatically exchange its fresh fluid for the used fluid of the power steering system. The fresh fluid delivered from the fluid exchanger into the power steering system flows at approximately the same equivalent rate and volume of flow as the power steering system's used fluid is discharged into the exchanger's used fluid receiver. When the fresh fluid supply becomes depleted, the float in the fresh fluid reservoir moves to its downward position which establishes a closed fluid circulation circuit for the power steering pump. This closed fluid circulation circuit is characterized by the establishment of essentially vent free fluid communication between the pump's outlet and inlet ports with no communication between the exchanger's fresh fluid reservoir and the power steering pump's inlet port, and with no communication between the used fluid receiver and the pump's outlet port. If an electrical/hydraulic fluid control valve is used a float switch be alternatively positioned in the used fluid receiver to sense when it is full to inversely control the fluid control valve to establish a closed fluid circulation circuit. This may be done alone or in coordination with an electric float switch also used in the fresh fluid reservoir to sense when the fresh fluid supply is depleted. In the preferred embodiment and the other alternative embodiment herein, a single float is positioned in the fresh fluid reservoir since it was found in experimentation to be more practical than using a single float in the used fluid receiver, especially when the operator forgets to fill the fresh fluid reservoir with fresh fluid and connects the exchanger and then starts the vehicle's engine, which quickly infuses and entrains air in the fluid of the power steering system from an empty fresh fluid reservoir.

One object of the invention is to provide an apparatus and method for exchanging fluid in a vehicle's power steering system which provides a light weight, compact, easily portable unit which can be positioned in a convenient location. The fluid exchanger should have a small footprint and contains a compact fresh fluid supply reservoir which is large enough to provide a virtually total or nearly total exchange of the fresh fluid of the fluid exchanger for the used fluid of most or nearly most vehicular power steering systems seen in automotive service and lube centers.

Another object of the invention is to provide an apparatus and method for exchanging the fluid of a power steering system which is relatively inexpensive to purchase while being comparable in function to other more expensive fluid exchangers which actually exchange the used fluid of the power steering system for the fresh fluid of the fluid exchanger rather than just mixing and diluting the used fluid with fresh fluid within in the power steering reservoir, as is used in some inexpensive and relatively ineffective power steering fluid exchangers on the market today.

Since time is equivalent to cost in the vehicular maintenance industry, another object of the invention is to provide an apparatus and method which provides a rapid exchange of the used fluid of a power steering system with fresh fluid.

Another object of the invention is to provide an apparatus for exchanging the fluid of a power steering system which is easy and quick to connect and operate, one which requires minimal training for new service technicians. The apparatus and method will provide for easy connection to both types of power steering systems layouts, the type of power steering system layout where the reservoir is combined with the pump and also the type of power steering system layout which has a fluid reservoir remotely positioned above and away from the power steering pump.

Another object of the invention is to provide an apparatus and method for exchanging fluid in a vehicle's power steering system which provides for isolated delivery of fresh and used fluid through two separate respective conduits, with one connected to deliver fresh fluid from the fluid exchanger's fresh fluid reservoir to the inlet side conduit of the power steering pump and the other to deliver used fluid delivered from the power steering pump to the fluid exchanger's used fluid receiver.

Another object of the invention is to provide an apparatus and method which will exchange a significantly higher proportion of fresh fluid for used fluid than the first or inexpensive category of exchangers which are exemplified by the use of two pumps which mix fresh fluid and used fluid for partial dilution within the power steering reservoir through its filler neck.

Another object of the invention is to provide an apparatus and method for exchanging the used fluid of a power steering system for fresh fluid while the vehicle's engine idles without requiring any connection to a power source which is not inside the fluid exchanger such as having to connect the exchanger to the vehicle's battery or electrical system, to a 115 volt or 220 volt AC current source or to the service center's compressed air supply. This can be accomplished by powering the fluid exchanger solely by the low pressure provided by the power steering pump in coordination with atmospheric pressure and positioning the fluid exchanger above the power steering pump at the same level or somewhat higher than the power steering reservoir. A power pack contained in the exchanger may be provided to power a float switch, a fluid control valve, and other indicators such as a warning tone and a bright red, blinking LED alert.

Another object of the invention is to provide an apparatus and method for exchanging fluid in a vehicle's power steering system which automatically starts exchanging fluid when the vehicle is started and allows the operator to take his time turning off the engine after the completion of the fluid exchange with no obstruction or interruption of flow into and out of the power steering pump. The fluid exchanger will automatically stop exchanging fluid when its fresh fluid reservoir becomes depleted while simultaneously allowing the power steering pump to freely circulate fluid from its outlet port back to its inlet port in a closed fluid circulation circuit. The fluid exchanger's operation will be automatically controlled by a fluid control valve which in turn is controlled by a float positioned in the fresh fluid reservoir, and this float will be directly and responsively controlled by the rising or falling of the fresh fluid level without the required use of any springs or manually spring loaded latches. Use of a float operated fluid control valve allows the fluid exchanger to automatically shift from exchanging fluid to circulating fluid in a closed fluid circulation circuit and back again when the fresh fluid reservoir is refilled for the next fluid exchange.

Another object of the invention is to provide an apparatus and method for exchanging fluid in a vehicle's power steering system which automatically delivers fresh fluid and used fluid at approximately the same rates of flow and in the same approximate volumes. If the rates of flow and the volumes of flow of the fresh and used fluid are not approximately equivalent, significant differences can result in differences in the volumes of fresh and used fluid delivered at any one time, creating a situation of too much fresh fluid or used fluid delivered in comparison to one another with the resulting fluid overflow or fluid starvation of the power steering system.

Another object of the invention is to provide an apparatus and method for exchanging fluid in a vehicle's power steering system which does not infuse air into the power steering system during the exchange of used fluid for fresh or after the fluid exchange. Infusion of air is undesirable since it quickly becomes entrained and tends to expand the volume of the fluid, resulting in fluid starvation of the fluid circuit's pump, loss of effective lubrication and diminished capacity of the fluid to transmit power. This entrainment of air and resulting loss of fluid power capacity is typically accompanied by significant noise in the power steering system and significant reduction of ability to steer the vehicle. Unabated, such a condition can damage the power steering system. If is does not damage the power steering system, the loud noise can certainly alarm the vehicle's owner and the loss of full steering power can pose a safety issue if not quickly remedied. Therefore, if this condition occurs, the vehicle should not leave the service center until it is resolved. Resolving this condition adds additional complexity and time to the procedure since it may take a period of minutes for the entrained air to release from the fluid while the engine idles. When air releases from the fluid, the fluid volume lessens, thus often requiring additional or multiple topping off of fluid. This delays the completion of the fluid exchange procedure and can project an undesirable image to the customer who stays in or near his vehicle while having the power steering fluid is exchanged and who hears the resulting loud noises in their power steering system from the entrained air and witnesses the efforts of the service technician to remedy the problem.

Experimentation by the inventors has shown that development of a purely mechanical/hydraulic float operated fluid control valve without electrical activation required meeting some unique challenges in order to develop a valve which will smoothly shift from a fluid exchanging mode of operation to a second mode of operation which allows the power steering system to circulate its fluid in a closed fluid circulation circuit through the fluid exchanger and the power steering system without allowing air to enter the fluid. When the fresh fluid supply has become depleted, an effective seal must be established between the fresh fluid reservoir and the fluid control valve or air will be pumped into the power steering system from the fresh fluid reservoir if the engine of the vehicle is allowed to continue running. It was also discovered that the tighter the sealing provided to valve slide where it enters the fresh fluid reservoir, the more effectively it sealed, but also the more difficult it was for the slide to move up and down in the valve body. Without the serendipitous discovery of the effective pressure assisted sealing methodology herein disclosed, effective sealing provided to the valve slide typically caused the valve slide to either move sluggishly or become stuck and to stay in its fluid exchange position even when the fresh fluid supply was depleted. Attempts to increase the size of the float to allow greater weight to be added to the float as a single solution to this problem were unsuccessful. An effective solution to the sealing problem was thus conceived during the process of experimentation. It was determined that the best solution was to provide and maintain an effective seal for the fluid control valve from the fresh fluid reservoir only upon depletion of the fresh fluid supply, and this could be accomplished by selectively harnessing and utilizing the low pressure provided by the power steering pump through the fluid exchanger's fresh fluid supply hose to establish and hold an effective seal. As long as this low pressure is used to provide and maintain a seal between the valve slide and the fresh fluid reservoir only when the fresh fluid supply became depleted, the valve slide is able to freely move to its lower position to establish a closed fluid circulation circuit for the power steering pump without allowing the infusion of air which quickly become entrained in the fluid. Any infusion of fresh fluid through or around the slide during the fluid exchange is acceptable since the slide is used as a fresh fluid port in the preferred embodiment.

It was also discovered that the positive and negative pressures provided by the power steering pump could be harnessed and utilized to assist a mechanical/hydraulic float operated valve in shifting to its closed fluid circulation mode when the fresh fluid supply became depleted. It was also discovered that eliminating the fresh fluid supply port as a separate entity in the bottom of the fresh fluid reservoir and combining it internally with the control valve slide was helpful in preventing air infusion from an empty fresh fluid reservoir. Another critical issue which was resolved by the inventors in experimentation was the developing and implementation of a method to effectively seal off the used fluid receiver from the closed fluid circulation circuit when it was established and maintained by the fluid control valve.

DETAILED DESCRIPTION OF THE INVENTION

Figure 1:
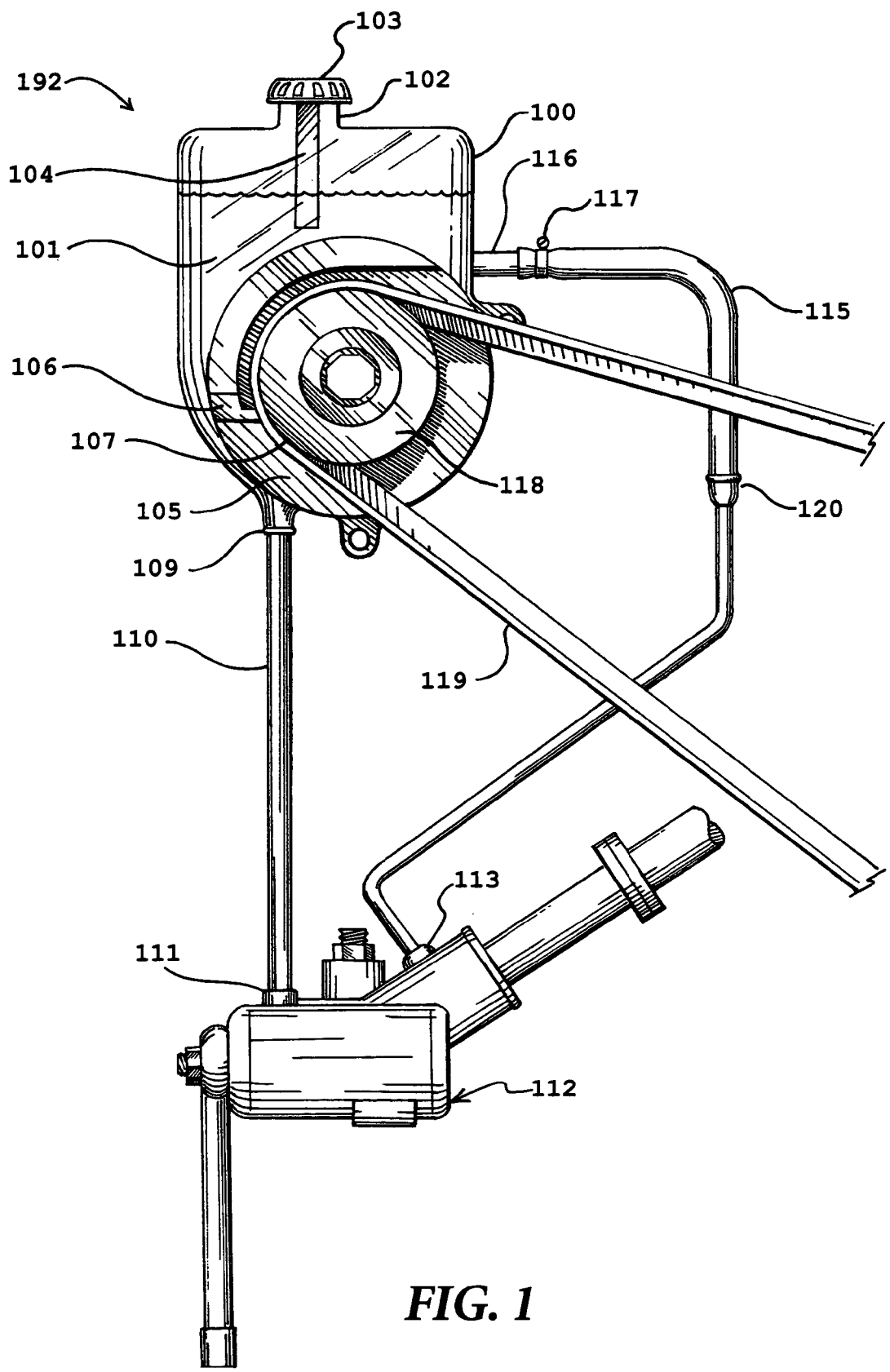
FIG. 1 depicts what can be referred to as a traditionally configured reservoir pump combination type power steering system.

FIG. 1 depicts one of the two basic types of power steering systems found in vehicles today, commonly referred to as a traditionally configured power steering system which has its fluid reservoir arranged integral to the power steering pump as a reservoir-pump combination assembly. With this configuration the pump supply conduit from the reservoir to the intake port of the pump is very short in length and is hidden from view inside the reservoir-pump combination assembly. Typically a power assisted steering gear mechanism accompanies this configuration. In years past the reservoir's walls were typically constructed of non-transparent metal, but more recently there is a trend toward constructing the reservoir of either translucent or non-translucent plastic. The power steering system of FIG. 1 has a reservoir 100 arranged integral to a power steering pump 105 to form a combination reservoir-pump assembly 192. Reservoir 100 contains a fluid 101. A reservoir outlet conduit 106 carries fluid 101 from reservoir 100 to an inlet port 107 of pump 105. Reservoir outlet conduit 106 is very short in length and is hidden from view inside combination reservoir-pump assembly 192. Typically, this configuration includes a steering gear mechanism 112. Reservoir 100 is constructed of metal. A pressure conduit 110 connects an outlet port 109 of pump 105 to an inlet port 111 of steering gear mechanism 112, which is power assisted by the pressurized fluid provided by pump 105 through pressure conduit 110. The fluid in pressure conduit 110 has higher pressure than the fluid located anywhere else in the power steering system and this pressurized fluid is the working fluid which provides the power to assist the driver in steering the vehicle. Thus fluid 101 is pressurized by pump 105 to provide power to do the hydraulic work required to make the vehicle easier to steer by the driver. Steering gear mechanism 112 has a fluid return conduit 114 with al hose end 115 attached by a ferrule 120 which is crimped. Fluid return conduit 114 is connected to an outlet port 113 of steering gear mechanism 112. Hose end 115 is connected to a reservoir return port 116 and sealingly secured by a hose clamp 117, which is a stainless steel gear drive type. Power is provided to pump 105 by a belt 119 which is rotated around a pulley 118 under power of the engine of the vehicle (not shown). Reservoir 100 has a filler neck 102 which receives and holds a cap 103 which is vented to the atmosphere. Cap 103 has a dipstick 104 integral to its bottom side. Fluid 101 is delivered from reservoir 100 under power of pump 105 to be circulated out of port 109 through pressure conduit 110 into port 111, through steering gear mechanism 112, out of outlet port 113, through conduit 114 and hose 115, into and through port 116 to be deposited back into reservoir 100 for redundant delivery and circulation by pump 105.

Figure 2:
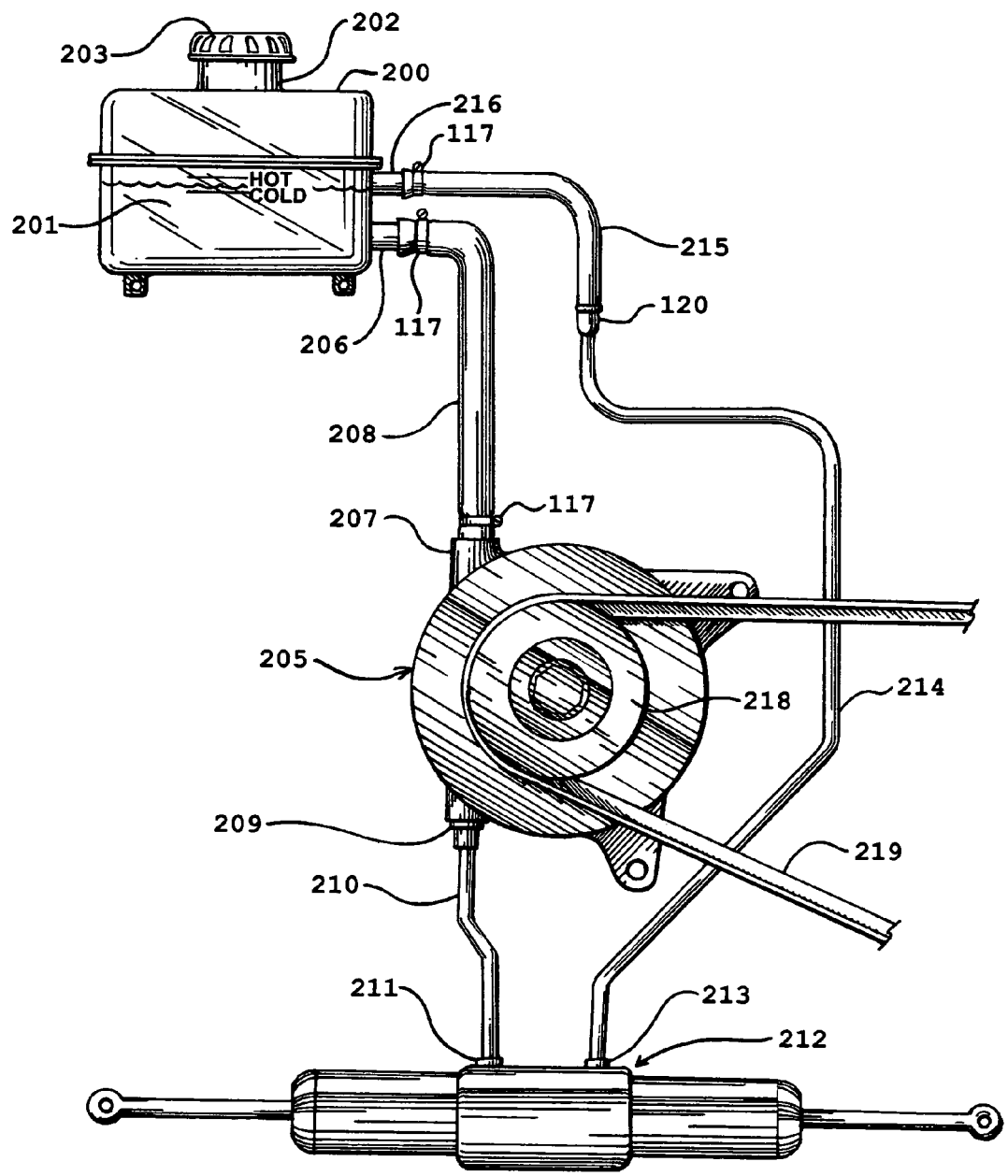
FIG. 2 depicts what can be referred to as a more modern remote fluid reservoir type power steering system which has its fluid reservoir arranged at a remote location.

FIG. 2 depicts the second of two basic types of power steering systems found in vehicles today, commonly referred to as a more modern power steering system which has its fluid reservoir arranged at a remote location above the power steering pump with the pump supply conduit and the low pressure outlet conduit from the power assisted steering mechanism typically visible and accessible, with each conduit connected to one of the two ports of the remote reservoir. A power assisted rack and pinion steering mechanism typically accompanies this second type of system. As with the more traditionally configured system having a reservoir-pump combination, the low pressure fluid return conduit from the power assisted steering mechanism is connected to the return port of the reservoir. In addition the fluid reservoir is typically translucent, allowing one to note the fluid level through the wall of the reservoir at designated marks on the wall. This power steering system has a fluid reservoir 200 arranged at a remote location above a power steering pump 205 which contains a fluid 201. Reservoir 200 has two visible and typically accessible ports, a reservoir outlet port 206 and a reservoir return port 216. A pump supply hose 208 connects reservoir outlet port 206 to a pump inlet port 207. Pump supply hose 208 is sealingly secured to port 206 and to port 207 by a pair of hose clamp 117. A pressure conduit 210 connects a pump outlet port 209 of pump 205 to an inlet port 211 of a rack and pinion steering mechanism 212, which is power assisted by the fluid power provided by pump 205. Fluid 201 is pressurized by pump 205 to provide power to do the hydraulic work required to make the vehicle easier to steer by the driver. Rack and pinion steering mechanism 212 has a fluid return conduit 214 with a hose end 215 attached by a ferrule 120 which is crimped. Fluid return conduit 214 is connected to an outlet port 213 of rack and pinion steering mechanism 212. Hose end 215 is connected to reservoir return port 216 and sealingly secured by hose clamp 117. Power is provided to pump 205 by a belt 219 which is rotated around a pulley 218 under power of the engine of the vehicle (not shown). Reservoir 200 has a filler neck 202 which receives and holds a cap 203 which is vented to the atmosphere. In normal operation the power steering system is constructed and arranged for fluid 201 to be delivered from reservoir 200 through port 206, through pump supply hose 208 into pump inlet port 207 under power of pump 205 to be circulated out of pump outlet port 209 into and through pressure conduit 210 and through inlet port 211, through rack and pinion steering assembly 212, out of outlet port 213, through fluid return conduit 214 and hose end 215, and into and through reservoir return port 216 to be deposited into reservoir 200 for redundant delivery and circulation by pump 205.

Figure 3:
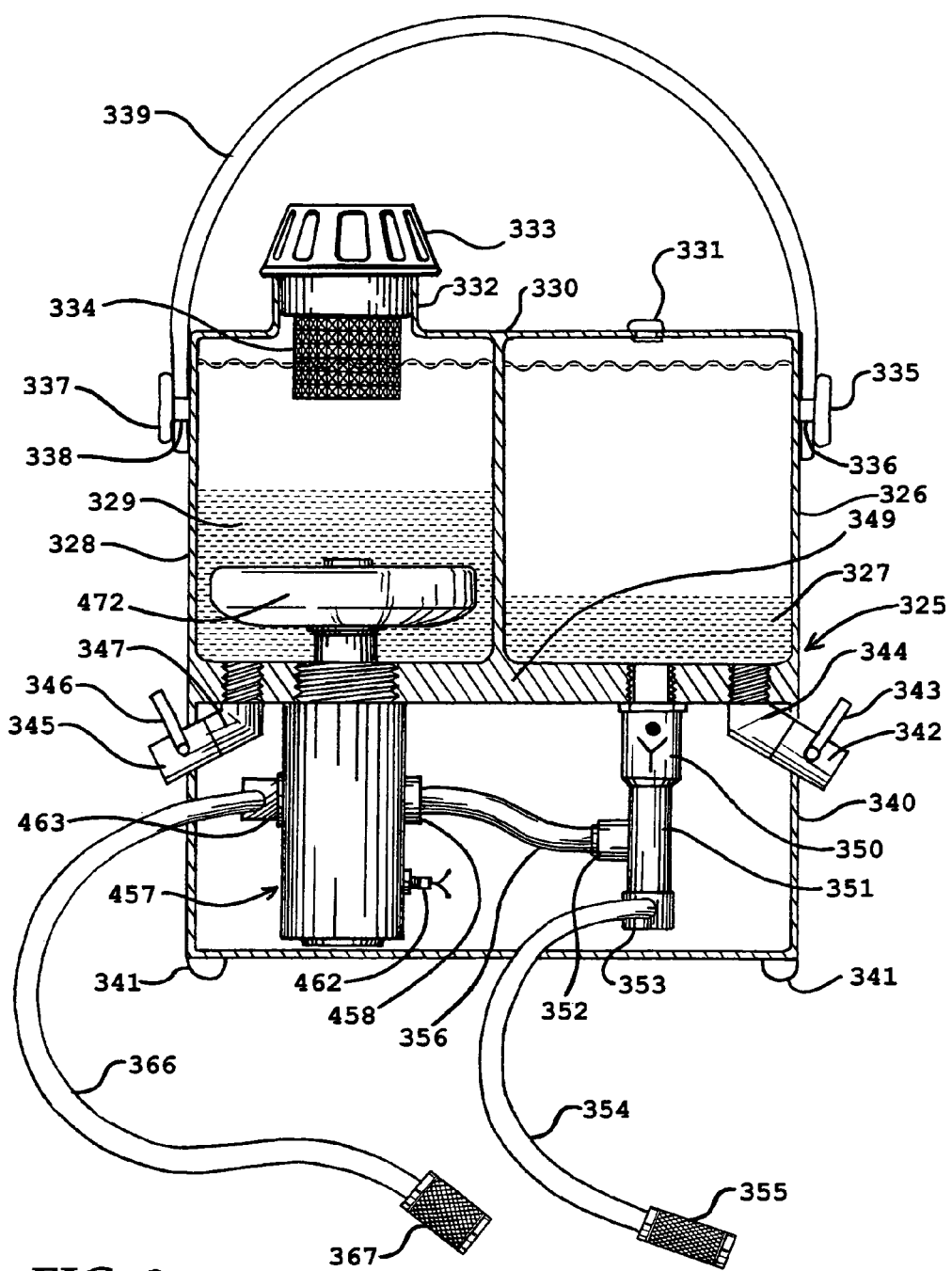
FIG. 3 depicts the preferred embodiment of the invention.

FIG. 3 depicts the invention in its preferred embodiment, a power steering fluid exchanger 325 which is a light, very compact, portable, easy to position, easy to connect and operate, and is automatic. Power steering fluid exchanger 325 has a fresh fluid reservoir 328, a used fluid receiver 326, and a fluid control valve 457 which is operated by a float 472. The fluid control valve 457 controls the operation of the fluid exchanger 325 and is directly operated by float 472 which is positioned in fresh fluid reservoir 328 and is buoyant in a fresh fluid 329 which is contained therein. Float 472 is responsive to the increasing or decreasing level of fresh fluid 329 contained in fresh fluid reservoir 328 and operates the fluid control valve 457.

Power steering fluid exchanger 325, which is in this embodiment is constructed of translucent high density polyethylene plastic molded in three separate parts which snap fit together and are further secured by screws (not shown), and which are fluorinated for resistance to discoloration and damage by oil. Fluid exchanger 325 can however, be constructed of a wide range of other plastics and materials, including welded sheet metal, deep drawn metal, or cast aluminum with vertically running sight glasses. In this preferred embodiment no fluid level sight glasses for the fresh fluid reservoir 328 or the used fluid receiver 326 are necessary since the plastic used is translucent and allows the operator to view the used and fresh fluid levels. Used fluid receiver 326 receives and holds a used fluid 327. Used fluid receiver 326 and fresh fluid reservoir 328 are molded together as an integral part of fluid exchanger 325 which is configured to accept at its top in snap fit fashion, a top cover piece 330 which is a one piece molded plastic part which sealingly covers and isolates both used fluid receiver 326 and fresh fluid reservoir 328 after being snap-fitted and glued as well screwed in place (screws not shown). Fluid exchanger 325 has a post 336 and a post 338 which are integrally molded into it at each side, and which each accept the hole at each end of a handle 339 which is flexible, is constructed of molded nylon plastic, and which is secured to posts 336 and 338 by a retainer cap 335 and a retainer cap 337 which are secured into posts 336 and 338 by screws. The fresh fluid reservoir 328 hold approximately 3½ quarts of fresh fluid 329 which is approximately ½ quart less in volume than the capacity of used fluid receiver 326 which holds approximately 4 quarts of used fluid 327. This slightly larger capacity of used fluid receiver 326 compared to the fresh fluid reservoir 328 allows the operator to add fresh fluid to top off the reservoir of the power steering system being serviced before it is serviced without having the used fluid reservoir 326 overflow with fluid. This slightly smaller volume of fresh fluid reservoir 328 is accomplished by calculating the volume occupied by float 472 and then constructing the plastic mold to reduce the inside dimensions of fresh fluid reservoir 328 in comparison to used fluid reservoir 326 until the desired difference of approximately ½ quart is reached.

Top cover piece 330 has a filler neck 332 which is integrally molded and which is threaded to receive a cap 333 which is well vented to allow air to enter the fresh fluid reservoir to replace fresh fluid 329 as it leaves fresh fluid reservoir 328. Top cover piece 330 has an orifice which accepts a molded plastic vent 331 in snap fit fashion and which is arranged to allow the air to move in and out of used fluid receiver 326 as used fluid 327 is emptied, and also as used fluid 327 is delivered into used fluid receiver 326. Filler neck 332 is constructed to accept and hold a strainer 334 which is constructed of cylindrically molded nylon with a sidewall and bottom end having numerous integral strainer holes of approximately 50 microns in size. Strainer 334 serves to prevent significantly sized debris from entering fresh fluid reservoir 328 which could interfere in the functioning of a fluid control valve 457 or enter the power steering system being serviced and perhaps cause a problem in the system. Fluid control valve 457 is machined from aircraft grade aluminum stock which is threaded to securely and sealingly screw into a bottom common wall 349 of fluid exchanger 325. Fluid control valve 457 has a hose barb 458 and a 90 degree hose barb 463 which are constructed to accept low pressure push-lock type hydraulic hose. Fluid control valve 457 also has a magnetically operated microswitch 462.

Fluid exchanger 325 has a skirt base 340 at its bottom side which is integrally molded as one piece with four sides and a bottom. Skirt base 340 snap fits into the top section of fluid exchanger 325 which contains both the used fluid receiver 326 and the fresh fluid reservoir 328. Skirt base 340 is further secured by screws (not shown). Skirt base 340 has four integral orifices at each corner of its bottom which securely accept a set of four footpads 341 which is in this embodiment are comprised of molded, soft, nitrile type rubber (only the front side two are shown). The fresh fluid reservoir 328 and the used fluid receiver 326 share bottom common wall 349 which has four threaded ports provided to it. Common wall 349 is thick enough to provide adequate rigidity and strength to allow its four threaded ports to receive and securely hold four separate threaded components. The technology exists to for brass, steel or alloy threaded collars to be easily molded into the plastic comprising common wall 349 to provide extra strength to the four threaded orifices if desired, but if the plastic is thick and strong enough as in this case, that is not necessary. Two of these components screwed into and sealingly secured to a pair of orifices of bottom common wall 349 are a 45 degree connector 344 arranged to communicate with the used fluid receiver 326 and a 45 degree connector 347 arranged to communicate with the fresh fluid reservoir 328. A ball valve 342 which has a valve operating lever 343 is connected to the 45 degree connector 344 to allow used fluid 327 to be drained from used fluid reservoir 326. A ball valve 345 which has a valve operating lever 346 and is connected to 45 degree connector 347 to allow fresh fluid 329 to be drained from used fluid receiver 328. A check valve 350 is brass and is threaded at its upper end and is screwed into and sealingly secured into one of the four threaded orifices, the one located in the right side of bottom common wall 349 which provides access to used fluid receiver 326. Check valve 350 has a female thread at its lower end to receive a street tee 351 which is brass.

Street tee 351 has a middle placed female thread which receives a hose barb 352 and an end placed female thread which receives a 90 degree hose barb 353. Both hose barb 352 and hose barb 458 are pushlock type hose barbs which must receive pushlock type hose. This method of sealingly securing hose is well known to those of average skill in the art. The 90 degree hose barb 463 and 90 degree hose barb 353 are not pushlock but require the use of crimped ferrules to sealingly secure the hose sections which are sealingly attached, and this method of connecting hose to ports is also well known to those of average skill in the art. Used fluid hose 356 which is a push lock type ⅜ inch internal diameter hose is connected at one end and to hose barb 352 at the other end to hose barb 458. In this embodiment, used fluid hose 356 is a piece of very durable, high quality pushlock type hose, in this case Parker 811 hose of ⅜ inch internal diameter which is constructed with materials resistant to power steering fluids of all varieties.

The fluid exchanger assembly 325 has two fluid exchange hoses, a used fluid exchange hose 354 which in this case is ⅜ inch internal diameter and comprised of a clear braided flexible plastic hose such as nylabraid® type hose. A fresh fluid exchange hose 366 which in this case is ⅝ inch internal diameter, is also comprised of a clear braided flexible plastic hose such as nylabraid® type hose or a special steel wire reinforced clear plastic hose, typically stiff enough to prevent collapse from the low pressure provided by a power steering pump, but flexible enough to position easily. Used fluid exchange hose 354 is connected at one end to hose barb 353 and at its other end to a small female quick connect 355, which in this case is a ⅜ inch non spill type. Fresh fluid exchange hose 366 is connected at one end to 90 degree hose barb 463 and at its other end to a large female quick connect 367, which in this case is a ½ inch non spill type. Fluid exchange hoses 354 and 366 are connected to their respective hose barbs and female quick connects by the use of hose barbs which require crimped ferrules (not shown).

Figure 4:
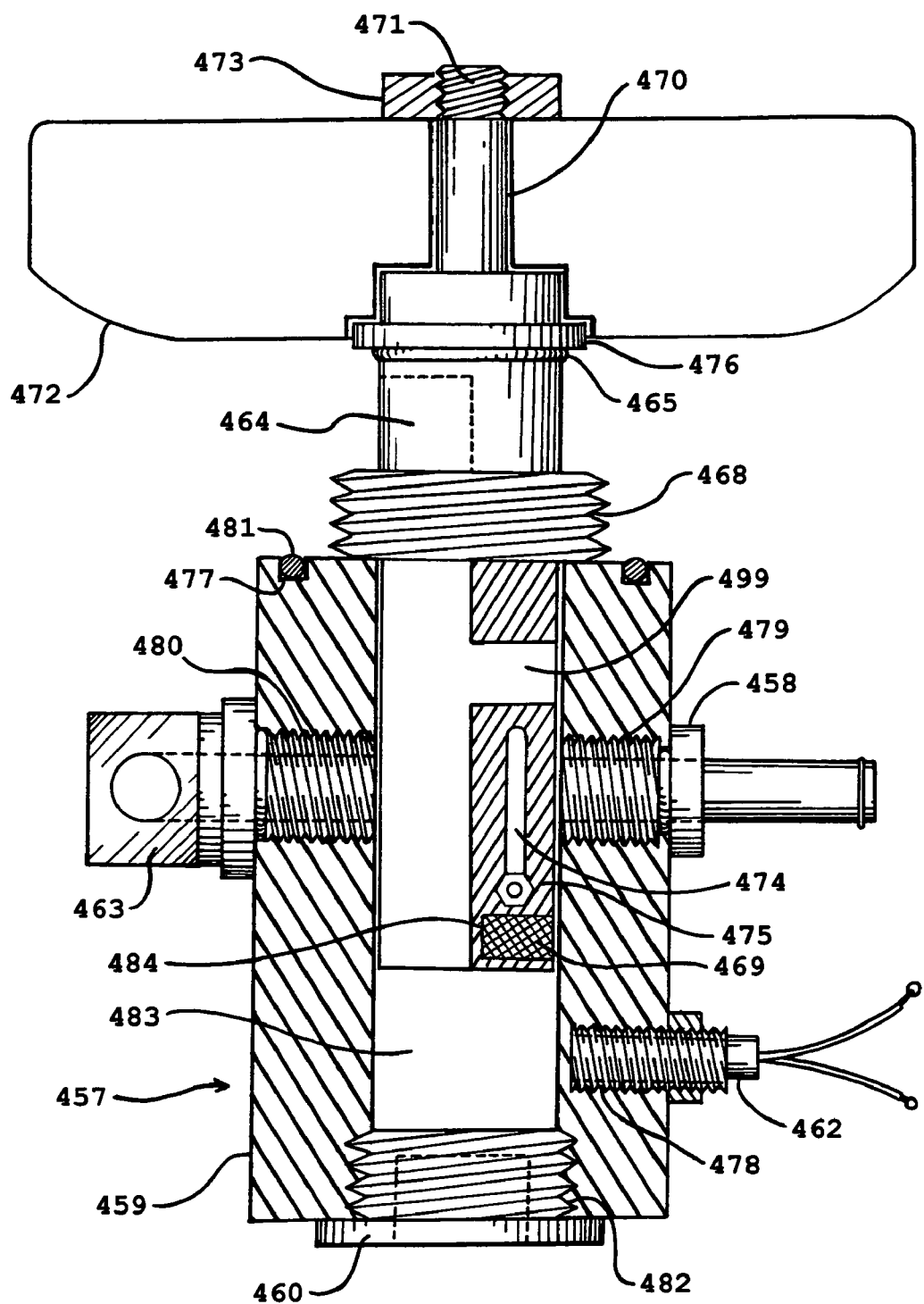
FIG. 4 depicts the detailed construction of a mechanical/hydraulic fluid control valve of the preferred embodiment of FIG. 3 and its parts arrangement showing the valve operating with its slide in the upward position.
Figure 5:
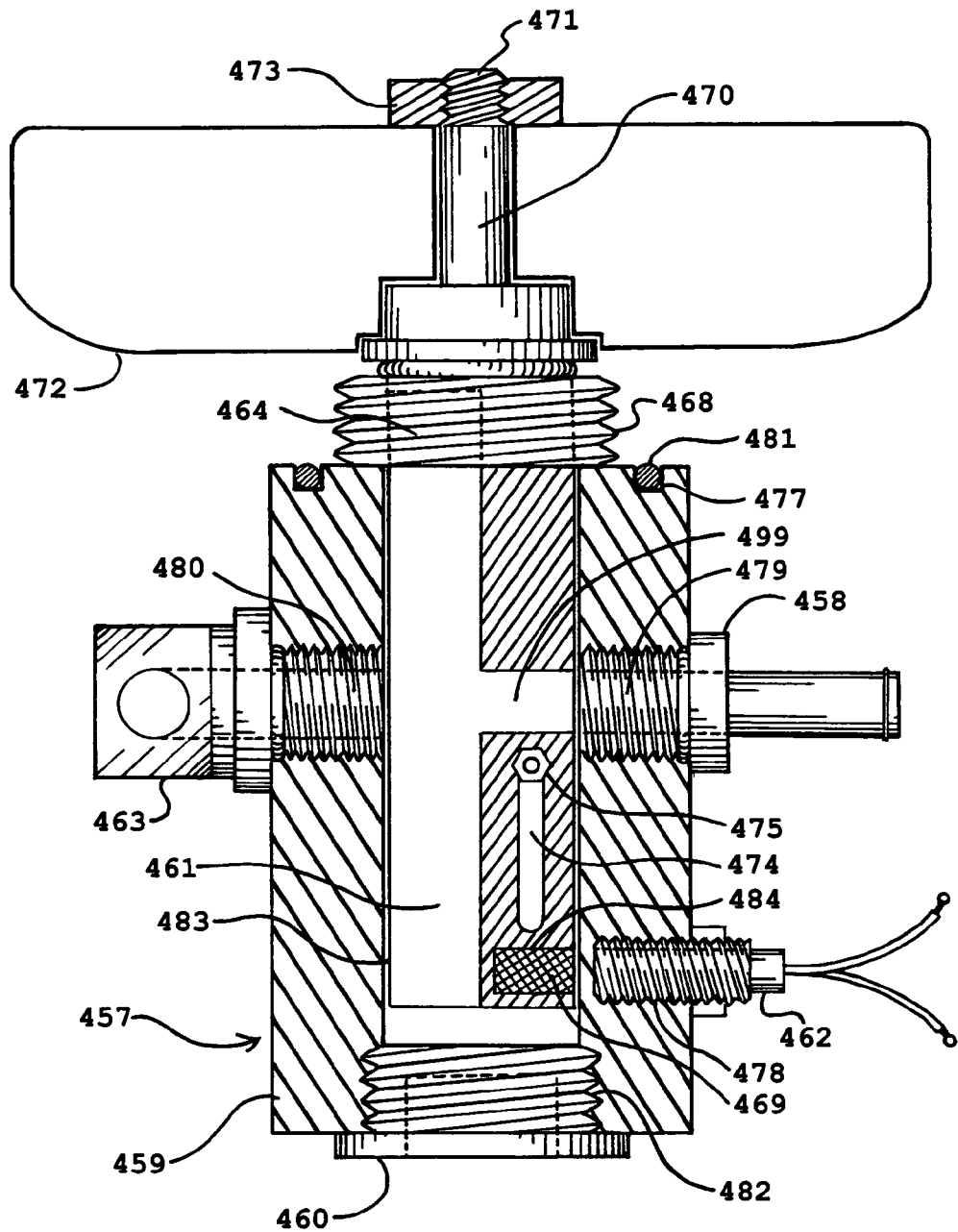
FIG. 5 depicts the detailed construction of the mechanical/hydraulic fluid control valve of the preferred embodiment of FIG. 3 and its parts arrangement showing the valve operating with its slide in the downward position.
Figure 6:
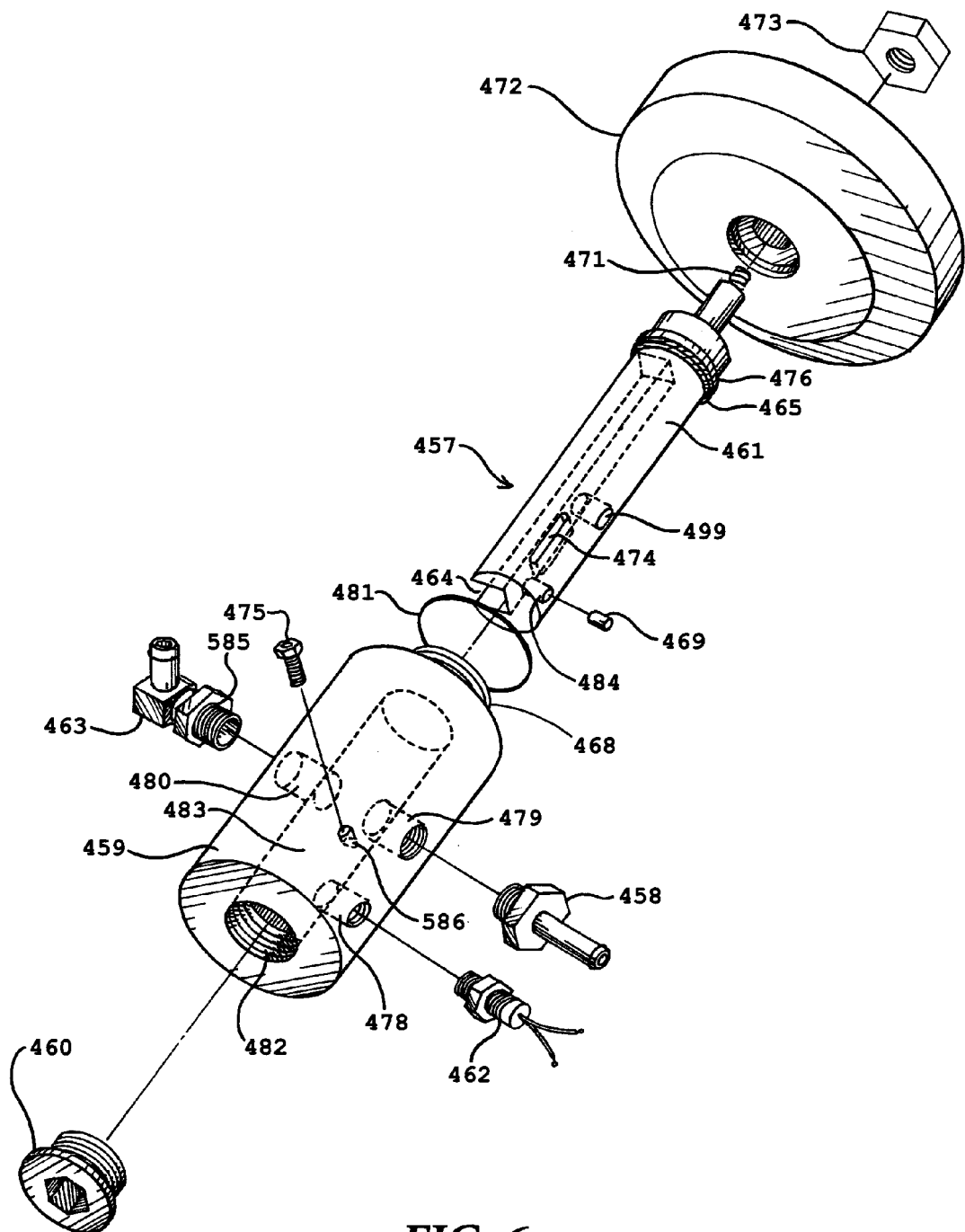
FIG. 6 depicts an exploded, perspective view of the mechanical/hydraulic float operated pressure assisted fluid control valve of the preferred embodiment of FIG. 3 and its parts arrangement.

FIGS. 4-6 depict the detailed construction of a fluid control valve 457 and its parts arrangement, with FIGS. 4 & 5 showing a side view and with FIG. 6 illustrating an exploded view. All the parts of FIG. 6 are visible in FIGS. 4 & 5 with the exception of an O'ring 585 and a threaded orifice 586.

FIG. 6 shows a side and perspective view of alignment pin 475 and O'ring 481. In FIG. 4 fluid control valve 457 has a valve body 459 which has a valve bore 483 and a threaded top end 468. Fluid control valve 457 is machined from aircraft grade aluminum alloy stock although many other materials could be used such as acrylic and other types of plastic, brass, steel and other metal alloys. Valve bore 483 contains a valve slide 461 and has a female thread 482 on it lower end which is countersunk at its outer edge to sealingly receive a hex plug 460 which is constructed of steel, is threaded to fit, and has an integral O'ring (not shown).

Valve body 459 has a used fluid inlet port 479 on its right side which receives hose barb 458. Valve body 459 has a fresh fluid delivery port 480 on its left side which receives 90 degree hose barb 463 (hose barbs 458 and 463 are first shown in FIG. 3). Both hose barb 458 and 90 degree hose barb 463 are provided with O'rings (not shown) for sealing against valve body 459. All ports which receive hose barbs are suitably prepared with female threads which matingly receive corresponding male threads of those hose barbs. This is well understood by those with average skill in the art. Both used fluid inlet port 479 and fresh fluid delivery port 480 are suitably countersunk at their outside edge to suitably accept and retain O'rings which are supplied with hose barb 458 and 90 degree hose barb 463 and which provide effective fluid sealing at threaded, countersunk ports.

Not shown in FIGS. 4 & 5, the threaded orifice 586 (see FIG. 6) is provided to valve body 459 which extends from the outside of valve body 459 through its side wall into valve bore 483, and which receives an alignment pin 475 that is threaded in its middle section and provided with a smooth ground end which extends into valve bore 483. The smooth ground end of alignment pin 475 is positioned to protrude into an alignment groove 474 which is machined into the right front side of valve slide 461. Alignment groove 474 of valve slide 461 is arranged to slide up and down vertically on middle threaded alignment pin 475, thereby allowing vertical up and down movement of valve slide 461 but no rotation within valve bore 483. The use of alignment pin 475 and alignment groove 474 keeps valve slide 461 in proper alignment with the ports of valve body 459 which is required for correct operation, and also keeps valve slide 461 from leaving valve bore 483 if the fluid exchanger 325 is ever inadvertently turned upside down. Valve body 459 has a O'ring gland 477 provided at its top edge which receives an O'ring 481 and which provides a suitable seal between valve body 459 and the bottom common wall 349 as shown in FIG. 3.

Valve slide 461 has a common inlet port/fresh fluid channel 464 which is machined to originate at the top left side of valve slide 461 and to extend downward to the bottom of valve slide 461, thereby providing a fresh fluid delivery channel for fresh fluid 329 of FIG. 3 to be delivered into, through, and out of valve slide 461 to enter hose barb 480. Common inlet port/fresh fluid channel 464 has a second important function also which is providing a vent between the top to the bottom of valve bore 483, thereby allowing valve slide 461 to move freely and responsively to the vertical movement upward or downward of float 472 without becoming hydro-locked in valve bore 483. Valve slide 461 has a side port 499 which extends from inlet port/fresh fluid channel 464 through the right outside of valve slide 461.

Valve slide 461, has a collar 476 and a float shaft 470 which has a threaded end 471 which receives a retainer nut 473 after float 472 which has a vertical valve bore is inserted on top of float shaft 470. Float 472 is constructed of an air tight, air containing thin walled brass formed container which is brazed at its bottom seam (not shown) and has an air tight open center which is suitably formed to mate with the top portion of valve slide 461 above collar 476 and the top shaft of valve slide 471. Float 472 is sealed in such a fashion that fluid cannot leak into its air cavity held inside, which provides the buoyancy for flotation in power steering fluid 329 of FIG. 3. Float 472 is large enough to contain an adequate volume of air to provide enough buoyancy to be able to overcome the total weight of valve slide 461, its retainer nut 473 and float 472 to reliably raise and hold valve slide 461 in its upper position when fresh fluid reservoir 328 of FIG. 3 contains even a minimum volume of fresh fluid 329 of at least ½ quart. In this case the float dimensions are approximately 6 inches in diameter by 1⅞ inches thick. Additionally, the total weight of valve slide 461 with its retainer nut 473 and float 472 must be heavy enough to cause the movement valve slide 461 downward when the supply level of fresh fluid 329 drops, given that the total sidewall clearance between valve slide 461 and valve bore 483 being approximately 0.010 inch. There are other materials and methods which can be used to construct float 472 which provide suitable buoyancy, which are structurally strong enough, and which are adequately resistant to power steering fluid to permit a long and reliable service life. Various types of plastics such as acrylic and nylon can be molded and filled with air or light weight foam to comprise a suitable float with an adequate service life, and there are other metal alloys which can be constructed to be thin walled and sealed together by an appropriate type of welding, soldering or brazing depending on the alloy used.

Valve slide 461 has a seal 465 which is tight fitting on valve slide 461 and in this embodiment is constructed of a Viton® type rubber O'ring which is installed underneath collar 476. When slide 461 reaches the end of its downward motion seal 465 is pinched between collar 476 and threaded top end 468 of valve body 459 to provide an essentially air tight seal between fresh fluid reservoir 328 of FIG. 3 and valve bore 483. Valve slide 461 has an orifice 484 provided to its lower end which receives a magnet 469 which is secured with a suitable epoxy glue which is resistant to power steering fluid. Valve body 459 has a threaded orifice 478 which extends to a depth no closer to valve bore 483 than 0.050 inch. Threaded orifice 478 receives a magnetically operated micro-switch 462 which is threaded to be matingly screwed into threaded orifice 478.

FIG. 4 shows valve slide 461 in its upper position which results from fresh fluid reservoir 328 having an adequate supply of fresh fluid 329 in at least a minimum quantity of ½ quart which causes float 472 to rise under the power of its buoyancy in fresh fluid 329. When valve slide 361 is in its upper position used fluid inlet port 479 is blocked by the right side of valve slide 361 and fresh fluid delivery port 480 is open and able to pass fresh fluid 329 from the fresh fluid reservoir 328 through inlet port/fresh fluid channel 464.

FIG. 5 shows valve slide 461 in lower position which results from the depletion of the supply of fresh fluid 329 in fresh fluid reservoir 328 which causes float 472 to lose its buoyancy and drop. When valve slide 361 is in its lower position used fluid inlet port 479 is open to pass used fluid 327 through side port 499 at the right side of valve slide 361 and fresh fluid delivery port 480 is open and able to pass fresh fluid 329 from the fresh fluid reservoir 328 through inlet port/fresh fluid channel 464. Even when valve slide 461 is in its lower position and seal 465 is pinched between collar 476 and threaded top end 468, fresh fluid delivery port 480 is open to inlet port/fresh fluid channel 464. When slide 461 is in its lower position inlet port/fresh fluid channel 464 is blocked only at its top end and is positioned to allow used fluid 327 to pass through from used fluid inlet port 479 to fresh fluid delivery port 480. When slide 461 is in its lower position magnet 469 lines up with magnetically operated micro-switch 462 and activates it.

FIG. 6 shows the threaded orifice 586 of valve body 459 which extends into valve bore 483 and receives alignment pin 475, which is screwed into it and sealed with anaerobic hydraulic sealer or other suitable hydraulic thread sealer. FIG. 6 also shows an O'ring 585 which is fitted to 90 degree hose barb 463 by the hose barb manufacturer for adjustable fluid tight sealing. This method of hydraulically sealing a hose barb in a threaded port which is countersunk on the hose barb side is well known to someone of average skill in the art. FIG. 6 also provides a perspective view of O'ring 481 which is used to seal off valve body 459 from the fresh fluid reservoir 328. FIG. 6 also shows valve body 459 provided with the threaded orifice 478 which does not penetrate toward valve bore 483 any closer than 0.050 inch and which receives a magnetically operated micro-switch 462 which is matingly threaded to be screwed into threaded orifice 478. Micro-switch 462 is connected to complete a series configured electrical circuit (not shown) when activated by magnet 469, and this electrical circuit is comprised of an on-off lighted toggle switch wired to a red LED indicator, a buzzer and a replaceable 9 volt battery of the type used in smoke detectors and many other small devices. This electrical circuit, with its lighted on-off toggle switch, red LED indicator, buzzer, and 9 volt battery are not shown but are known to those of ordinary skill in the art. Alternatively, a fluid operated in-line flow switch at the used fluid receiver end of used fluid exchange hose 354 can be substituted for the toggle switch and this would automatically turn off the red LED and buzzer when fresh fluid supply 329 was depleted and the vehicle's engine is turned off. This type of flow switch is readily available in a number of forms such as a flow switch containing a displaceable piston which contains a magnet which triggers a magnetic sensor or micro-switch. These are known to those of average skill in the art.

Figure 7:
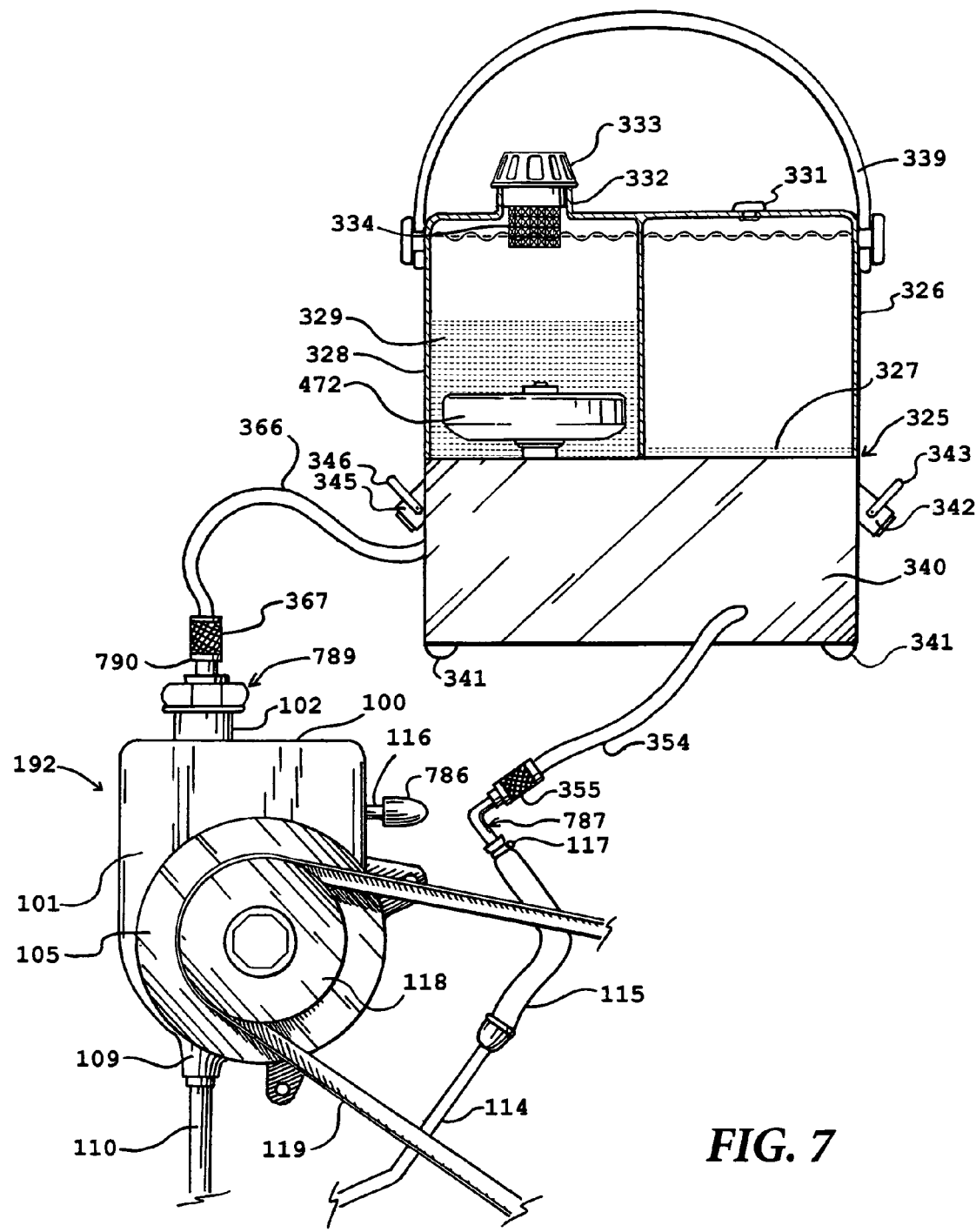
FIG. 7 depicts the fluid exchanger in proper connective arrangement to a power steering system of the traditional reservoir-pump combination type.

FIG. 7 depicts the power steering fluid exchanger 325 in proper connective arrangement to the type of power steering system as shown in FIG. 1 which has a combination pump reservoir assembly 192. In FIG. 7 fluid exchanger 325 is shown ready to exchange the power steering fluid of the power steering system shown in FIG. 1. FIG. 7 does not show the parts inside the skirt base 340 of fluid exchanger 325 (which are shown in FIG. 3). Fluid exchanger 325 is positioned somewhat above the level of fluid reservoir 100 of the power steering system being serviced, and is typically placed upon the top of one of the fenders, or on top of the engine to rest upon the set of four footpads 341. In some situations the power steering pump of a vehicle is powerful enough to provide adequate low pressure (suction) at its inlet port to allow fluid exchanger 325 to be position at or even somewhat below the level of fluid reservoir 100 of the power steering system being serviced. However, placing fluid exchanger 325 above or somewhat above the level of the fluid reservoir being serviced assures that the low pressure (suction) provided by the power steering pump to the fresh fluid exchange hose 466 when the vehicle is started will be adequate to easily deliver the fresh fluid to the inlet port of the power steering pump 105.

The operator carries and positions fluid exchanger 325 by using handle 339. In some cases the operator will choose to hang the fluid exchanger from a hood lock bracket or other projected or available orifice or extension at the underside of the raised hood of the vehicle using a hanger bracket 1905 of FIG. 26 which has a bracket base 1906 which is wide enough to receive handle 339 of the fluid exchanger of FIG. 3 and a hook 1907 which is inserted into and through an appropriate orifice, projected member, or protuberance under the front side of the hood (not shown). The hanger bracket 1905 can be constructed of bent 8 gauge steel rod which is then chrome plated and which has an appearance similar to a heavy duty double hook used to hang paint cans by their wire handles on ladder rungs. To hang fluid exchanger 325 from the hood it is necessary for the hood to be supported. This support can be provided by a vehicle's hood support rod (not shown) which has been placed into proper holding position if the vehicle is so equipped, or by using an adjustable hood support rod 1909 of FIG. 26 which can be suitably positioned and adjusted to proper length to keep the hood propped open while the fluid exchanger is hung from a hood lock bracket or other orifice, projection member or protuberance under the front side of the hood until the fluid exchange service is completed. The adjustable hood support rod 1909 of FIG. 26 has a base rod section 1910 which has a bottom rod pad 1914 attached at its bottom end. Bottom rod pad 1914 is comprised of a mineral oil resistant rubber type material such as nitrile or Viton®. The adjustable hood support rod 1909 has a top rod section 1913 to which the base rod to the base rod section 1909 slides freely into in varying penetrations. Top rod section 1913 has a top rod pad 1915 attached at its top end. Top rod pad 1915 is comprised of a mineral oil resistant rubber type material such as nitrile or Viton®. The adjustable hood support rod 1909 has a spring loaded releasable latch 1911 which secures the top rod section 1913 to the bottom rod section 1914 at the adjusted length necessary to prop open the vehicle's hood securely. The top rod pad 1915 and the bottom rod pad 1914 are somewhat pliable to conform to the surface pressed against providing a relatively slip resistant mating but yet firm enough to return to shape. The top rod pad 1915 has a nipple 1916 which extends upward to mate with a chosen hole of the inside sheet metal of the underside of the front hood.

Before fluid exchanger 325 was connected to the power steering system of FIG. 1 as shown in FIG. 7, the used fluid receiver 326 was emptied of used fluid 327 from a prior fluid exchange by moving valve operating lever 343 to open valve 342 and allowing used fluid 327 to be discharged into a suitable waste container or floor drain. Cap 323 was then removed to fill the fresh fluid reservoir 328 with approximately 3 quarts of fresh fluid 329 which is the type of power steering fluid required by the manufacturer of the vehicle being serviced. Fresh fluid 329 was poured through strainer 334 to prevent any debris smaller than approximately 50 microns from entering and contaminating fluid 329 inside fresh fluid reservoir 328. The filling of the fresh fluid reservoir 328 with fresh fluid 329 was then followed by the replacement of cap 333. The Filling of fresh fluid reservoir 328 results in the rising of float 472 to its upper position has moved valve slide 461 as shown in FIG. 4.

Figure 8:
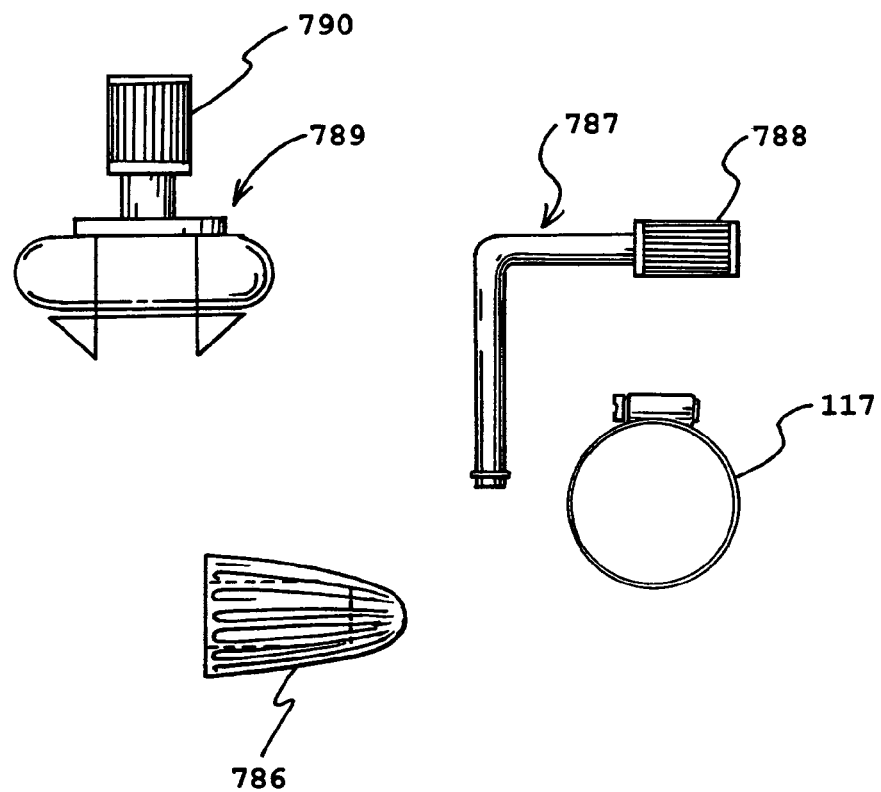
FIG. 8 depicts the special set of adapters which is used to provide the proper connective arrangement of the fluid exchanger as shown in FIG. 7.

The special adapter kit parts shown separately in FIG. 8 have been suitably connected to the power steering system as shown in FIG. 7. Cap 103 of FIG. 1 was removed from filler neck 102 of reservoir 100 of the power steering system to be set aside until the completion of the fluid exchange service. Hose clamp 117 was loosened on hose end 115 which was then pulled off of reservoir return port 116. A ⅜ male tube adapter 787 of FIG. 8 has a ⅜ inch outside diameter male tube and was inserted into hose end 115 and sealably secured with hose clamp 117. The ⅜ male tube adapter 787 of FIG. 8 is provided with a small male quick connect 788. A port plug 786 of FIG. 8 is constructed of Viton® type rubber and is suitably sized to be securely and sealingly placed over reservoir return port 116. Port plug 786 was pressed into place on port 116 to seal it from leakage of used fluid 327 or fresh fluid 329, or some combination thereof from reservoir 100 outward and from any leakage of air inward to reservoir 100 when low pressure is applied to reservoir 100. Power steering reservoir 100 was then topped off with fresh power steering fluid of the proper type all the up to the top of filler neck 102. A cap adapter 789 of FIG. 8 has a large male quick connect 790. Cap adapter 789 provides a fluid channel into reservoir 100 of FIG. 7 when installed on reservoir 100. Cap adapter 100 has been manufactured to be non-vented. Cap adapter 789 was placed on filler neck 102 and turned clockwise to sealingly secure it. Cap adapter 789 is air and fluid tight when properly placed and secured on filler neck 102. Power steering reservoir caps typically have vent passages at their inside center which are vented to the sides of the cap and are hidden from view, located under a gasket, but cap adapter 789 has no such vent. Cap adapter 789 of FIG. 8 is installable on many GM, Chrysler and Ford traditional types of power steering systems that have a reservoir-pump combination configuration. Large male quick connect 790 of cap adapter 789 is connected to the large female quick connect 367 of fresh fluid exchange hose 366. The small male quick connect 788 of ⅜ male tube adapter 787 is then connected to the small female quick connect 355 of used fluid exchange hose 354. The power steering system shown in FIG. 7 is now ready for the fluid exchange to be instituted which automatically begins when the engine of the vehicle is started. The exchanging of the fresh fluid 329 of the fluid exchanger 325 for the power steering system's used fluid 327 will be automatically stopped when the supply of fresh fluid 329 becomes depleted.

Figure 9:
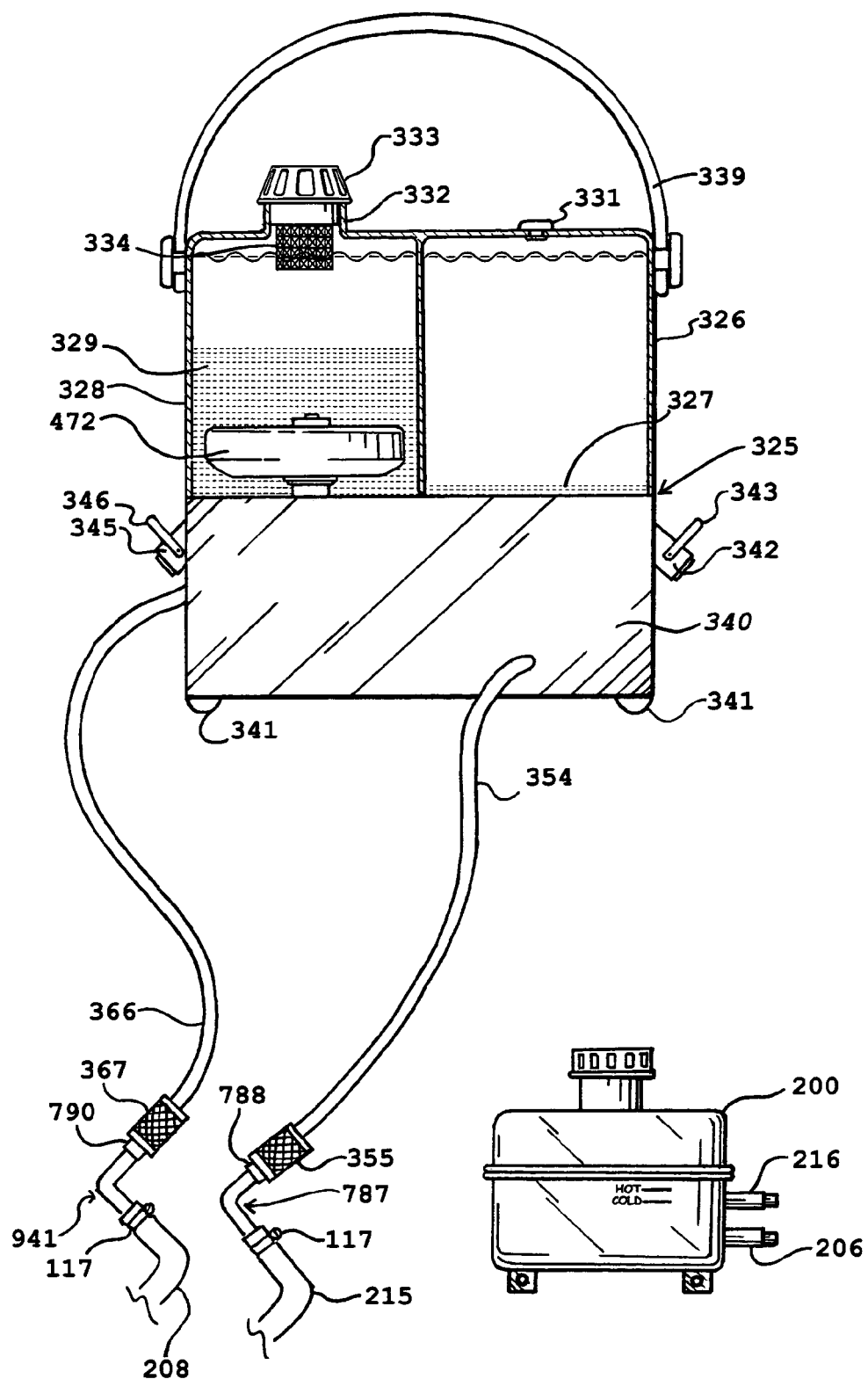
FIG. 9 depicts the invention in proper connective arrangement to a power steering system of the remotely positioned reservoir type.

FIG. 9 depicts the power steering fluid exchanger 325 in proper connective arrangement to a remote reservoir type power steering system as shown in FIG. 2. The used fluid receiver 327 has been emptied and the fresh fluid reservoir 328 has been filled with approximately three quarts of the type of power steering fluid required by the vehicle's manufacturer and this has caused float 472 to rise to its upper position. The 3/8 male tube adapter 787 has been inserted into hose end 215 and sealingly secured with hose clamp 117. The 5/8 male tube adapter 991 has been inserted into pump supply hose 208 and sealingly secured with hose clamp 117. The fresh fluid exchange hose 366 and the used fluid exchange hose 354 of fluid exchanger 325 have been suitably connected to the power steering system by connecting large female quick connect 367 of fresh fluid exchange hose 366 to the large male quick connect 790 of 5/8 male tube adapter 991, and by connecting the small female quick connect 355 of used fluid exchange hose 354 to the small male quick connect 788 of 3/8 male tube adapter 787. The power steering system shown in FIG. 9 is now ready for the fluid exchange to be instituted which automatically begins when the engine of the vehicle is started.

Figure 10:
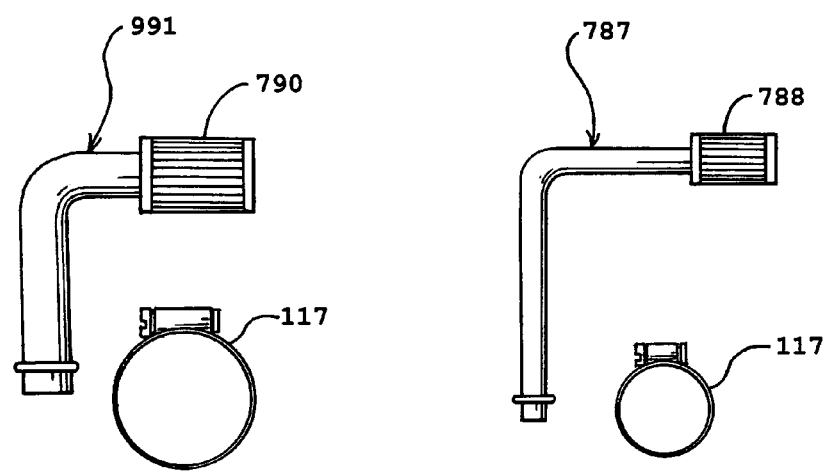
FIG. 10 depicts the special set of adapters which is used to provide quick connection to the fluid exchanger as shown in FIG. 9.

FIG. 10 depicts the special adapter kit which is used to provide proper connection of fluid exchanger 325 to the power steering system of FIG. 2 as shown in FIG. 9. The kit consists of 5/8 male tube adapter 991 which is 5/8 inches outside diameter, 3/8 male tube adapter 787 which is 3/8 inch outside diameter, and a set of two hose clamp 117. The 5/8 male tube adapter 991 is provided with the large male quick connect 790. The 3/8 male tube adapter 787 is provided with the small male quick connect 788. The large male quick connect 790 is connectable to the large female quick connect 367 of used fluid exchange hose 366 as shown in FIG. 9. The small male quick connect 788 is connectable to the small male quick connect 355 of used fluid exchange hose 354 as shown in FIG. 9.

Figure 11:
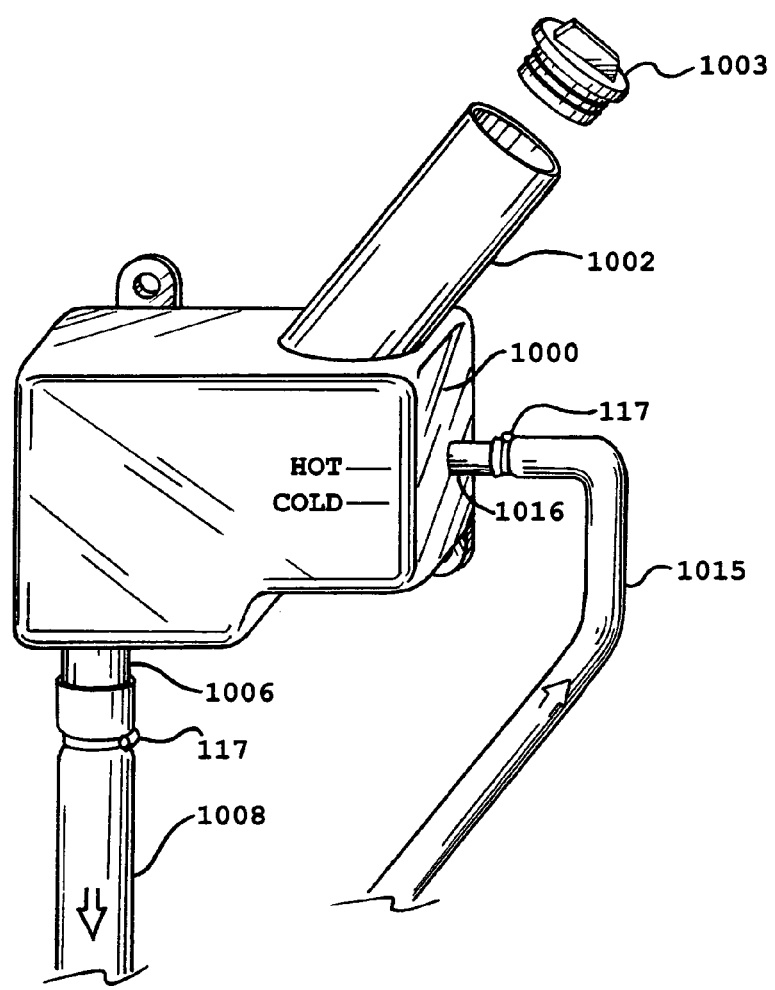
FIG. 11 depicts a specific style of remote reservoir power steering system seen in certain late model Ford vehicles.

FIG. 11 depicts a specific style of a remote reservoir system seen in certain late model Ford manufactured vehicles that has a remotely arranged reservoir. A reservoir 1000 is comprised of translucent plastic and has a fill spout 1002 which extends out of reservoir 1000 in angular fashion. Fill spout 1002 has a cap 1003 which is somewhat snug fitting. Reservoir 1000 has a reservoir outlet port 1006 to which pump supply conduit 1008 is sealably secured with hose clamp 117. Reservoir 1000 has a reservoir return port 1016 to which the hose end 1015 is sealably secured with a hose clamp 117.

Figure 12:
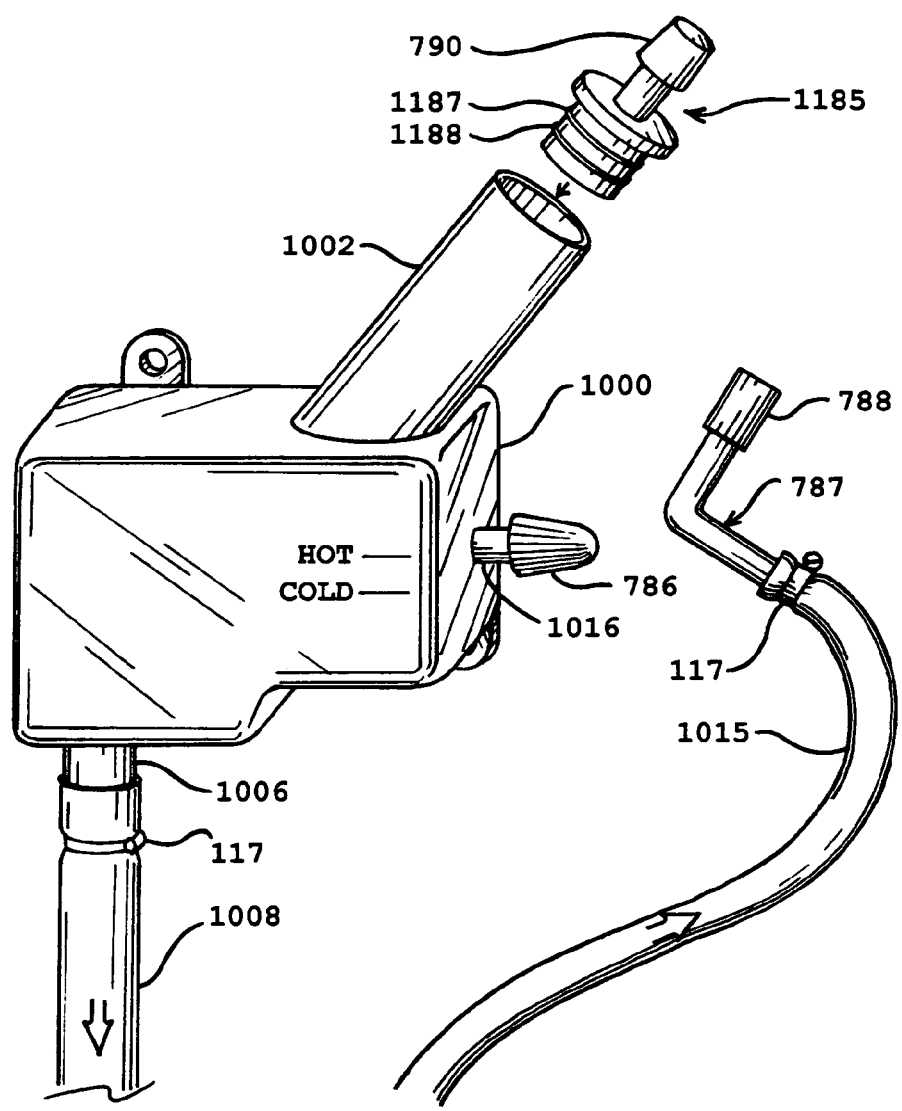
FIG. 12 depicts the remote reservoir system of FIG. 11 with a set of special adapters connected to provide quick connection to the fluid exchange device.
Figure 13:
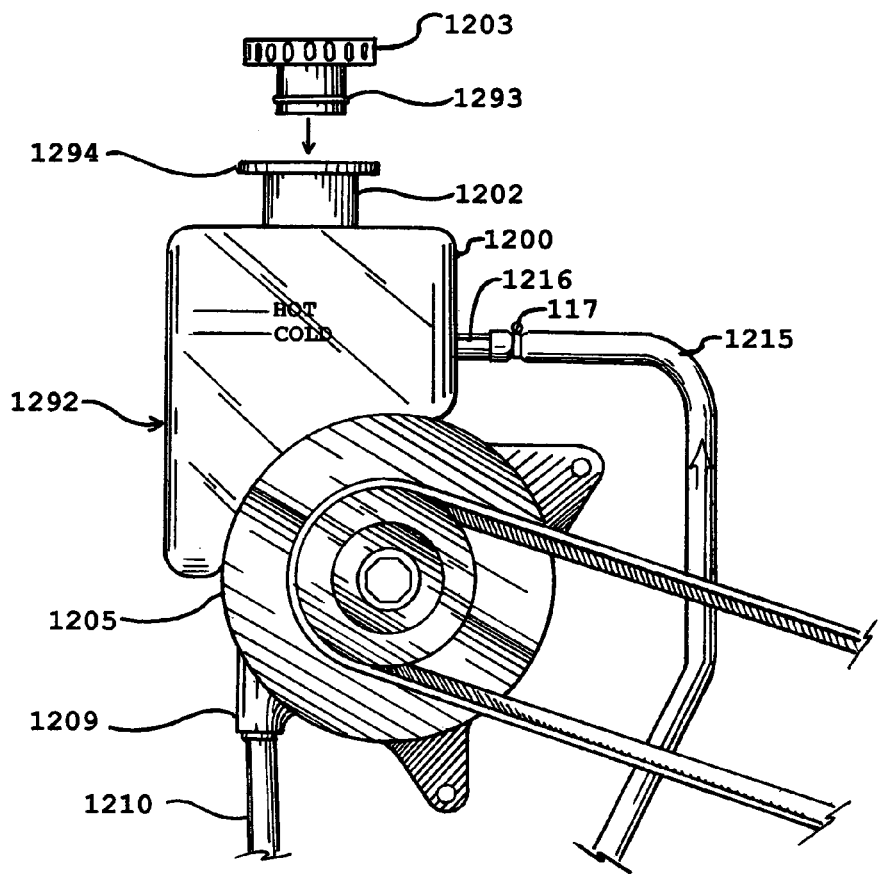
FIG. 13 depicts a specific style of reservoir/pump combination power steering system seen in certain late model Chrysler vehicles.
Figure 14:
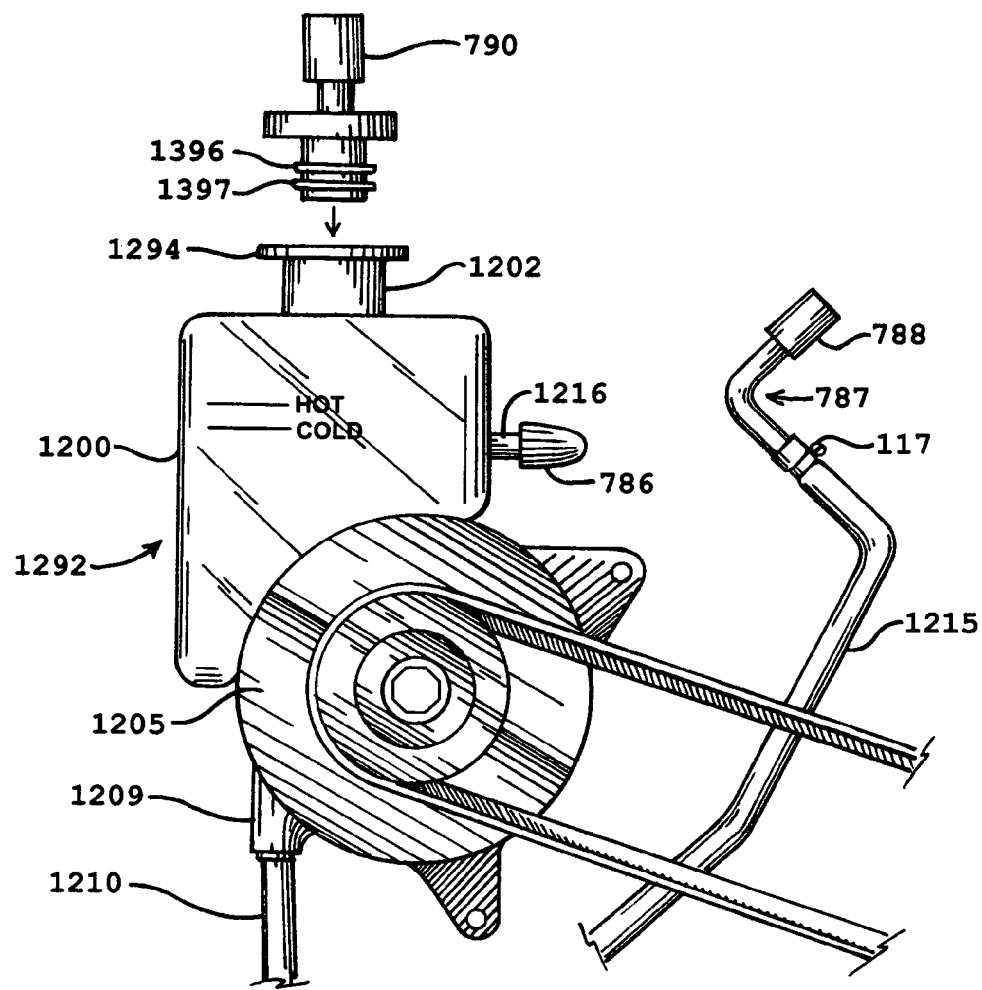
FIG. 14 depicts the remote reservoir system of FIG. 13 with a special set of adapters installed to provide quick connection to the fluid exchange device.
Figure 15:
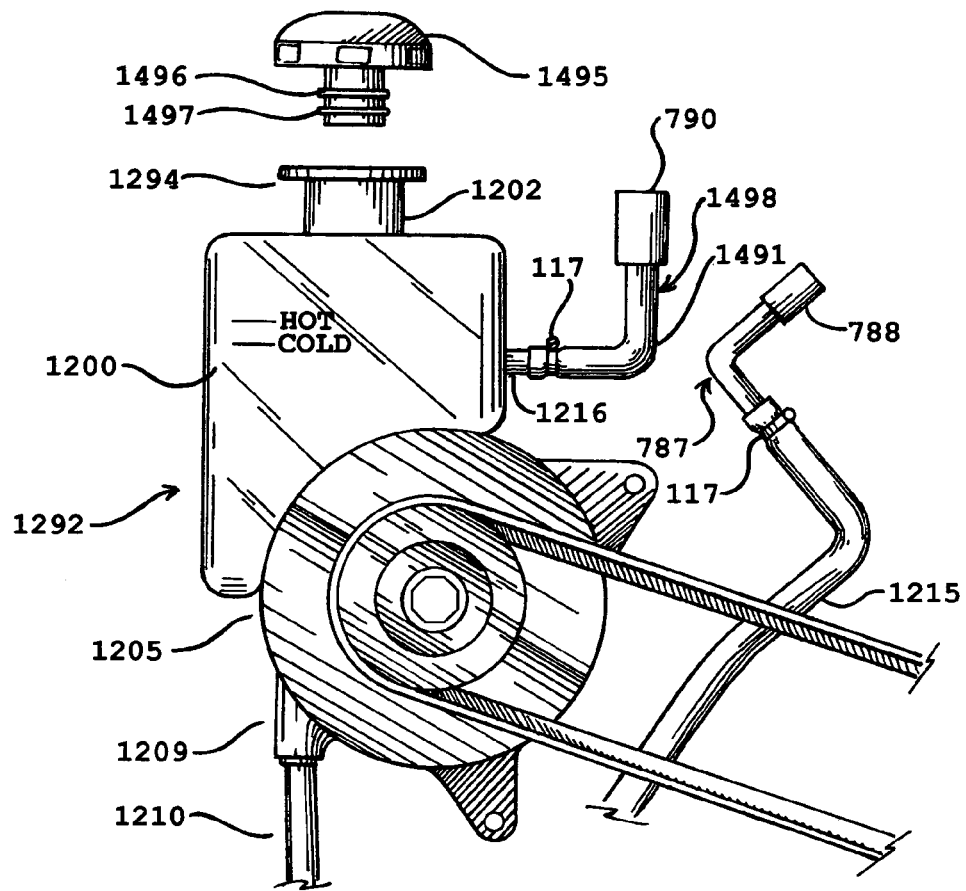
FIG. 15 depicts the remote reservoir system of FIG. 13 with a set of special adapters installed to provide an alternative quick connection to the fluid exchange device.

FIG. 12 depicts the connection of the invention's special adapters to the power steering system shown in FIG. 13 which allows a quick connection of the fluid exchanger 325 to that power steering system. FIGS. 14 & 15 depict the connection of the inventions special adapters to the power steering system shown in FIG. 13 which allow a quick connection of the fluid exchanger 325 to that power steering system.

FIG. 12 depicts the adapters used to establish proper connective arrangement between the remote reservoir system of FIG. 11 and the power steering fluid exchanger 325 of FIG. 3. A cap adapter 1185 is specially manufactured to fit snugly into filler neck 1002 to provide an air and fluid tight seal when inserted into filler neck 1002. Cap adapter 1185 is provided with an O'ring 1187 and an O'ring 1188 and is also provided with the large quick connect 790. The original equipment cap 1003 of FIG. 11 is removed and set aside until the completion of the fluid exchange procedure. Cap adapter 1185 is installed in filler neck 1002. Hose clamp 117 is loosened and hose end 1015 is pulled away from reservoir return port 1016. The 3/8 male tube adapter 787 of FIG. 8 is inserted into hose end 1015 and sealingly secured with hose clamp 117 and has small quick connect 788. Port plug 786 of FIG. 8 is installed on reservoir return port 1016 to provide an air and fluid tight seal to reservoir return port 1016. Pump supply conduit 1008 is left attached to reservoir 1000. Reservoir 1000 is topped off about halfway up filler neck 1002, and cap adapter 1185 is pushed down and into filler neck 1002, where is provides an air tight seal with almost no air left in filler neck 1002. Connection of the adapters to the power steering fluid exchanger 325 is quickly instituted by connecting the large female quick connect 367 of fresh fluid exchange hose 366 of FIG. 3 to the large male quick connect 790 of cap adapter 1185, and by connecting the small female quick connect 355 of used fluid exchange hose 354 to the small male quick connect 788 of the 3/8 male tube adapter 787. Any air left in filler neck 1002 quickly rises upward to vent into the fresh fluid reservoir 328 and is replaced by fresh fluid 329 draining down into filler neck 1002 through cap adapter 1185 as soon as the large female quick connect 367 of fresh fluid exchange hose 366 is connected to the large male quick connect 790 of cap adapter 1185.

FIG. 13 depicts the specific style of reservoir-pump combination system seen in certain late model Diamler-Chrysler manufactured vehicles. A reservoir-pump combination 1292 has a reservoir 1200 which is comprised of translucent plastic with a fill spout 1202 and a cap retainer ring 1294 which has locking tab grooves (not shown). Fill spout 1202 has a cap 1203 which is fitted with an O'ring 1293. Cap 1203 also has locking tabs (not shown) which matingly and securely engage the locking tab grooves of cap retainer ring 1294. Reservoir 1200 has a reservoir return port 1216 to which hose end 1215 is sealably secured with a hose clamp 117. A pressure conduit 1210 is connected to a pump outlet port 1209 of a power steering pump 1205.

FIG. 14 depicts the adapters used to establish proper connective arrangement between the reservoir-pump combination system of FIG. 13 and the power steering fluid exchanger 325 of FIG. 3. A cap adapter 1395 is specially manufactured to fit snugly into filler neck 1202 to provide an air and fluid tight seal when inserted into filler neck 1202. Cap adapter 1395 is provided with an O'ring 1396 and an O'ring 1397 and is also provided with the large quick connect 790. The original equipment cap 1203 of FIG. 13 is removed and set aside until the completion of the fluid exchange procedure. Hose clamp 117 is loosened and hose end 1215 is pulled away from reservoir return port 1216. Port plug 786 of FIG. 8 is installed on reservoir return port 1216 to provide an air and fluid tight seal to reservoir return port 1216. The 3/8 male tube adapter 787 of FIG. 8 is inserted into hose end 1215 and sealingly secured with hose clamp 117. The 3/8 male tube adapter 787 has small quick connect 788. Cap adapter 1395 is then installed into filler neck 1202. Reservoir 1200 is topped off about halfway up filler neck 1202, and cap adapter 1395 is pushed down and into filler neck 1202, where it provides an air and fluid tight seal with almost no air left in filler neck 1202. Any air left in filler neck 1202 quickly rises upward to vent into the fresh fluid reservoir 328 and is replaced by fresh fluid 329 draining down into filler neck 1202 through cap adapter 1385 as soon as the large female quick connect 367 of fresh fluid exchange hose 366 is connected to the large male quick connect 790 of cap adapter 1185.

Connection of the adapters to the power steering fluid exchanger 325 is instituted by connecting the large female quick connect 367 of fresh fluid exchange hose 466 of FIG. 3 to the large male quick connect 790 of cap adapter 1395, and by connecting the small female quick connect 355 of used fluid exchange hose 354 to the small male quick connect 788 of the ⅜ male tube adapter 787. Pressure conduit 1210 is left connected to pump outlet port 1209.

FIG. 15 depicts the adapters used to establish an alternative type of connective arrangement between the remote reservoir system of FIG. 13 and the power steering fluid exchanger 325 of FIG. 3. A special sealed cap 1495 is non-vented and is constructed to provide an air and fluid tight seal to filler neck 1202 during the fluid exchange. Cap 1495 has locking tabs (not shown) which matingly engage locking tab grooves of cap retainer ring 1294 (not shown). Cap 1495 is provided with an O'ring 1496 and an O'ring 1497. The original equipment cap 1203 of FIG. 13 is removed and set aside until the completion of the fluid exchange procedure. Cap 1495 is installed in filler neck 1202. Hose clamp 117 is loosened and hose end 1215 is pulled away from reservoir return port 1216. The ⅜ male tube adapter 787 is inserted into hose end 1215 and sealingly secured with hose clamp 117. The ⅜ male tube adapter 787 of FIG. 8 has small quick connect 788. A ⅜ female hose adapter 1498 is pushed on over reservoir return port 1216 and sealingly secured with hose clamp 117. The ⅜ female hose adapter 1498 is provided with large male quick connect 790. Reservoir 1200 is topped off about halfway up filler neck 1202, and cap adapter 1495 is slowly pushed down to displace almost all of any air remaining in filler neck 1202, where it provides an air and fluid tight seal. Connection of the adapters to the power steering fluid exchanger 325 is instituted by connecting the large female quick connect 367 of fresh fluid exchange hose 366 of FIG. 3 to the large male quick connect 790 of ⅜ female adapter 1498, and by connecting the small female quick connect 355 of used fluid exchange hose 354 to the small male quick connect 788 of the ⅜ male tube adapter 787.

Figure 16:
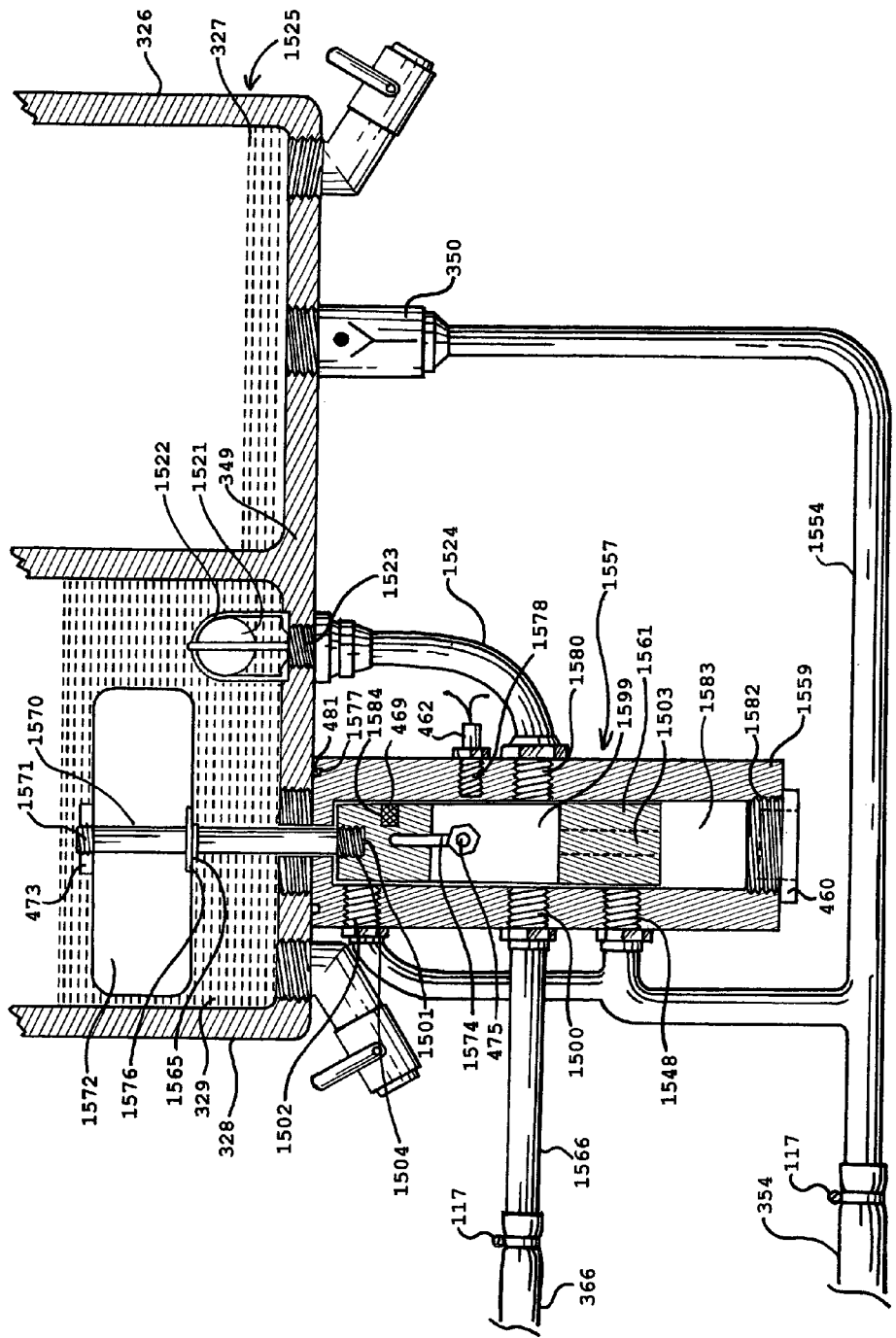
FIG. 16 depicts the invention in an embodiment of an alternative positive pressure assisted mechanical/hydraulic fluid control valve and its parts arrangement showing the valve operating with its slide in the upper position.
Figure 17:
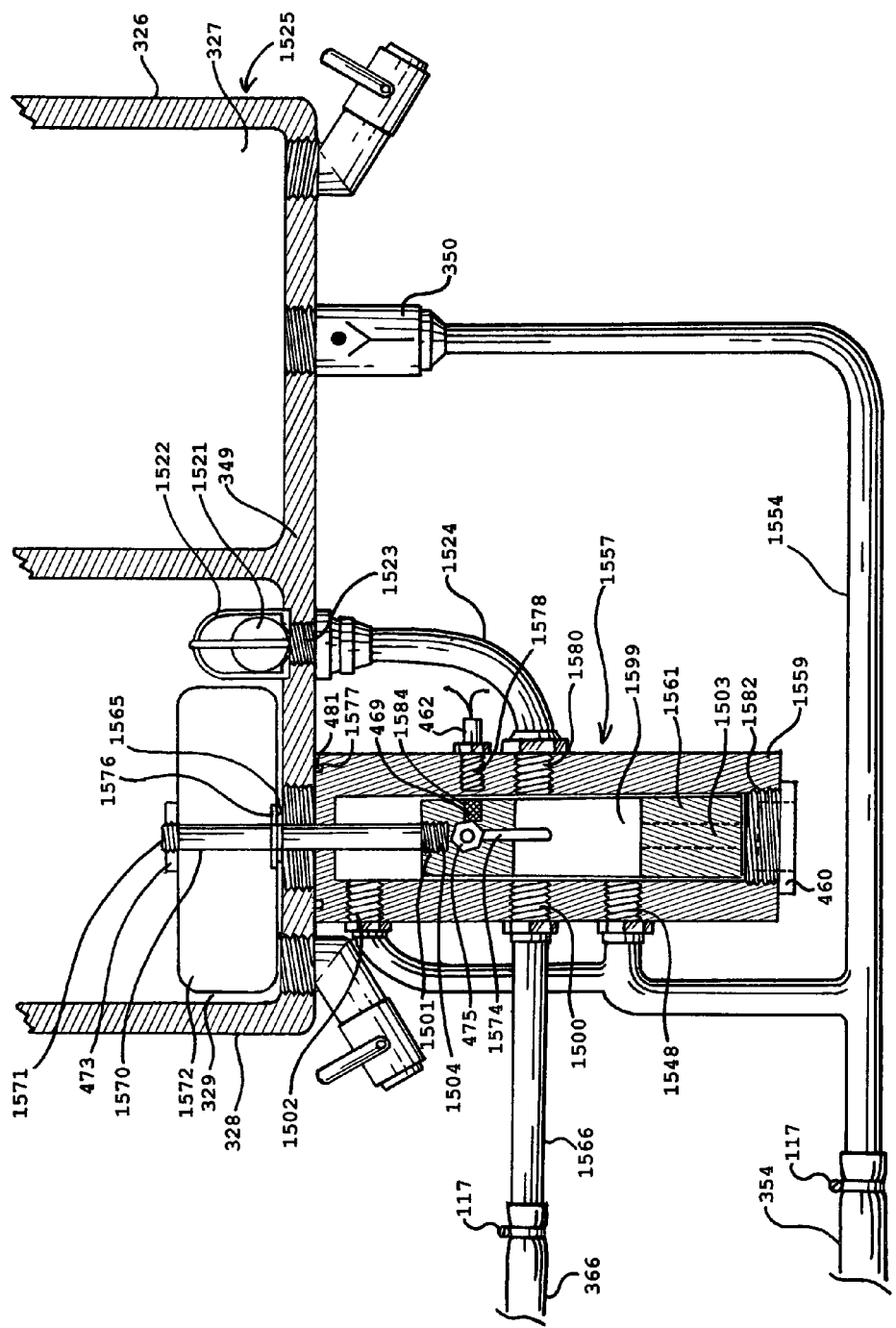
FIG. 17 depicts the embodiment of FIG. 16 with its mechanical/hydraulic fluid control valve operating with its slide in the lower position.

FIGS. 16-17 depict another embodiment of the invention, fluid exchanger 1525 which features a fluid control valve 1557 which is operated by a float 1572, the operation of which is assisted by positive pressure provided by the power steering pump through its outlet port. FIGS. 16 & 17 depict the detailed construction of fluid control valve 1557 and its parts arrangement, as does FIG. 18, which shows an exploded perspective view of fluid control valve 1557 with float 1572. FIGS. 16 & 17 show only the approximate lower half of a fluid exchanger 1525 without the skirt base 340 of FIG. 3. Fresh fluid reservoir 328, used reservoir 326, bottom common wall 349, fresh fluid exchange hose 366, used fluid exchange hose 354, and check valve 350 are the same as depicted in FIG. 3. The parts of fluid exchanger 1525 which are not shown in FIGS. 16 & 17 are the same as those shown in FIGS. 7 & 9, with the exception of fluid control valve 1557, a used fluid conduit assembly 1554, a fresh fluid supply conduit 1524, and a fresh fluid conduit 1566, and minor differences to float 1572, and to a float shaft 1570.

Figure 18:
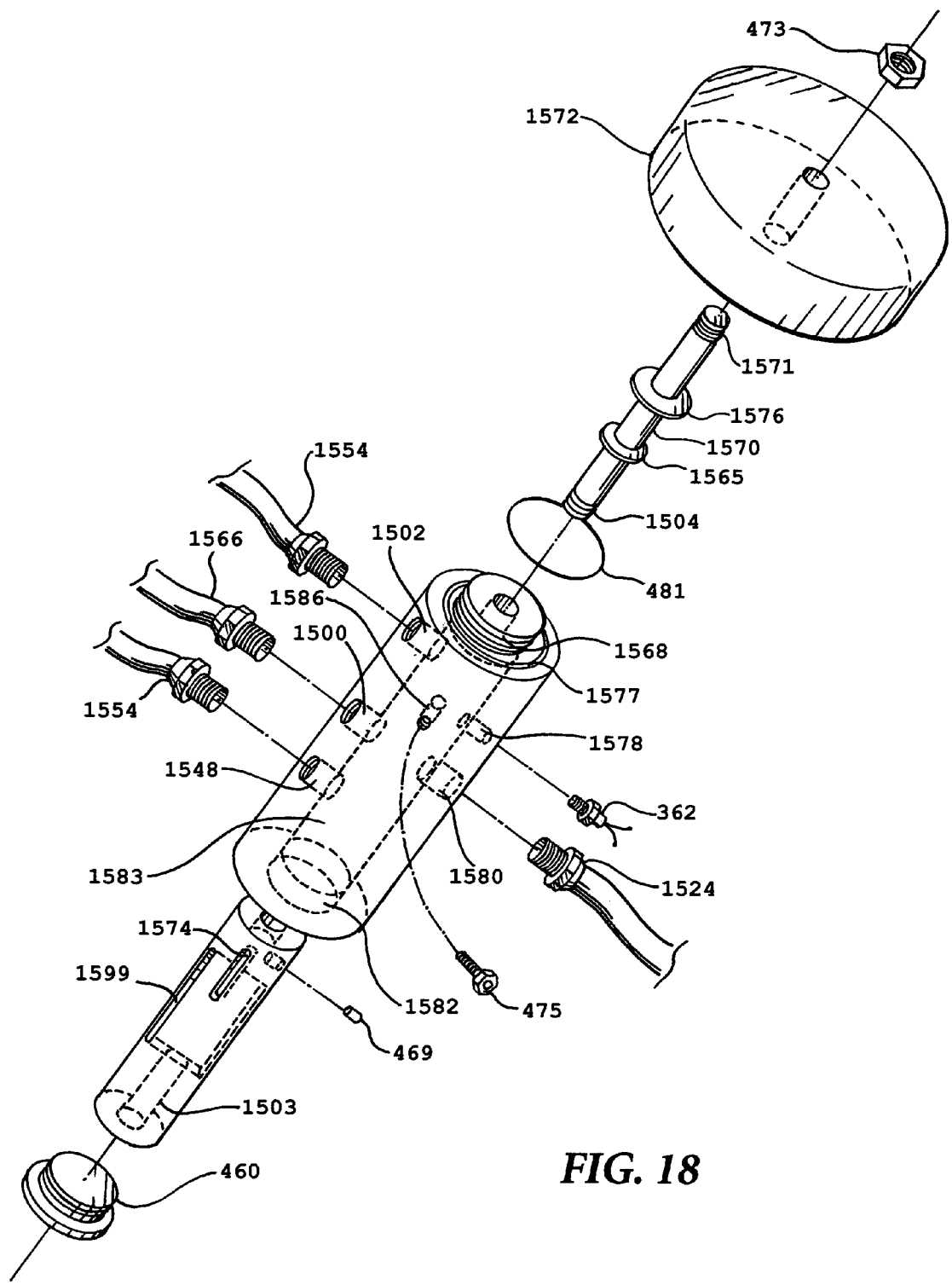
FIG. 18 depicts an exploded, perspective view of the embodiment of FIG. 16.

FIGS. 16 & 17 show a side view and with FIG. 18 showing an exploded perspective view. All the parts of FIG. 18 are visible in FIGS. 16 & 17 with the exception of a threaded orifice 1586. FIG. 18 shows alignment pin 475 and O'ring 481 from a side and perspective view which is more revealing than FIGS. 16-17. Fluid control valve 1557 has a valve body 1559 which has a valve bore 1583, a threaded top end 1568 and a female thread 1582 which receives a threaded hex plug 460 which has an O'ring installed. Fluid control valve 1557 as shown in FIG. 16 has a valve slide 1561 that is shown in its upper position, which places valve 1557 in operative condition to exchange the fluid of the power steering system being serviced (not shown) when properly connected and the engine is operated. Fresh fluid reservoir 328, used reservoir 326, bottom common wall 349, fresh fluid exchange hose 366, used fluid exchange hose 354, and check valve 350 are the same as depicted in FIG. 3.

In FIGS. 16-17, the power steering fluid exchanger 1525 has a float operated automatic fluid control valve 1559 which uses positive fluid pressure to assist the movement of a valve slide 1561 downward and the sealing off from fresh fluid reservoir 328 by positive pressure provided to used fluid 327 by the power steering pump as it is discharged through its outlet port and delivered through the steering mechanism and the used fluid exchange hose 354 to communicate with the top side of valve slide 1561 of control valve 1557 through fluid power port 1502 as valve slide 1561 first drops a short distance to partially open fluid power port 1502.

Float 1572 is constructed of an air tight, air containing thin walled brass formed container which is brazed at its bottom seam (not shown) and has an open center which is suitably formed to mate with the top portion of float shaft 1570, which has a upper threaded end 1571 and a lower threaded end 1504 with lower threaded end 1504 matingly screwed into a threaded orifice 1501 at the top side of valve slide 1561. Flat shaft 1571 has a collar 1576 integral to it which supports float 1572 and which has a seal 1565 placed underneath it. Seal 1562 in this instance is an O'ring of the approximate diameter of float shaft 1570 and installed snugly on it under collar 1576. Seal 1562 is constructed of Viton® and is pinched between collar 1576 and threaded top end 1658 of valve body 1559 when valve slide 1561 is forced downward under the positive pressure provided to the top side of slide 1561 through fluid power port 1502. Upper threaded end 1571 of float shaft 1570 has retainer nut 453 matingly screwed onto it after float 1572 is placed onto float shaft 1570 to rest tight against the top side of the collar 1576 of float shaft 1570.

Valve slide 1561 is slidingly received in a valve bore 1583 of a valve body 1559 of control valve 1557. Valve bore 1583 is segmented with the very top portion short in length having a narrow diameter suitable to slidingly receive float shaft 1570 with approximately 0.010 inch sidewall clearance, and with the longer bottom portion much longer in length and having a much larger diameter which is suitable to receive valve slide 1561 with approximately 0.010 inch sidewall clearance.

There are other materials and methods which can be used to construct float 1572 which are suitably buoyant and structurally strong enough and resistant enough to power steering fluid for a long and reliable service life. Some suitable alternate materials are various types of plastics which can be molded and filled with air or light weight foam plastic. Float 1572 is large enough to contain an adequate volume of air to provide enough buoyancy in power steering fluid 329 to be able to overcome the total weight of valve slide 1561 with its float shaft 1570, retainer nut 473, and float 1572 to reliably raise and hold valve slide 1561 in its upper position when fresh fluid reservoir 328 contains even a minimum volume of fresh fluid 329 of at least ½ quart. Additionally, the total weight of valve slide 1561, float 1572, and float shaft 1570 with its retainer nut 473 must be heavy enough to move valve slide 1561 downward at or close to its lowest position when the supply of fresh fluid 329 is depleted and the buoyancy of float 1772 is thereby removed. In this embodiment the float dimensions are approximately 6 inches in diameter by 2 inches thick.

Float shaft 1570 is comprised of cold rolled steel for weigh, strength and resistance to bending, but a number of other materials can be suitably selected such as brass, aluminum alloy, magnesium alloy, and various other types of steel, refined metals and formed plastics. Valve body 1559 and valve slide 1561 are machined from aircraft grade aluminum alloy stock for lightness, strength, durability, and ease of machining, however a number of other materials including cold rolled steel, brass, acrylic plastics and other plastic compounds can be suitably selected as alternatives for constructing valve body 1559, valve slide 1561 and float shaft 1570.

Valve slide 1561 is provided with an orifice 1584 which receives a magnet 469 which is securely glued in place with an epoxy glue that is suitably resistant to power steering fluid. Valve slide 1561 is also provided with an alignment groove 1574 which sliding receive the smooth ground end of a middle threaded alignment pin 475 which is screwed into a threaded orifice 1586 (shown in FIG. 18) which penetrates from the outside of valve body 1559 inward toward valve bore 1583 no closer than 0.050 inch. Threaded orifice 1586 is provided with middle threaded alignment pin 475 which is screwed into it with its smooth ground smaller diameter end penetrating into valve bore 1583 the proper distance to slidingly engage alignment groove 1574 of valve slide 1561. Middle threaded alignment pin 475 is sealed to be fluid tight by using a suitable anaerobic hydraulic sealer or other hydraulic sealer which is suitably resistant to power steering fluid. Valve slide 1561 cannot rotate in valve bore 1583 because the alignment groove 1574 can only slide vertically around the smooth end of middle threaded alignment pin 475.

Valve body 1559 is provided with a threaded orifice 1578 from its outside which extends to about 0.050 inch less than valve bore 1583. Threaded orifice 1578 matingly receives a magnetically operated micro-switch 462 which is matingly threaded. Valve body 1559 is provided with a vertically running fluid vent channel 1503 which runs from the center of the bottom side of valve slide 1561 upward into a fluid channel 1599. The fluid vent channel 1503 prevents valve slide 1561 from become hydro-locked in valve bore 1583 and allows it to travel up and down without undue restriction. Valve body 1559 is fitted with four fluid ports, a fresh fluid delivery port 1500, a used fluid inlet port 1548, a fluid power port 1502, and a fresh fluid inlet port 1580. The top large edge of valve body 1559 which is located just under threaded top end 1568 is provided with an O'ring gland 1577 which receives O'ring 481 to provide adequate sealing of valve body 1559 to the fresh fluid reservoir 328.

Valve slide 1561 is fitted with fluid channel 1599 extending from fresh fluid inlet port 1580 to fresh fluid delivery port 1500 which establishes fluid communication between these two ports when suitably positioned. A used fluid conduit assembly 1554 establishes communication between used fluid exchange hose 354, check valve 350, used fluid inlet port 1548, and fluid power inlet port 1502. A fresh fluid conduit assembly 1566 establishes communication between fresh fluid exchange hose 366 and fresh fluid delivery port 1500. Fresh fluid exchange hose 366 is inserted over the non-port end of fresh fluid conduit assembly 1566 and sealingly secured with hose clamp 117. Used fluid exchange hose 354 is inserted over the non-port end of used fluid conduit assembly 1554 and sealingly secured with hose clamp 117.

Bottom common wall 349 of fluid exchanger 1525 is provided with a fresh fluid supply port 1523 at the bottom right of fresh fluid reservoir 328. Fresh fluid supply port 1523 is provided with a welded wire float cage 1522 which contains a float ball 1521 of approximately 1¼ inch diameter. Float ball 1521 sealingly closes off fresh fluid supply port 1523 when in reaches its lower position when the supply of fresh fluid 329 becomes depleted. In this instance float ball 1521 is a hollow sphere comprised of acrylic plastic with a wall thickness of approximately 0.050. Float ball 1521 as constructed to hold air inside is lighter than power steering fluid. Float ball 1521 can alternatively be comprised of a number of other suitable materials which are lighter than power steering fluid when filled with air such as various types of plastic and metals including nylon, aluminum alloy, thin walled steel or other alloys as long as its outside surface it substantially spherical with a smooth surface. Float ball 1521 must be strong enough not to collapse when the low pressure of the power steering pump is applied to its lower side upon depletion of the supply of fresh fluid 329. The top side of fresh fluid supply port 1523 is concave to sealingly receive float ball 1521 and has a rubber like surface vulcanized to its sealing surface for float ball 1521 which in this embodiment is comprised of viton® or nitrile material. A fresh fluid supply conduit 1524 connects fresh fluid supply port 1523 and fresh fluid inlet port 1580. Each of the ports of valve body 1559 as well as the outlet port of check valve 350 is fitted with SAE type male fittings to which each has a female tube nut holding a flared end of a conduit to be sealingly secure. These SAE type fittings, tube nuts and flared conduit ends are not shown but understood by those of average skill in the art. Used fluid conduit assembly 1554, fresh fluid conduit assembly 1566, and fresh fluid supply conduit 1524 are in this instance comprised of extruded hydraulic steel tubing. There are however a number of other alternative materials which can be used to construct used fluid conduit assembly 1554, fresh fluid conduit 1566, and fresh fluid supply conduit 1524 such as polyethylene plastic and other types of suitable plastic tubing, nylabraid® type hose, copper tubing, aluminum tubing, and various types of rubber hose which are resistant to power steering fluid if suitably compatible fittings are provided with such alternate materials.

In FIG. 16 valve slide 1561 is shown in its upper position. When valve slide 1561 is in its upper position, it blocks used fluid inlet port 1548 and fluid power port 1502. This upper position establishes a connection between the fresh fluid supply port 1523 and fresh fluid delivery port 1500 through fresh fluid supply conduit 1524 and fluid channel 1599 of valve slide 1561 and this connects fresh fluid supply conduit 1524 and fresh fluid exchange hose 361 through fresh fluid conduit 1566 which establishes communication between the fresh fluid reservoir 328 and the inlet port of the power steering pump (not shown).

In FIG. 17 valve slide 1561 is shown in its lower position. When valve slide 1561 is shown in its lower position, it blocks used fluid inlet port 1548, opens fluid power port 1502, and keeps fresh fluid inlet port 1580 and fresh fluid delivery port 1500 open. This lower position establishes a connection between the used fluid inlet port 1548 and fresh fluid delivery port 1500 through fluid channel 1599 of valve slide 1561, while maintaining fluid communication between fluid fresh fluid delivery port 1500, channel 1599 and fresh fluid supply port 1523. As soon as float ball 1521 drops as the supply of fresh fluid 329 becomes depleted to become sealingly positioned onto the top side of fresh fluid supply port 1523, fluid communication between fresh fluid inlet port 1580 and the fresh fluid reservoir 328 through fresh fluid supply port 1523 is blocked.

The connection between the used fluid inlet port 1548 and fresh fluid delivery port 1500 through fluid channel 1599 of valve slide 1561 connects used fluid conduit assembly 1554 to fresh fluid conduit 1566 which establishes fluid communication between used fluid exchange hose 354 and fresh fluid exchange hose 361 which established a closed fluid circulation circuit between the used fluid outlet of the power steering pump and its inlet port. This closed fluid circulation circuit does not have a functional reservoir, is not connected to either the fresh fluid reservoir or the used fluid receiver, and is not vented.

FIG. 18 shows fluid control valve 1557, its float 1572, and float rod 1570 from an exploded perspective view which is more revealing.

Figure 19:
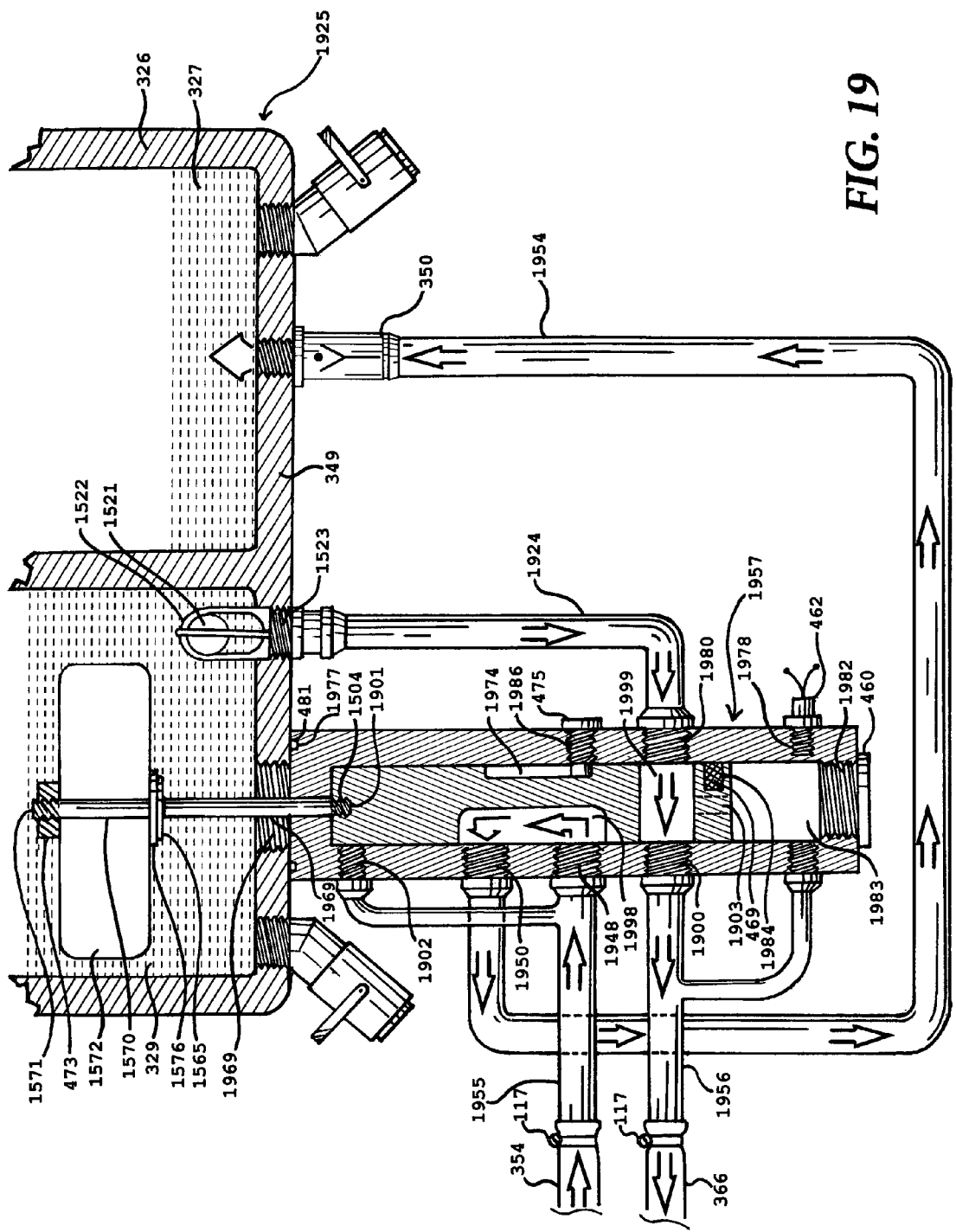
FIG. 19 depicts the detailed construction of a mechanical/hydraulic fluid control valve of an alternative embodiment and its parts arrangement showing the valve operating with its slide in the upward position.
Figure 20:
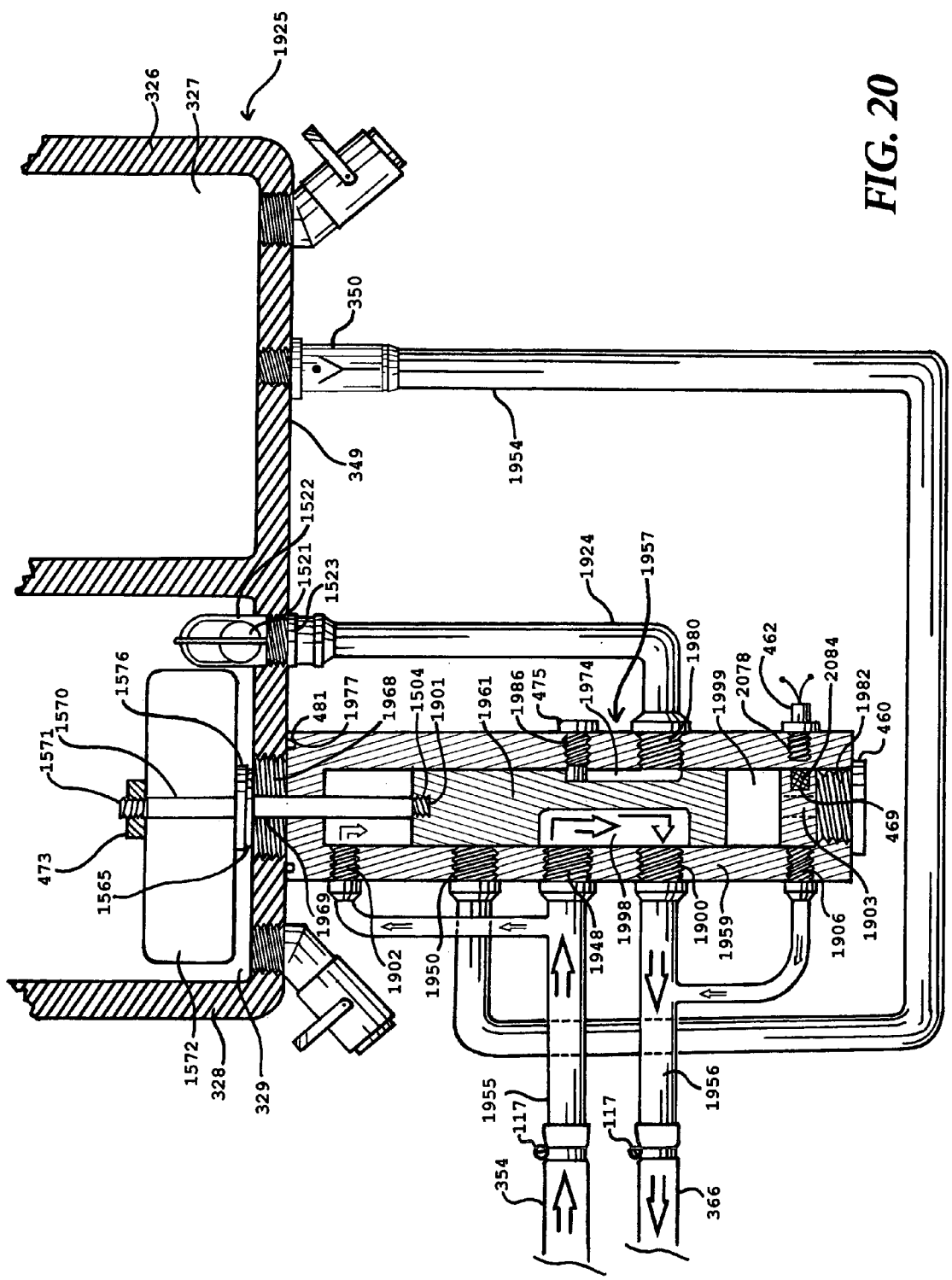
FIG. 20 depicts the detailed construction of a mechanical/hydraulic fluid control valve of an alternative embodiment and its parts arrangement showing the valve operating with its slide in the downward position.

In FIGS. 19 & 20 depict the detailed construction of a fluid control valve 1957 and its parts arrangement which is another alternate embodiment of the invention, fluid exchanger 1925. Fluid control valve 1957 is operated by float 1572, the operation of which is assisted by both negative and positive pressure provided by the power steering pump. FIGS. 19 & 20 show only the approximate lower half of a fluid exchanger 1525 without the skirt base 340 of FIG. 3. Fresh fluid reservoir 328, used reservoir 326, bottom common wall 349, fresh fluid exchange hose 366, and used fluid exchange hose 354 are the same as depicted in FIG. 3. The used fluid receiver 326 is fitted with a check valve 350 at bottom common wall 349 through which used fluid 327 is delivered through.

The fresh fluid reservoir 328 is fitted with a fresh fluid supply port 1923 at bottom common wall 349 which has a float ball 1521 contained in a wire cage 1522. Fresh fluid supply port 1923 is suitably countersunk on its top side and coated with a Viton® coating of approximately 0.025 inch which is vulcanized to the top side of fresh fluid supply port 1923 adhere. This allows float ball 1521 to seal nicely against fresh fluid supply port 1923 when the fresh fluid supply 329 is depleted. Fluid control valve 1957 has a used fluid conduit assembly 1955, a used fluid conduit 1954, a fresh fluid supply conduit 1924, a fresh fluid conduit assembly 1956, and a valve body 1959 which has a used fluid outlet port 1950, a used fluid inlet port 1948, a fresh fluid outlet port 1900, a fresh fluid inlet port 1980, a power port 1906, and a fluid power port 1902. Used fluid conduit 1954 connects check valve 350 to used fluid outlet port 1950.

Used fluid exchange hose 354 is sealingly secured to used fluid conduit assembly 1955 by hose clamp 117 which connects the used fluid exchange hose 354 to fluid power port 1902 and to used fluid inlet port 1948. Fresh fluid exchange hose 361 is sealingly secured to fresh fluid conduit assembly 1956 by hose clamp 117 which connects fresh fluid outlet port 1900 and power port 1906 to fresh fluid exchange hose 366. Valve body 1959 has a valve bore 1983 which is fitted with a valve slide 1961 with a total clearance of 0.010 inch. Valve body 1959 has an O'ring gland 1977 which receives an O'ring 481 which is comprised of either nitrile or Viton®. Valve body 1959 a threaded top end 1968 which is installed into a threaded female port of bottom common wall 349 at the fresh fluid reservoir 328. Valve body 1959 has a top small bore 1969 which slidingly receives float shaft 1570. Float shaft 1570 has an integral collar 1576 and is fitted with seal 1565 underneath it which is an O'ring comprised of either nitrile or Viton®. Float shaft 1570 has float 1572 inserted on top of rim 1576 and secured with retainer nut 473 which is screwed on at the upper threaded end 1571 of float shaft 1570. Valve body 1959 is provided with threaded orifice 1986 which threadingly receives middle threaded alignment pin 475. Valve body 1959 is provided with a female thread 1982 which receives threaded hex plug 460. Valve body 1959 is provided with a threaded orifice 1978 which penetrates the valve body from the outside no closer than 0.050 inch to the valve bore 1983.

Threaded orifice 1978 receives magnetically operated micro-switch 462. Valve slide 1961 is provided with an alignment groove 1974 which slidingly receives the smooth ground narrowed end of alignment pin 475. Valve slide 1961 is provided with a threaded orifice 1901 which receives lower threaded end 1504 of float shaft 1570. Valve slide 1961 is provided with a cross fluid channel 1999, a side fluid channel 1998, a fluid vent 1903 at its lower end, and an orifice 1984 which receives a magnet 469.

In FIG. 19 valve slide 1961 is shown in its upper position. When valve slide 1961 is in its upper position it establishes a connection between the fresh fluid supply port 1923 and fresh fluid outlet port 1900 through fresh fluid inlet port 1980 and fluid channel 1999 of valve slide 1961. This connects fresh fluid supply conduit 1924 and fresh fluid exchange hose 361 through fresh fluid conduit 1956 which establishes communication between the fresh fluid reservoir 328 and the inlet port of the power steering pump (not shown). Fluid power port 1902 is blocked by valve slide 1961. Power port 1906 is open to valve bore 1983, but is neutralized by fluid vent 1903 when slide 1961 is in its upper position.

In FIG. 20 valve slide 1961 is shown in its lower position. When valve slide 1961 is shown in its lower position, it blocks fresh fluid inlet port 1980 and used fluid outlet port 1950 and opens fluid power port 1902. This lower position establishes a connection between the used fluid inlet port 1948 and fresh fluid delivery port 1900 through side fluid channel 1998 of valve slide 1961. This connects used fluid conduit assembly 1955 to fresh fluid conduit 1956 which establishes fluid communication between used fluid exchange hose 354 and fresh fluid exchange hose 366 which is a closed fluid circulation circuit between the used fluid outlet of the power steering pump and its fresh fluid inlet.

Figure 21:
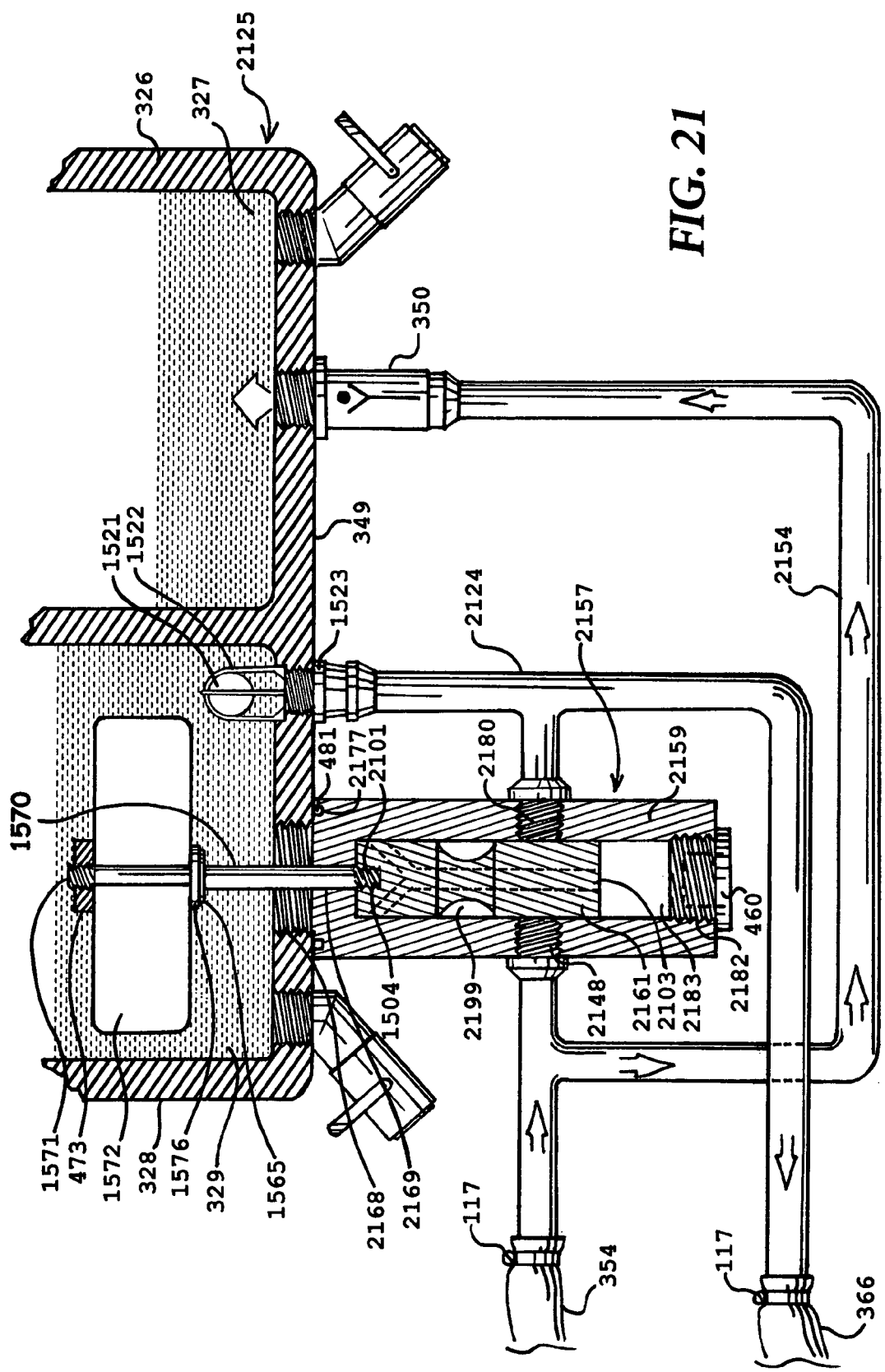
FIG. 21 depicts the detailed construction of an alternative and basic embodiment and its parts arrangement which features a simple, economical fluid control valve.

FIG. 21 depicts an alternative embodiment of a mechanical/hydraulic fluid control valve 2157 which is very basic and simple. FIG. 21 shows only the approximate lower half of a fluid exchanger 2125 without the skirt base 340 of FIG. 3. Fresh fluid reservoir 328, used reservoir 326, bottom common wall 349, fresh fluid exchange hose 366, and used fluid exchange hose 354 are the same as depicted in FIG. 3. The used fluid receiver 326 is fitted with a check valve 350 at bottom common wall 349 through which used fluid 327 is delivered. The fresh fluid reservoir 328 is fitted with a fresh fluid supply port 1523 which is constructed of brass and is installed at bottom common wall 349. Fresh fluid supply port 1523 has a wire float cage 1522 which contains a float ball 1521 which can be molded of rigid acrylic plastic or nylon with a hollow core and when sealingly filled with air is buoyant in power steering fluid. Port 1523 is suitably countersunk and coated with a Viton® coating of approximately 0.025 inch which is vulcanized to adhere. This allows float ball 1521 to seal nicely against port 1523 when the fresh fluid supply 329 is depleted. Fluid control valve 2157 has a valve body 2159 with a valve bore 2183, a female thread 2182 at the lower end which is countersunk at its outside edge to receive a threaded hex plug 460 which has an O'ring.

Valve body 2159 is provided with a valve slide 2161 which is fitted to valve bore 2183 to have an approximate sidewall clearance of 0.015 inch. Valve slide 2161 is provided with a fluid vent 2103 which runs from its bottom end to its top end where it expands toward the circumference into two vents, allowing the top of slide 2161 to be provided with a threaded orifice 2101. Threaded orifice 2101 receives float shaft 1570 at a lower threaded end 1504. Valve slide 2161 is provided with a fluid channel 2199. Valve body 2159 is provided with a threaded top end 2168 which is installed into a threaded female port of the lower sidewall of fresh fluid reservoir 328. Valve body 2159 is provided with an O'ring gland 2177 which receives O'ring 481 which provides a fluid and air tight seal between valve body 2159 and the fresh fluid reservoir 328 at the bottom common wall 349. Float shaft 1570 is provided an integral collar 1576 and with upper threaded end 1571 which receives retainer nut 473 after float 1572 is inserted on float shaft 1570. Float shaft 1570 has seal 1565 installed snugly underneath rim 1576. Valve body 2159 is provided with a used fluid outlet port 2180, a used fluid inlet port 2148, and a top small bore 2169 which slidingly receives the lower part of float shaft 1570. A fresh fluid supply conduit 2124 is sealingly secured to fresh fluid exchange hose 366 by hose clamp 117 at one end and is connected to used fluid outlet port 2180 and fresh fluid supply port 1523 at its other ends. A used fluid conduit 2154 is sealingly secured to used fluid exchange hose 354 by hose clamp 117 at one end and is connected to used fluid inlet port 2148 and fresh fluid supply port 1523 at its other ends. Valve slide 2161 is shown in its upward position in FIG. 21 which shows it to be blocking communication between used fluid inlet port 2148 and used fluid outlet port 2180. When valve slide 2161 is in its downward position, fluid channel 2199 provides communication between used fluid inlet port 2148 and used fluid outlet port 2180, which establishes a closed fluid circulation circuit between the outlet port of the power steering pump and its inlet port.

Figure 22:
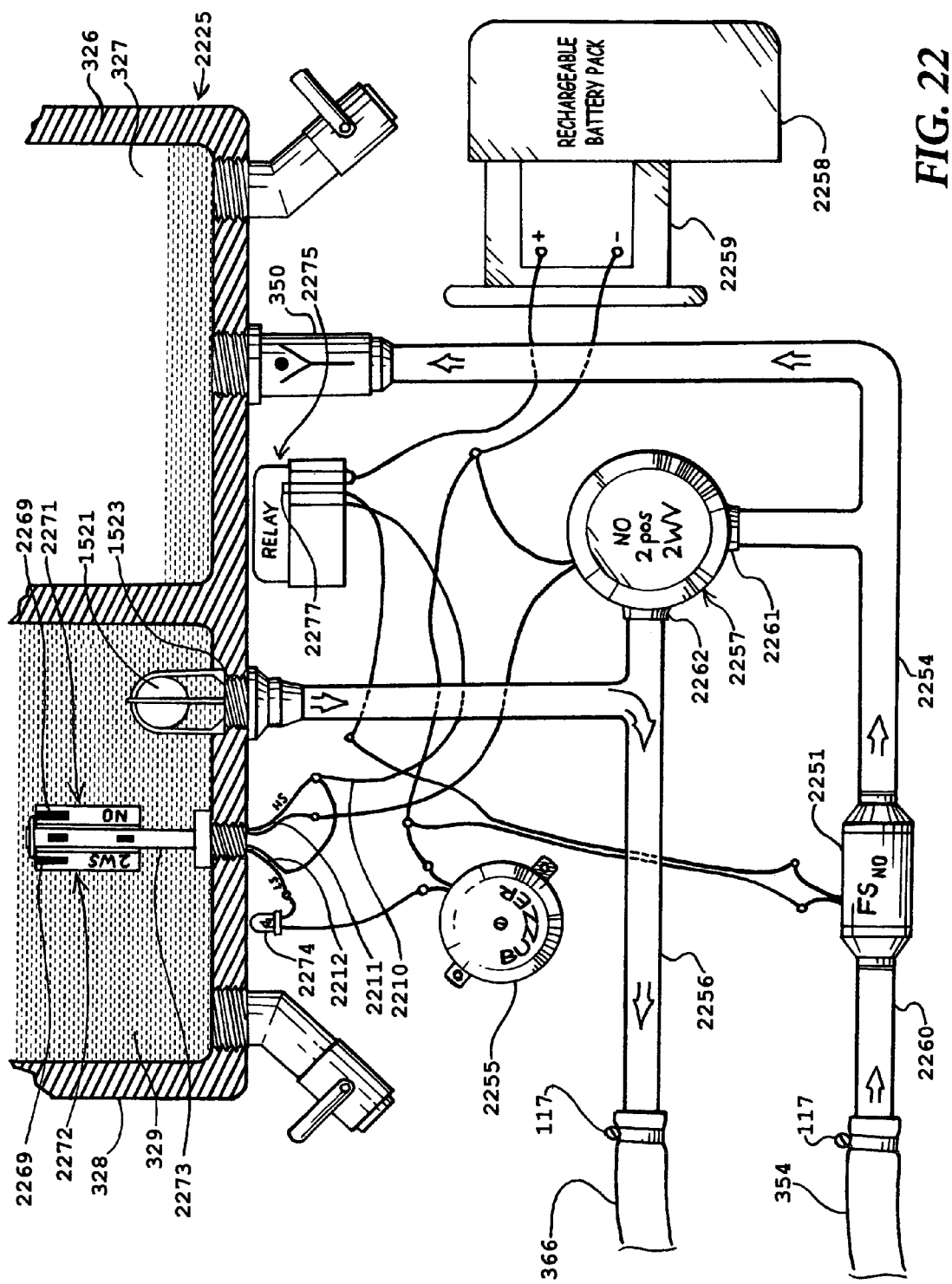
FIG. 22 depicts the detailed construction an alternative embodiment and its parts arrangement which features an electrical/hydraulic fluid control valve which features the use of a two-position two-way solenoid valve.

FIG. 22 depicts an alternative embodiment of an electrical/hydraulic fluid control valve 2257 which is controlled by a float switch assembly 2272. FIG. 22 shows only the approximate lower half of a fluid exchanger 2225 without the skirt base 340 of FIG. 3. Fresh fluid reservoir 328, used reservoir 326, bottom common wall 349, fresh fluid exchange hose 366, and used fluid exchange hose 354 are the same as depicted in FIG. 3. The used fluid receiver 326 is provided with a check valve 350 at bottom common wall 349 through which used fluid 327 is delivered.

The fresh fluid receiver 328 is provided with a fresh fluid supply port 1523 at bottom common wall 349 which can sealingly receive a float ball 1521 which is contained inside a wire cage 1522. Float switch assembly 2272 is sealingly secured to the inside of the lower wall of fresh fluid receiver 328 of bottom common wall 349. Float switch assembly 2272 has a float 2271 which is provided with a pair of magnets 2269 and a float shaft 2273 which contains two magnetically operated micro-switches (not shown), an upper micro-switch and a lower micro-switch, each which have contacts which are closed by a pair of magnets 2269 when the float is in an adjacent position. When float 2271 is in its upward position in response to the buoyancy provided by an adequate supply of fresh fluid 329, the pair of magnets 2269 close the upper micro-switch. When fresh fluid supply 329 becomes depleted float 2271 drops to its downward position and this causes the pair of magnets 2269 to leave the proximity of the top micro-switch of float shaft 2273 and then to be adjacent to the lower micro-switch to close its contacts. Each micro-switch has its own set of leads, the upper micro-switch has a pair of upper micro-switch wire leads 2211, and the lower micro-switch has a pair of lower micro-switch wire leads 2212. When fresh fluid supply 329 becomes depleted, float ball 1521 drops into fresh fluid supply port 1523 to seal it air and fluid tight. Fluid control valve 2257 is a two position electric solenoid operated valve with two fluid ports, an inlet port 2261 and an outlet port 2262. The solenoid of fluid control valve 2257 is 12 volt direct current (DC) operated and has a pair of wire leads, one hot and one neutral (some countries other than USA require an additional ground lead) and is spring fed to return to its default mode of operation when electric current is removed from its solenoid, which keeps an outlet port 2262 and an inlet port 2261 connected to establish a closed fluid circulation circuit between the outlet port of the power steering pump and its inlet port.

A used fluid conduit assembly 2254 connects check valve 350 with inlet port 2261 of fluid control valve 2257 and with a flow switch 2251 which has internal contacts which are closed only when fluid flows through it at the rate of 0.200 gallons per minute or more. A used fluid conduit 2260 is sealingly secured to used fluid exchange hose 354 by hose clamp 117 at one end and connected to float switch 2251 at it other end. A fresh fluid conduit assembly 2256 is sealingly secured to fresh fluid exchange hose 361 by hose clamp 117 at one end and connected at its other ends to outlet port 2262 of fluid control valve 2257 and to fresh fluid supply port 1523. The two wire leads of fluid control valve 2257 are connected with its neutral connected to the common ground of a battery pack 2258 and with its hot lead to a switched power lead 2210 of a relay assembly 2275 which is a 12 volt DC relay. A battery pack 2258 is provided to fluid exchanger 2225 and is 12 volts DC. Battery pack 2258 snaps into a battery pack socket 2259 which provides current to a relay assembly 2275. Relay assembly 2275 has a magnetic winding which when activated provides current from battery pack 2258 to a switched power lead 2210. Battery packs such as battery pack 2258 and battery pack sockets such as battery pack socket 1529 are used in many manufactured portable and rechargeable power drills and other electrically powered hand tools and are readily available. Battery pack 2258 can be removed from base 2270 for insertion in a suitable battery charger which is connected to a 115 volts alternating current (AC) electrical power source. A buzzer 2255 is powered by 12 volts DC and has two wire leads with one lead connected to a wire lead of an LED 2274 and the other connected to a common ground of battery pack 2258.

When activated by electrical current buzzer 2255 emits a 100 decibel pulsing warning tone. LED 2274 is provided with a resistor allowing it to be powered by 12 volts without being burned-out and has two wire leads with one connected a wire lead of buzzer 2255 and the other connected to one of the pair of lower micro-switch wire leads of float switch assembly 2272. When LED 2274 is energized by 12 volt current, it emits a very bright blinking red light which is diffused. Flow switch 2251 has a pair of wire leads with one connected to the magnetic winding 2277 of relay assembly 2275 and with the other one connected to the common ground of battery pack 2258. Magnetic winding 2277 is connected at one end to the hot wire lead of battery pack 2258 and at its other end to flow switch 2251.

When used fluid 327 is flowing into and through flow switch 2251, its electrical contacts close and a triggering current is provided to magnetic winding 2277. When magnetic winding 2277 receives this triggering current, current is provided from relay assembly 2275 to switch power lead 2210. The pair of upper micro-switch wire leads are connected, with one lead connected to switched power lead 2210 and the other connected to one wire lead of the solenoid of valve 2257. The other lead of the solenoid of valve 2257 is connected to the common ground of battery pack 2258. In this embodiment float assembly 2272 is provided with heavy duty contacts for the upper and lower micro-switches in float shaft 2273. These contacts are well able to handle the 12 volts direct current needed to power the solenoid of valve 2257 and are wired in series with the solenoid of valve 2257.

When the fluid exchanger 2225 is connected to a power steering system after filling its fresh fluid reservoir 328 and emptying its used fluid receiver 326 and the engine is started, used fluid 327 flows through flow switch 2251, the upper micro-switch of float switch assembly 2272 is closed and current is provided to the solenoid of valve 2257. This results in valve 2257 closing and the communication between inlet port 261 and outlet port 262 to be blocked. If one desires to use a less expensive float switch assembly with light duty contacts, an additional relay must be provided so that the full current of battery pack 2258 can be provided to the solenoid of valve 2257 without burning out the contacts of the upper micro-switch which is wired in series with valve 2257. When the level of fresh fluid 329 becomes depleted, float 2271 drops to its lower position which opens the contacts of the upper micro-switch of float switch assembly 2272 and then closes the contacts of the lower micro-switch of float switch assembly 2272. This opening of the contacts of the upper micro-switch of float switch assembly 2272 removes current from the solenoid of valve 2257 and restores fluid communication between inlet port 2261 and outlet port 2262 of valve 2257, establishing a closed fluid circulation circuit between the inlet and outlet ports of the power steering pump and disconnection of that circuit from the fresh fluid reservoir 328 and the used fluid reservoir 326. When float 2271 drops to its lower position the lower micro-switch of float assembly 2272 is closed and current is provided to the LED 2274 and buzzer 2255 until the engine is turned off. When LED 2274 is energized it gives off a bright and diffused blinking red light and when buzzer 2255 is energized it emits a loud 100 decibel pulsing warning tone. When the engine is turned off, used fluid 327 stops flowing through flow switch 2251 and stops it from energizing the magnetic winding 2277 of relay assembly 2275 which disconnect the current of battery pack 2258 from all other electrical components of fluid exchanger 2225.

Figure 23:
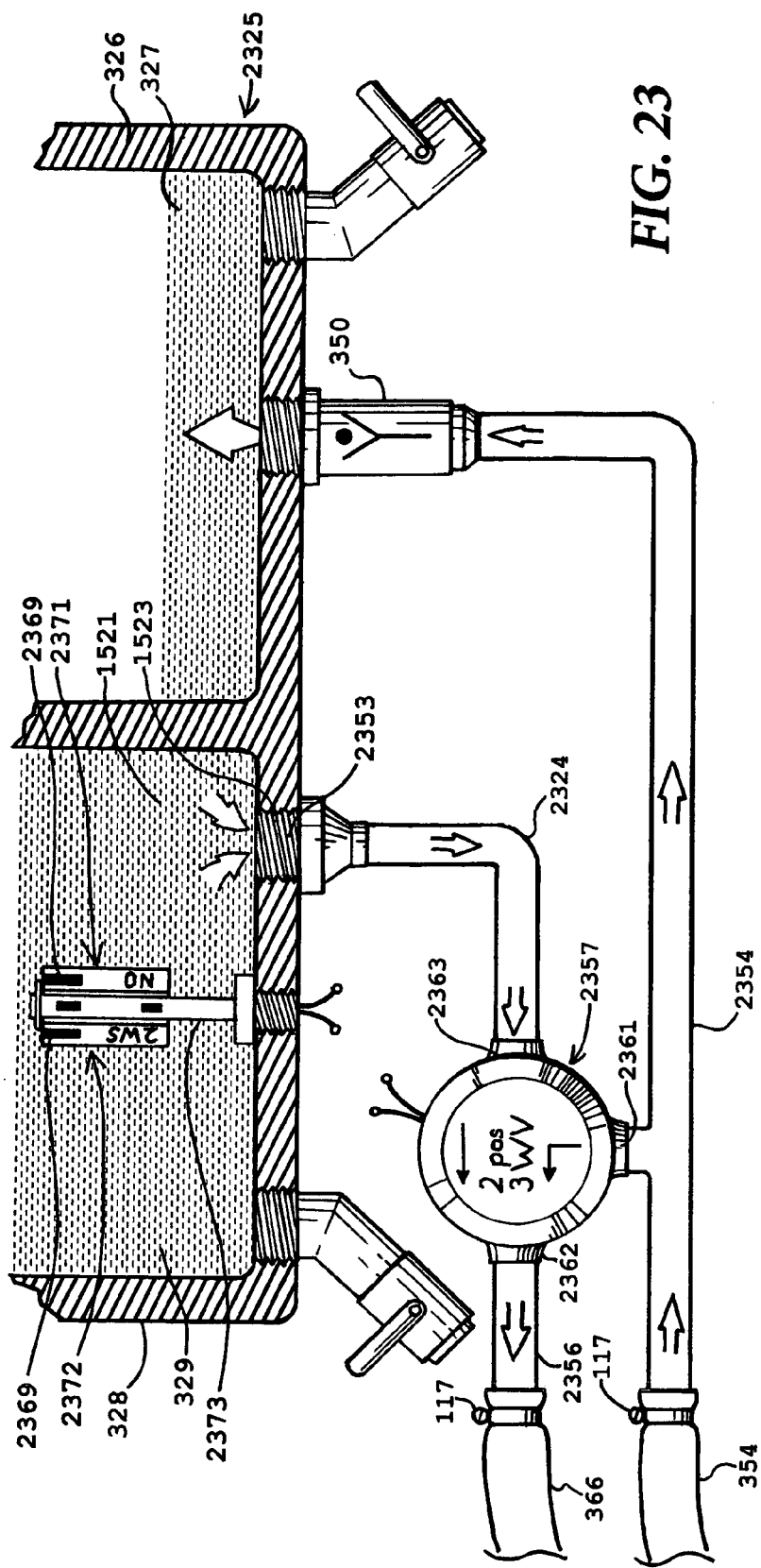
FIG. 23 depicts the detailed construction of an alternative embodiment and its parts arrangement which features an electrical/hydraulic fluid control valve with a two-position three-way solenoid valve.

FIG. 23 depicts an alternative embodiment of an electrical/hydraulic fluid control valve 2357 which is operated by a 12 volt direct current (DC) electric solenoid which is controlled by a float switch assembly 2372. FIG. 23 shows only the approximate lower half of a fluid exchanger 2325 without the skirt base 340 of FIG. 3. Fresh fluid reservoir 328, used reservoir 326, bottom common wall 349, fresh fluid exchange hose 366, and used fluid exchange hose 354 are the same as depicted in FIG. 3. The used fluid receiver 326 is fitted with a check valve 350 at bottom common wall 349. The fresh fluid receiver 328 is fitted with a fresh fluid supply port 2353 at bottom common wall 349. Float switch assembly 2372 is sealingly secured to the inside of the lower wall of fresh fluid receiver 328 of bottom common wall 349. Float switch assembly 2372 has a float 2371 which is provided with a pair of magnets 2369 and a float shaft 2373 which contains one light duty magnetically operated micro-switch (not shown) which has a pair of contacts which are closed by a pair of magnets 2369 when the float is in its upward position in response to the buoyancy provided by an adequate supply of fresh fluid 329. When fresh fluid supply 329 becomes depleted float 2371 drops to its downward position and this causes the pair of magnets 2361 to leave the proximity of the magnetically operated micro-switch which opens its electrical contacts. Fluid control valve 2357 is a two position electric solenoid operated valve with three fluid ports, a common outlet port 2362, an activated inlet port 2363, and an inactivated fluid port 2361. Fluid control valve 2357 is spring fed to return to a default mode when electric current is removed from its solenoid, and this default position provides fluid connection between a common outlet port 2362 and inactivated fluid port 2361.

A used fluid conduit 2354 is sealingly secured to used fluid exchange hose 354 by hose clamp 117 at one end and connected to check valve 350 and the inlet port 2361 of fluid control valve 2357 at its other ends. A fresh fluid conduit 2356 is sealingly secured to fresh fluid exchange hose 361 by hose clamp 117 at one end and connected at its other end to common outlet port 2362 of fluid control valve 2357. A fresh fluid supply conduit 2324 is connected at one end to activated inlet port of fluid control valve 2357 and to fresh fluid supply port 2353 at its other end. Fluid control valve 2357 contains a 12 volt direct current (DC) electric solenoid (not shown) which is provided with two electrical wire leads, with the hot lead connected to a switched current terminal of a relay (not shown) which is a 12 volt DC and the other lead connected to a common ground. A 12 volt DC onboard rechargeable battery is used as a power supply. Other voltages can be selected for valve 2357 and any electrical components used, and one could use 115 volts alternating current (AC) or 220 volts AC (for countries which use 220 volts AC), but the use of an outside power source requires use of a power cord which must be plugged in to a wall socket and this would detract from the convenience of using the fluid exchanger.

The wire leads from float switch assembly 2372 are arranged to connect and energize a magnetic winding (not shown) in the relay (not shown) which provides current to a switched power lead when the toggle switch (not shown) is placed in its on-position which is lighted. This wiring arrangement allows float switch assembly 2372 to function as an electrical trigger when its electrical contacts are closed in response to an adequate level of fresh fluid 329 and the toggle switch is placed in its on-position. When the magnetic winding receives this triggering current, the relay provides switched current to activate the solenoid of fluid control valve 2257 which closes inactivated inlet port 2261 and opens activated inlet port 2263 to establish fluid communication between activated inlet port 2363 and common outlet port 2362.

Figure 24:
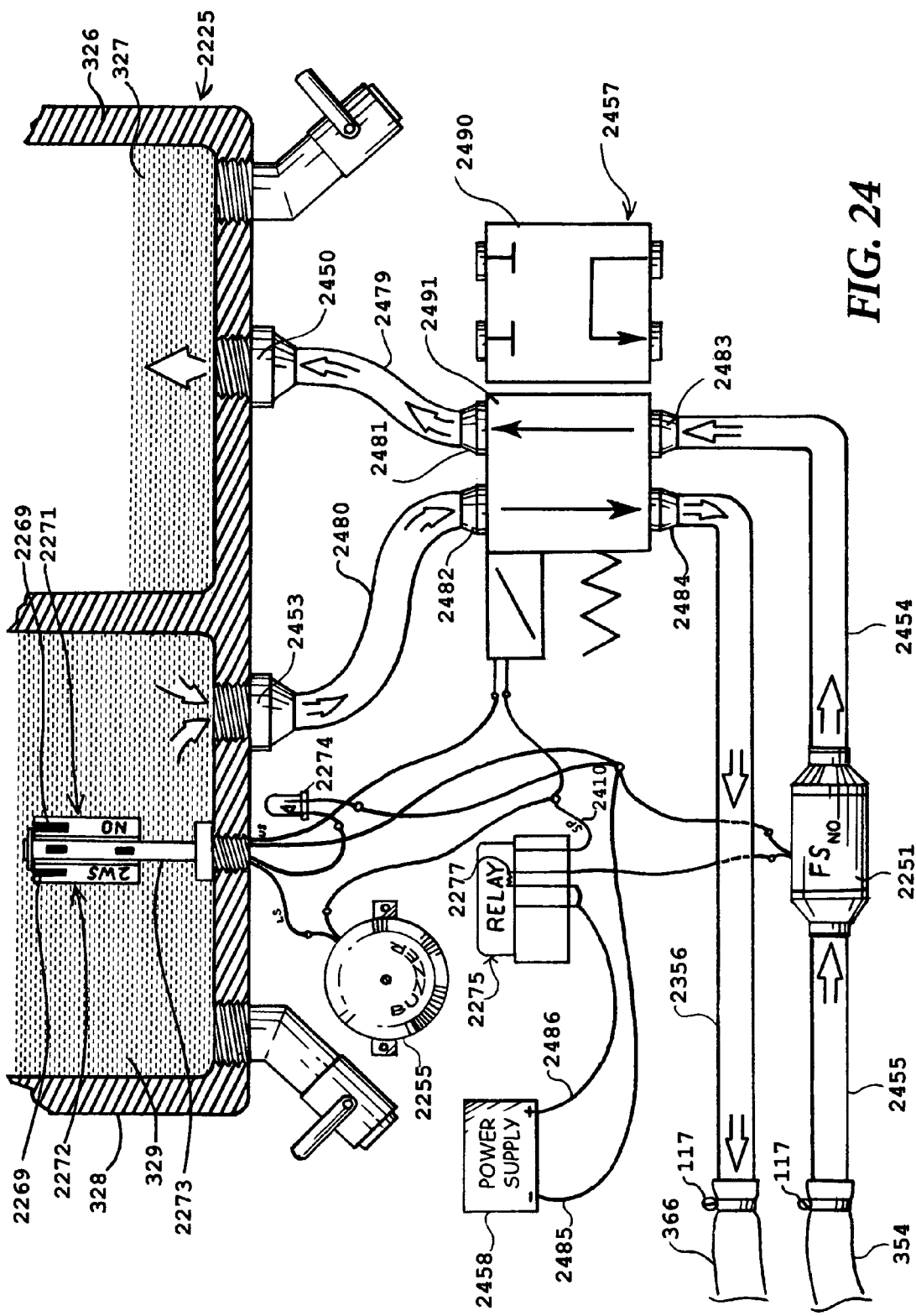
FIG. 24 depicts the detailed construction of an alternative embodiment and its parts arrangement which features an electrical/hydraulic fluid control valve with a two-position four-way solenoid valve.

FIG. 24 depicts an alternative embodiment of an electrical/hydraulic fluid control valve 2457 which is operated by an electric solenoid which is controlled by a float switch assembly 2272. FIG. 24 shows only the approximate lower half of a fluid exchanger 2425 without the skirt base 340 of FIG. 3. Fresh fluid reservoir 328, used reservoir 326, bottom common wall 349, fresh fluid exchange hose 366, and used fluid exchange hose 354 are the same as depicted in FIG. 3. The used fluid receiver 326 receives and holds used fluid 327 and is fitted with a used fluid inlet port 2450 at bottom common wall 349. The fresh fluid receiver 328 holds fresh fluid 329 and is fitted with a reservoir outlet port 2453 at bottom common wall 349. Float switch assembly 2272 is sealingly secured to the inside of the lower wall of fresh fluid receiver 328 of bottom common wall 349. Float switch assembly 2272 has a float 2271 which is provided with a pair of magnets 2269 and a float shaft 2273 which contains two heavy duty magnetically operated micro-switches (not shown), an upper micro-switch and a lower micro-switch which each have a pair of contacts which are closed by a pair of magnets 2269 when the float is in an adjacent position.

Each micro-switch of float switch assembly 2272 has its own set of wire leads, a pair of upper micro-switch leads 2411 and a pair of lower switch leads 2412, respectively.

One lead of the pair of upper micro-switch leads 2411 is connected to the solenoid of valve 2457 and the other one to a common ground of a power supply 2458 which in this example is a 12 volt on-board rechargeable battery. One lead of power supply 2458 is a hot current lead 2486 which is connected to a relay assembly 2275 and its other lead is a common ground 2485. One lead of the pair of lower switch leads 2412 is connected to a buzzer 2255 which is 12 volts DC and the other lead is connected to a lead of an LED 2274, which has a resister installed to allow it to operate off of 12 volts DC. The remaining lead of buzzer 2255 is connected the switched power lead 2410. The remaining lead of LED 2274 is connected to the common ground 2485 of power supply 2458.

Float 2271 of float switch assembly 2272 rises to its upward position in response to the buoyancy provided by an adequate supply of fresh fluid 329 which closes the contacts of the upper micro-switch of float shaft 2273. When there is an adequate supply of fresh fluid 329, the used fluid reservoir 326 has been emptied, and fluid exchanger 2425 has been properly connected to the power steering system being serviced, the engine of the vehicle can be started. As soon as the used fluid flow reaches flow switch 2251 to close its contacts, the magnetic winding 2277 in relay assembly 2275 is activated to provide current to switched power lead 2410 which in turn allows switched power to be provided to the solenoid of valve 2457 because the contacts of the upper micro-switch of float switch assembly 2272 are closed in a series circuit with the solenoid of valve 2457. This places valve 2457 in its activated position 2491.

When the level of fresh fluid 329 becomes depleted float 2271 drops to close the contacts of the lower micro-switch of the float shaft 2273 of float switch assembly 2272. This disconnects current from the solenoid of valve 2457 and provides current to energize buzzer 2255 and LED 2274. This places valve 2457 back to its spring loaded default position 2490. Buzzer 2255 and LED 2274 continue to be energized until the vehicle's engine is turned off which opens the electrical contacts of flow switch 2251. When LED 2274 is energized it gives off a bright and diffused blinking red light and when buzzer 2255 is energized it emits a loud 100 decibel pulsing warning tone.

Fluid control valve 2457 is a two position valve with four fluid ports, a used fluid inlet port 2483, a used fluid outlet port 2481, a fresh fluid inlet port 2482, and a fresh fluid outlet port 2484. A used fluid conduit 2479 connects used fluid outlet port 2481 to used fluid inlet port 2450. A fresh fluid supply conduit 2480 connects reservoir outlet port 2453 to fresh fluid inlet port 2482. A used fluid conduit 2455 is sealingly secured to used fluid exchange hose 354 with hose clamp 117 at one end and connected to float switch 2251 at its other end. A used fluid conduit 2454 connects flow switch 2251 to used fluid inlet port 2483. A fresh fluid conduit 2356 is sealingly secured to fresh fluid exchange hose 361 with hose clamp 117 at one end and connected to fresh fluid outlet port 2484 at its other end. Fluid control valve 2457 is spring fed to return to a default mode when unpowered, and this default position 2490 provides fluid connection between used fluid inlet port 2483 and fresh fluid outlet port 2484 while blocking used fluid outlet port 2481 and fresh fluid inlet port 2482. When the solenoid of fluid control valve 2457 is activated by electric current, the valve is shifted to its fluid exchanging position 2491 which connects used fluid inlet port 2483 to used fluid outlet port 2481 while connecting fresh fluid inlet port 2482 to fresh fluid outlet port 2484.

Fluid control valve 2457 has a 12 volt direct current (DC) electric solenoid (not shown) which is provided with two electrical wires, one of which is connected to a switched power lead of relay assembly 2275 and the other lead is connected in series to one lead of the upper micro-switch of float switch assembly 2272. A float switch assembly 2272 can be selected which has light duty contacts in its micro-switches, but that would require the use of a second relay to remove the current load from the contacts of the upper and lower micro-switches.

Figure 25:
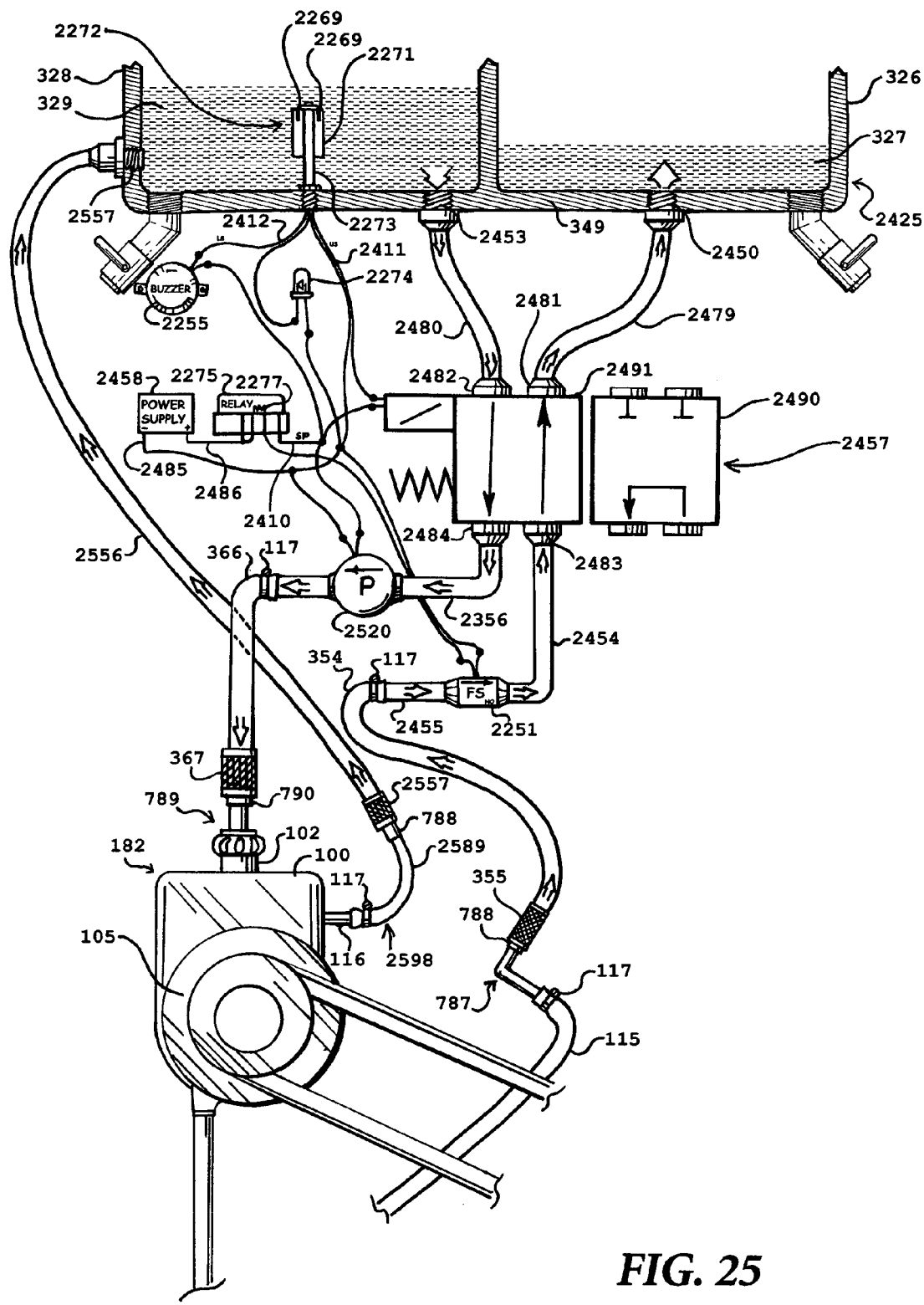
FIG. 25 depicts the detailed construction of an alternative embodiment which is based on the modified embodiment of FIG. 24.

FIG. 25 depicts an embodiment, fluid exchanger 2524 which has the same parts and parts arrangement except that it has some additional parts. FIG. 25 shows fluid exchanger 2525 connected in proper operative arrangement to the type of power steering system of FIG. 1, reservoir-pump combination 192. Cap adapter 789 is properly installed on filler neck 102 and its large male quick connect 790 is connected to the large female quick connect 367 of fresh fluid exchange hose 366. The ⅜ male tube adapter 787 is inserted inside hose end 115 which has sealingly secured by hose clamp 117 after hose end 115 was removed from reservoir return port 116. The small male quick connect 788 of the ⅜ male tube adapter 787 is connected to the small female quick connect 355 of used fluid exchange hose 354. There is a female hose adapter 2598 which is comprised of a ⅜ inch internal diameter female hose 2599 and a small male quick connect 788. Female hose adapter 2598 is sealingly secured to port 116 with hose clamp 117 and connected to a small female quick connect 2557 of a fresh fluid vent hose 2526 which is connected to a fresh fluid reservoir auxiliary port 2557. A boost pump 2520 has been added to fresh fluid conduit 2356. This particular pump is not a positive displacement pump. Certainly a positive displacement pump of many different types could be used if of relatively high flow, higher than the typical approximate flow of up to 2 or more gallons per minute of most power steering units and properly controlled with a relief valve circuit set to relieve the pump at a relatively low pressure not too great to blow the cap adapter 789 off of the reservoir neck 102. A good pressure target to select is 5–7 psi but greater or lesser can be selected depending on the strength of the connectors used and the types of reservoirs which will be serviced, automotive, truck, bus, industrial hydraulic machines, etc. In this case a boost pump 2520 is a 12 volt powered kinetic pump typically referred to as a centrifugal pump. A centrifugal, kinetic pump is an appropriate choice because it is not self-priming but can be located underneath the fresh fluid reservoir 328 and doesn't need to be self-priming. In addition, centrifugal, kinetic pumps can be constructed and arranged to boost flow without restricting flow that is somewhat higher than the pump alone would deliver, and without adding additional cost by using a relief circuit.

Description of the Operation of the Preferred Embodiment

In the preferred embodiment, the fluid control valve 457 of FIG. 4 & 5 is used. Valve 457 is operated by float 572 with assistance of low pressure (also referred to as negative pressure) provided by the power steering pump at its inlet port. In an alternative embodiment shown in FIGS. 16-18, a fluid control valve is used which is operated by a float but also with assistance of the positive pressure provided by the power steering pump at its outlet port. In another embodiment shown in FIGS. 19-20, a fluid control valve is used which is operated by a float but also with assistance of the positive pressure provided by the power steering pump at its outlet port and the negative or low pressure provided by the power steering pump as its inlet port.

FIGS. 7 & 9 show the fluid exchanger 325, the preferred embodiment in proper connective arrangement with the two main types of power steering systems in use today in passenger vehicles. FIG. 12 depicts the connection of special adapters to the power steering system of FIG. 11 to prepare it for connection to fluid exchanger 325. FIG. 14 depicts the connection of special adapters to the power steering system of FIG. 13 to prepare it for connection to fluid exchanger 325. FIG. 15 depicts the connection of special adapters to the power steering system of FIG. 13 in an alternative fashion to prepare it for connection to fluid exchanger 325. The preferred embodiment of the invention, fluid exchanger 325 is operated in the same manner for FIGS. 12, 14 & 15 as it is for FIGS. 7 & 9, and the alternative embodiment shown in FIGS. 16-24 can be connected to the power steering systems shown in FIGS. 1 & 2, and 11 & 13 just as fluid exchanger 325 can be connected to the power steering systems shown in FIGS. 1 & 2, and FIGS. 11 & 13.

Each alternate embodiment can be connected and operated to exchange power steering fluid the same way as the preferred embodiment of FIGS. 4-6, since they have the same identical automatic functions for exchanging the fluid of power steering systems, consisting of an automatic fluid exchange starting feature, an automatic fresh and used fluid flow balancing feature, and an automatic stopping of the fluid exchange feature characterized by placing the fluid exchanger in a closed fluid circulation circuit where the power steering pump freely circulates its fluid between its outlet port and its inlet port without infusing and entrapping air in its fluid, a feature which allow the operator sufficient time to shut off the engine without air becoming infused and entrained in the fluid of the power steering system being serviced.

Once the suitable adapters are properly connected to the type of power steering system of FIGS. 1 or 2, any one of the alternative embodiments of the fluid exchanger as well as the preferred embodiment of FIGS. 4-6 can be quickly connected and operated.

The power steering system shown in FIG. 7 is shown to be ready for the fluid exchange to be instituted which automatically begins when the engine of the vehicle is started. The exchanging of the fresh fluid 329 of the fluid exchanger 325 for the power steering system's used fluid 327 will be automatically stopped when the supply of fresh fluid 329 becomes depleted or if the vehicle's engine is turned off before that occurs. The preferred embodiment of fluid exchanger 325 is shown in proper operative position in FIG. 7 for exchanging the fluid of the traditional combination pump reservoir type of power steering system of FIG. 1, and is also shown in proper operative position in FIG. 9 for exchanging the fluid of the more modern type of power steering system of FIG. 2 which has its reservoir remotely positioned from the power steering pump.

In FIG. 7, fluid exchanger 325 is shown in proper operative connection to the more traditional type power steering system shown in FIG. 1 in which reservoir 100 is combined with pump 105. Reservoir 100 has been converted to function like a large conduit filled with fluid rather than a reservoir which is partially filled with air which is normally vented to atmosphere through cap 103 of FIG. 1. This conversion has been accomplished by removing cap 103 of FIG. 1, separating hose end 115 from reservoir return port 116 and quickly plugging it with port plug 786, filling reservoir 100 to the top of filler neck 102 with fresh fluid, and then installing the non-vented cap adapter 789 on reservoir 100. If the fluid of the power steering system was burned or especially varnished, characterized by a dark discoloration and acrid varnish or burned odor noticeable by examining a sample of fluid 101 held in reservoir 100, the operator can alternatively choose to use a hand suction pump or other available device to suction the used fluid out of reservoir 100 before plugging reservoir return port 116 with port plug 786 and filling reservoir 100 to the top of filler neck 102 with fresh fluid.

The operator then starts the vehicle's engine. See FIG. 7. This causes pump 105 to be activated by the revolutions of pulley 118 which result from the engine rotating belt 119 over it. This results in pump 105 communicating low pressure through its intake port to and through reservoir 100, and then to and through cap adapter 789, and then to and through fresh fluid exchange hose 366, and then communicated to inlet port/fresh fluid channel 464 shown in FIG. 4, and then finally communicated to the fresh fluid 329 at the bottom of reservoir 328 in close proximity to threaded top 468 of fluid control valve 457 of FIG. 4. Vented cap 333 of fresh fluid reservoir 328 allows normal atmospheric pressure to enter fresh fluid reservoir 328 and force fresh fluid 329 into and through inlet port/fresh fluid channel 464 of valve slide 461 as long as float 472 is upward enough to keep inlet port/fresh fluid channel 464 open inside the fresh fluid reservoir 329. This atmospheric pressure applied to the fresh fluid 329 causes it to be delivered out of the fresh fluid reservoir 328, into and through flow control valve 457, into and through fresh fluid exchange hose 366, into and through cap adapter 789, into and through reservoir 100, into and through reservoir outlet conduit 106, and then into inlet port 111 of pump 105 where it is pressurized by pump 105 to be delivered to steering gear mechanism 112 through pressure conduit 110 (see FIG. 1). While this is occurring the operator turns the steering wheel to the left fully and then to the right and then back to center (or in reverse order) in order to allow fluid 329 which has been pressurized to approximately fully flush out essentially all the internal passages and cavities of steering gear mechanism 112. While pump 105 is pressurizing and delivering fresh fluid 329 to steering gear mechanism 112, the pressurized fluid flow of pump 105 is also forcing the fluid passing through steering gear mechanism 112 to flow into and through fluid return conduit 114, and then into and through hose end 115, and then into and through ⅜ male tube adapter 787, and then into and through used fluid exchange hose 354, and then into and through street tee 351 and check valve 350 to be deposited into used fluid receiver 327, while simultaneously displacing an approximately equal volume of air through vent 331. The simultaneous and approximately equivalent rates of flow and volumes of flow of fresh fluid 329 out of fresh fluid reservoir 328 and used fluid 327 into used fluid receiver 326, continues until the supply of fresh fluid 329 contained in fresh fluid reservoir 328 is depleted.

When the supply of fresh fluid 329 is depleted, float 472 drops to its lower position in fresh fluid reservoir 329 which causes valve slide 461 (shown in FIG. 5) to move to and rest in its downward most position which brings seal 465 into close positioning with the threaded top end 468 of valve body 459. This close position of seal 456 enables the low pressure provided from pump 105 through fresh fluid exchange hose 466 to exert enough force to pull valve slide 461 downward to adequately pinch seal 465 between the top side of threaded end 468 and lower side of collar 476 which establishes an essentially air and fluid tight seal between control valve 457 and fresh fluid reservoir. Not only does the drop of valve slide 461 cause the sealing off of fresh fluid exchange hose 466 from fresh fluid reservoir 328, it also simultaneously causes side port 499 of slide 461 (FIG. 5) to align with hose barb 458. This connects the used fluid hose 356 with the inlet port/fresh fluid channel 464 establishing a closed fluid circulation circuit for the power steering system. This allows fluid delivered by pump 105 to flow into and through used fluid exchange hose 354, and to then enter and flow through fresh fluid exchange hose 366 through the connection established within the fluid control valve 457, instead of flowing into the used fluid receiver 326. As the power steering system continues to operate in this closed fluid circulation circuit, the low pressure provided by pump 105 which is communicated through fresh fluid exchange hose 366 in coordination with the weight of used fluid 326 together cause check valve 350 (FIG. 3) to seal off the used fluid reservoir 326 from communicating with either the inlet side or outlet side of pump 105.

Upon depletion of the supply of fresh fluid 329, which causes valve slide 461 to drop to it lower position, magnet 469 of FIG. 4 becomes positioned in line with magnetically operated micro-switch 462 which results in the closing of its electrical contacts. This closing of the contacts of micro-switch 462 provides electricity from a small 9 volt battery (not shown) to power a blinking red LED (not shown) and loud cycling buzzer (not shown) through an on/off toggle switch (not shown) which was flipped to its on position before the fluid exchange was started, after filling of the fresh fluid reservoir 328 with the proper amount of fresh fluid 329 and emptying the used fluid receiver 326 of used fluid 327 through ball valve 342 by use of valve operating lever 343. The loud warning tone provided by the cycling buzzer and the blinking red LED alerts the operator when the fluid exchange is complete and the power steering pump is circulating fluid in a closed fluid circulation circuit through fluid exchanger 325. The operator does not need to rush needlessly to turn off the vehicle's engine since pump 105 is freely circulating the now essentially fresh fluid 329 in this closed fluid circulation circuit from its outlet port to its inlet port without infusing air which would become quickly entrained.

In non-quick lube service centers and even in some quick lube service centers where customers leave the vehicle while it is being serviced to sit in a waiting room, the service technician who connects and operates the fluid exchanger often must be the same individual who turns the steering wheel from right to left and back to the middle. Because the fresh fluid typically becomes depleted very rapidly (often in 15 to 20 seconds or less), the action of the float operated fluid control valve is quite necessary because the operator typically would have difficulty watching the fresh fluid supply closely enough to be able to stop the engine in time before air would be pumped into the power steering pump's inlet port to become entrained in the fluid. Even if the operator had an associate helping him by sitting behind the vehicle's steering wheel, without fluid exchanger 325 having fluid control valve 457 to automatically establish a closed loop circulation circuit, it would still be very difficult for the operator to be able to watch the fresh fluid level drop to depletion and tell the other person to turn off the engine, and then to have that other person turn off the engine quickly enough to prevent air from becoming entrained into the power steering fluid.

It is especially desirable for the fluid exchanger 325 to have a float operated fluid control valve if the operator prefers to use a very compact unit which holds only as much fresh fluid as is needed for one fluid exchange and desires to use as much of the fresh fluid contained in the fresh fluid reservoir 328 as possible without having to worry about pumping air into the pump's intake port or having to unduly rush to stop the vehicle's engine. After the operator turns off the engine, he(she) proceeds to disconnect fresh fluid exchange hose 466 and used fluid exchange hose 354 by releasing large female quick connect 467 and small female quick connect 355, respectfully. Cap adapter 789 and ⅜ male tube adapter 787 are removed. Port plug 786 is then removed and hose end 115 is quickly pushed onto reservoir return port 116 and sealingly secured with hose clamp 117. The engine of the vehicle is then started and the fluid level in reservoir 100 is checked by using the reservoir's cap 103 which has an integral dipstick 104. If necessary the fluid level is adjusted up or down to reside at proper operating level as indicated on dipstick 104, typically using the cold level reading, since the newly exchanged fluid typically has not yet reached normal operating temperature. Since fluid expands as it is heated, the cold mark is lower than the hot mark. Cap 103 is replaced on reservoir 100 and the power steering system is visibly checked for any leaking connections or leaks. The power steering fluid exchange procedure for FIG. 7 is now complete.

In FIG. 9, the power steering system fluid exchanger 325 is connected to the more recent type of power steering system of the type shown in FIG. 2 in which reservoir 200 is remotely positioned from the pump. Once the adapters of FIG. 10 are connected as shown in FIG. 9, the fluid exchange is conducted exactly as described above for FIG. 7. Once the fluid exchange is completed the flashing red LED and warning tone are activated by magnetically operated micro-switch 462. This alerts the operator to turn off the engine. The large female quick connect 367 of fresh fluid hose 366 is disconnected from the large male quick connector of ⅝ male tube adapter 991. The small female quick connect 355 of used fluid hose 355 is disconnected from the large male quick connector of ⅜ male tube adapter 787. The ⅝ male tube adapter 991 and the ⅜ male tube adapter 787 are disconnected from pump supply hose 208 and hose end 215, respectively after removing one hose clamp 117 from each. Pump supply hose 208 and hose end 215 are then reconnected to their respective reservoir ports, reservoir return port 206 and reservoir outlet port 216 using one hose clamp 117 each. Reservoir 200 is then filled to its cold level mark with fresh fluid. The engine is started and idled and the fluid level is rechecked and topped off with additional fresh fluid if needed. Cap 203 is replaced onto filler neck 202 and the power steering system is visibly checked for any leaking connections or leaks. The power steering fluid exchange procedure of FIG. 9 is now completed.

In FIG. 11 reservoir 1000 is also a reservoir that is remotely arranged from the power steering pump. This particular reservoir is from a Ford Explorer and its pump supply hose 1008 is usually more difficult than average to reach due to the type of hose clamp used. The operator has the option of removing a few bolts and then removing the reservoir to allow the connection method of FIG. 9 to be used, or can use the connection method of FIG. 12 in which the ⅜ male tube adapter 787 is sealingly connected to hose end 1015, and reservoir cap adapter 1185 is snugly pushed into filler neck 1003. The fresh fluid exchange hose 366 and the used fluid exchange hose 354 of fluid exchanger 325 have been suitably connected to the power steering system by connecting large female quick connect 367 of fresh fluid exchange hose 366 to the large male quick connect 790 of cap adapter 1185, and by connecting the small female quick connect 355 of used fluid exchange hose 354 to the small male quick connect 788 of the ⅜ male tube adapter 787. The vehicle's engine is then started and is run until the red LED lights up and blinks and the cycling buzzer's warning tone alert the operator that the fluid exchange is finished. The engine is then turned off, the fluid exchanger 325 is removed by releasing the female quick connects 355 & 367 from the adapters they are connected to, and then removing the adapters, and then reconnecting hose end 1015 back onto reservoir return port 1016 and replacing cap 1002 into filler neck 102 after topping off or adjusting the fluid level of reservoir 1000 if necessary.

In FIG. 13 reservoir 1200, the power steering system is the more traditional combination reservoir-pump type of FIG. 2 in which reservoir 1200 is combined with pump 1205, except that the reservoir is translucent plastic and there are cold and hot fluid level marks on the sidewall.

FIG. 14 shows how to connect the proper adapters to the power steering system of FIG. 13. In order to connect the fluid exchanger 325, cap 1203 of FIG. 13 is removed and replaced with the non-vented cap adapter 1395 of FIG. 14. Hose end 1215 is separated from reservoir return port 1216 and quickly plugged with port plug 786. The ⅜ male tube adapter is pushed into hose end 1215 and sealingly secured with hose clamp 117.

Reservoir 1200 is then filled to the filler neck 1202 with fresh fluid. If the fluid of the power steering system was burned or especially varnished, characterized by a dark discoloration and acrid varnish or burned odor, the operator can alternatively choose to use a hand suction pump or other available device to suction the used fluid out of reservoir 100 before separating hose end 1215 from reservoir return port 1216 and then plugging reservoir return port 1216 with port plug 786. Reservoir 1200 is then filled to the top of filler neck 1202 with fresh fluid and the non-vented cap adapter 1395 is secured into proper position on filler neck 1202 by matingly engaging its locking tabs with the locking grooves in filler neck 1202. The used fluid receiver 327 of fluid exchanger 325 has been emptied of all but a small remainder of used fluid 327 from the prior fluid exchange, and its fresh fluid reservoir 329 has also been filled with approximately three quarts of fresh fluid. The fresh fluid exchange hose 466 and the used fluid exchange hose 354 of fluid exchanger 325 have been suitably connected to the power steering system by connecting large female quick connect 467 of fresh fluid exchange hose 466 (FIG. 3) to the large male quick connect 790 of cap adapter 1395, and by connecting the small female quick connect 355 of used fluid exchange hose 354 FIG. 3) to the small male quick connect 788 of ⅜ male tube adapter 787. The engine is started and the fluid exchange is instituted and completed automatically by the power steering fluid exchanger.

In FIG. 15, the power steering system is the same as shown in FIGS. 13 & 14 but is shown with an alternate connection method. Cap 1203 is replaced by a non-vented cap adapter 1495 which has a pair of O'rings, an O'ring 1496 and an O'ring 1497, when provide an effective vent-free seal when cap 1203 is connected to filler neck 1202 by properly engaging cap retainer ring 1204 and then tightening cap 1203. Reservoir 1200 has been filled with fluid to cause it to function like a large conduit filled with fluid rather than a reservoir which is partially filled with air. Hose end 1215 is then separated from reservoir return port 1216. A ⅜ hose adapter 1498 has a female ⅜ hose at one end and the small male quick connect 790 at the other. This adapter 1498 is installed onto reservoir return port 1216 by pushing its ⅜ hose onto port 1216 and sealingly securing it with hose clamp 117.

Reservoir 1200 is filled to the top of filler neck 1202 with fresh fluid. If the fluid of the power steering system was burned or especially varnished, characterized by a dark discoloration and acrid varnish or burned odor, the operator can alternatively choose to use a hand suction pump or other available device to suction the used fluid out of reservoir 1200 before plugging reservoir return port 1216 with port plug 786 and filling reservoir 1200 to the top of filler neck 1202 with fresh fluid. The ⅜" internal diameter male tube adapter is pushed into hose end 1215 and sealingly secured with hose clamp 117. The used fluid receiver 327 of fluid exchanger 325 has been emptied of all but a small remainder of used fluid 327 from the prior fluid exchange, and its fresh fluid reservoir 329 has also been filled with approximately three quarts of fresh fluid. The fresh fluid exchange hose 466 and the used fluid exchange hose 354 of fluid exchanger 325 have been suitably connected to the power steering system by connecting large female quick connect 467 of fresh fluid exchange hose 466 (FIG. 3) to the large male quick connect 790 of adapter 1495, and by connecting the small female quick connect 355 of used fluid exchange hose 354 (FIG. 3) to the small male quick connect 788 of ⅜ male tube adapter 787. The engine is started and the fluid exchange is automatically instituted and completed.

Description of the Operation of Alternative Embodiments

FIGS. 16-18 depict an alternative embodiment of the power steering fluid exchanger which is also powered by the low pressure provided by the power steering pump at its inlet port but which has a float operated fluid control valve 1557 whose operation is assisted by the positive fluid pressure provided by the outlet port of the power steering pump. In FIGS. 16 & 17 fluid control valve 1557 does not have a fresh fluid supply port provided integrally to its valve slide as does the fluid control valve of FIGS. 4-6. As long as float 1570 is not in its lower position, fresh fluid 329 is supplied to the power steering pump under power of the low pressure provided by the pump through its inlet port. This causes fresh fluid 329 to be delivered from the fresh fluid reservoir into and through fresh fluid supply port 1523, then into an through fresh fluid supply conduit 1524, into and through fresh fluid inlet port 1580, into and through fluid channel 1599, into and through fresh fluid delivery port 1500, into and through fresh fluid conduit 1566, and then into fresh fluid exchange hose 366 to eventually enter the inlet port of the power steering pump, with all the fresh fluid flow being powered by the low pressure provided by the power steering pump through its inlet port. The used fluid 327 is delivered into and through used fluid exchange hose 354, into and through used fluid conduit assembly 1554, and then into and through check valve 350 to be deposited in used fluid receiver 326.

See FIG. 17. As the supply of fresh fluid supply 329 becomes depleted, float 1572 drops to its lower position under the force of its own weight along with the weight of the valve slide 1561, float shaft 1570 and its retainer nut 473, as well as the effects of used fluid now being able to flow into a power assist port 1502. As valve slide 1561 begins to move downward toward its lower position, used fluid inlet port 1548 is no longer blocked by the left side of valve slide 1561 and the pressurized used fluid 327 provided by the power steering pump is now free to pass through used fluid inlet port 1548 and into to fluid channel 1599 of valve slide 1561 to flow into and through the fresh fluid delivery port 1500 to flow into and through fresh fluid conduit 1566 and then into and through fresh fluid exchange hose 366. This pressurized used fluid 327 transmits fluid pressure through fluid power port 1502 to apply pressure to the top side of valve slide 1561 which then forces the valve slide 1561 to the end of its travel downward which drives collar 1576 downward against seal 1565, squeezing it against the threaded top end 1568 of valve body 1559. This establishes an essentially air and fluid tight seal between the fresh fluid reservoir 328 and valve bore 1583. Simultaneous to the depletion of the supply of fresh fluid 329 and the harnessing of the used fluid power provided by the power steering pump at the top side of valve slide 1561, float ball 1521 drops to its lower position in wire float cage 1522 where the low pressure provided by the power steering pump at its inlet port communicates with fresh fluid supply port 1523 to pulls float ball 1521 snugly into fresh fluid supply port 1523 forming an essentially air and fluid tight seal between the fresh fluid reservoir 328 and fresh fluid supply conduit 1524.

Simultaneous to this dropping of valve slide 1561 to its lower position and float ball 1521 establishing an essentially air and fluid tight seal to fresh fluid supply port 1523, the fluid control valve 1557 directs pressurized used fluid 327 to be delivered into and through itself (fluid control valve 1557) instead of into used fluid receiver 326. The used fluid 327 is delivered through used fluid inlet port 1548, and flows into and through fluid channel 1599 and then into and through fresh fluid delivery port 1500 to be delivered into fresh fluid conduit assembly 1566 and fresh fluid exchange hose 366 to return to the inlet port of the power steering pump. The fluid exchanging part of the service procedure has been completed, and in most cases the fluid being delivered out of the outlet port of the power steering pump contains moderately high to very high proportion of fresh fluid to used fluid. When the fluid exchanger enters its closed fluid circulation circuit, the fluid flows from the outlet port of the power steering pump, into and through the steering mechanism, into the used fluid exchange hose to enter and flow through the fluid control valve 1557 and then to flow through the fresh fluid exchange hose to the inlet port of the power steering pump. When the fluid control valve 1557 establishes such a closed fluid circulation circuit, it also simultaneously seals off the fresh fluid reservoir and the used fluid reservoir from this closed loop fluid circulation circuit. The low pressure provided by the power steering pump along with the weight of the used fluid 327 held in used fluid reservoir 326, pulls check valve 350 downward with sufficient force to establish an essentially fluid tight seal, preventing the typically dirty used fluid 327 from entering the fresh fluid supply conduit 1524 to contaminate the essentially fresh fluid which is circulating in the closed loop fluid circulation circuit.

FIGS. 19 & 20 depict a mechanical/hydraulic fluid control valve of an alternative embodiment which is float operated and assisted by both negative and positive pressures provided by the power steering pump. FIG. 19 shows the embodiment with the valve slide 1961 of fluid control valve 1957 held in its upward position by the buoyancy of float 1572 in an adequate supply of fresh fluid. This establishes a fluid exchanging condition by connecting used fluid inlet port 1948 to used fluid outlet port 1950, and by connecting fresh fluid inlet port 1980 to fresh fluid outlet port 1900. Fluid exchanger 1925 is shown in the middle of a fluid exchange. Used fluid 327 is pumped from the power steering pump, through the steering mechanism, and into the used fluid exchange hose 354 where it passes through used fluid conduit assembly 1955, used fluid inlet port 1948, side fluid channel 1998, used fluid outlet port 1950 and into and through check valve 350 to be deposited in used fluid receiver 326. The power steering pump generates low (negative) pressure at its outlet side which is communicated into and through fresh fluid exchange hose 354, into and through fresh fluid conduit assembly 1956, through fresh fluid outlet port 1900, into and through cross fluid channel 1999, through fresh fluid inlet port 1980, into and through used fluid conduit 1954, and into fresh fluid supply port 1523. This transmission of low pressure from the inlet port of the power steering pump to fresh fluid supply port 1523 causes fresh fluid to be pumped under power of atmospheric pressure toward the source of low pressure. Fresh fluid flows out of fresh fluid reservoir 328, through fresh fluid supply port 1523, into and through fresh fluid supply conduit 1924, through fresh fluid inlet port 1980, into and through cross fluid channel 1999, through fresh fluid outlet port 1900, into and through fresh fluid conduit assembly 1956, and then into and through fresh fluid exchange hose 366 to the inlet port of the power steering pump.

Used fluid 327 is discharged and held in used fluid receiver 326 after pressure is applied to it by the power steering pump. Used fluid 327 is pumped into and through the power steering mechanism to enter the used fluid exchange hose 354. Used fluid 327 then flows into and through used fluid conduit assembly 1955, through used fluid inlet port 1948, into and through side fluid channel 1998, through used fluid outlet port 1950, into and through used fluid conduit 1954 to pass through check valve 350 into the used fluid receiver 326. The used fluid 327 flows into used fluid receiver 326 at the same approximate rate of flow as the fresh fluid 329 flows out of the fresh fluid reservoir 328.

FIG. 20 depicts the end result of the balanced flow of fresh fluid 329 and used fluid 327. The level of fresh fluid 329 has dropped until it has become depleted. As the fresh fluid nears depletion, float 1572 drops in fresh fluid reservoir 1572 moving valve slide 1961 downward. As valve slide 1961 begins to move fluid power port 1902 opens and creates a cavity at the top side of valve slide 1961 which is filled and lengthened with pressurized used fluid 327 entering under the positive pressure provided by the power steering pump. This working fluid entering fluid power port 1902 and the positive pressure it transmits applies downward force to slide 1961 and augments the force applied by the additive weight of float 1572, retainer nut 473, float shaft 1570, and valve slide 1961 which increases as the fresh fluid level drops fully and all buoyancy is lost. As valve slide 1961 drops the solid section above cross fluid channel 1999 drops below fresh fluid outlet port 1900 and fresh fluid inlet port 1980, negative pressure is provided to cross fluid channel 1999 and valve slide 1961 through power port 1906 and fresh fluid conduit 1956. This negative pressure applies additional downward force to valve slide 1961 and assists in the last part of its movement downward and once valve slide nears the end of its downward stroke, the negative pressure applied at power port 1906 helps keep seal 1565 squeezed between collar 1576 and threaded top end 1968 to be sealed essentially fluid and air tight.

As the level of fresh fluid becomes depleted, float ball 1521 moves to fit tight into the top side of fresh fluid supply port 1523, creating an air and fluid tight seal between fresh fluid supply conduit 1924 and the fresh fluid reservoir 328. This along with the closing off of the fresh fluid reservoir from valve bore 1983 as a result of the squeezing of seal 1565, and the closing off of the used fluid reservoir from used fluid conduit 1954 by check valve 350 under the weight of used fluid 327 and the low pressure provided by the power steering pump at its inlet port, fluid now flows in a closed fluid circulation circuit which has been established between the outlet port of the power steering pump and its inlet port.

FIG. 21 depicts a mechanical/hydraulic fluid control valve of an alternative embodiment which is float operated and is very basic and less costly. FIG. 21 shows fluid control valve 2157 with its valve slide in its upward position, a response to an adequate level of fresh fluid 329. Valve 2125 functions effectively but does not typically seal well enough at the end of the fluid exchange for the vehicle to be left running for more than a short time with its power steering pump circulating fluid in a closed fluid circulation circuit. This valve will provide significantly less time to shut the engine than the other more deluxe, mechanical/hydraulic fluid control valves such as those shown in FIGS. 4-5, 16-18 & 19-20 which can provide a significantly longer period of time for the operator to shut the vehicle's engine off, usually as long as desired by the service equipment operator. The sealing off of valve bore 2183 from fresh fluid reservoir 328 when the supply of fresh fluid 329 becomes depleted is provided only by the additive weight of valve slide 2161, float shaft 1570, float 1572 and retainer nut 473 applying force to rim 1576 to pinch seal 1565 with no assistance by the low pressure or positive pressure of the power steering pump except at check valve 350.

When valve slide 2161 is in its upward position, the fluid communication between used fluid inlet port 2148 and used fluid outlet port 2180 is blocked, allowing used fluid 327 to flow under pressure provided by the power steering pump from used fluid exchange hose 354 into and through used fluid conduit 2154 to pass through check valve 350 to be deposited in used fluid receiver 326. Fresh fluid 329 is pumped out of fresh fluid reservoir 328 through fresh fluid supply port 1523, into and through fresh fluid supply conduit 2124, and into and through fresh fluid exchange hose 366 to be delivered to the inlet port of the power steering pump. As with all the other embodiments the fresh fluid 329 is exchanged for the power steering systems used fluid 327 in approximately equivalent flow rates and volumes.

As the level of fresh fluid 329 becomes depleted, float 1572 loses buoyancy in fresh fluid 329 and drops to its downward position with seal 1565 held against the threaded top end 2168 by collar 1576. When float 1572 drops it carries valve slide 2161 to its lower position in valve bore 2183 while fluid is vented upward through fluid vent 2103 preventing valve slide 2161 from become hydro-locked. The established fluid communication between used fluid inlet port 2148 and used fluid outlet port 2180. The low pressure provided by the power steering pump through fresh fluid hose 366 and into fresh fluid supply conduit 2124 causes float ball 1521 to seal tightly against fresh fluid supply port 1523, and causes check valve 350 to seal off the used fluid receiver 326 from used fluid conduit 2154.

FIG. 22 depicts an alternative embodiment with a float operated electrical/hydraulic fluid control valve which is a two position, dual port electric solenoid valve. FIG. 22 is shown with the solenoid of valve 2257 energized by relay assembly 2275 and float switch assembly 2272 to block fluid communication between inlet port 2261 and outlet port 2262. Float switch 2272 is in its upward position in which the contacts of its upper micro-switch are closed by the adjacent proximity of the pair of magnets 2269. The internal contacts of flow switch 2251 are closed by the flow of fluid through it. When the contacts of flow switch 2251 are closed the magnetic winding 2277 of relay assembly 2275 is energized to provide current to switched power lead 2210. The upper switch leads 2211 of float switch 2272 are wired in a series circuit with the solenoid of valve 2257 and when float 2271 is in its upward position due to an adequate level of fresh fluid 329, the solenoid of valve 2257 is energized by current. This turns on valve 2257 and blocks fluid communication between the used fluid conduit assembly 2254 and the fresh fluid conduit assembly 2556, establishing a fluid exchanging condition in fluid exchanger 2225. This fluid exchanging condition of fluid exchanger 2225 is characterized by a fluid connection between fresh fluid conduit assembly 2556 and the fresh fluid reservoir 328, and simultaneous fluid second connection between used fluid conduit assembly 2254 and the used fluid receiver 326.

When the level of fresh fluid 329 becomes depleted, the electrical contacts of the upper micro-switch of float switch 2272 become disconnected and current is removed from the solenoid of valve 2257. The return spring of valve 2257 places it in its default mode which establishes a fluid connection between used fluid exchange hose 354 and fresh fluid exchange hose 366, thereby establishing a closed fluid circulation circuit between the outlet and inlet ports of the power steering pump. This closed fluid circulation circuit is closed off from fresh fluid reservoir 329 and used fluid receiver 326 due to the low pressure provided by the power steering pump pulling float ball 1521 sealingly into fresh fluid supply port 2253 causing the sealing off of the fresh fluid reservoir 329 by pulling check valve 350 closed in coordination with the weight of the used fluid 327. While fluid exchanger 2225 is in this closed fluid circulation circuit with the power steering operative under power of the vehicle's engine, the blinking red LED 2274 and the pulsing 100 decibel buzzer 2255 are activated. LED 2274 and buzzer 2255 alert the service equipment operator that the fluid exchange is now completed and the vehicle's engine can be turned off. If the power supply for fluid exchanger 2225 becomes interrupted for any reason while fluids are being exchanged, valve 2257 returns to its spring fed default position which establishes communication between used fluid inlet port 2261 and used fluid outlet port 2262. This keeps air from being infused and entrained into the power steering fluid if a power outage occurs for any reason. As soon as the engine is turned off, the contacts within flow switch 2251 open to shuts-off current through magnetic winding 2277, which removes current from the switch power lead which in turn removes the electrical current supplying LED 2274 and buzzer 2255, which turns them off disconnects power supply 2258.

FIG. 23 depicts an alternative embodiment with a float operated electrical/hydraulic fluid control valve which is a two position, triple port electric solenoid valve. FIG. 23 is shown with the solenoid of valve 2357 energized in response to the upward position of float switch assembly 2372 to block fluid communication between in-activated inlet port 2361 and common outlet port 2362, while establishing fluid communication between common port 2362 and activated inlet port 2263. Float switch 2272 is in its upward position in which the contacts of its micro-switch have been closed by the proximity of the pair of magnets 2269 which caused current to be provided to energize the solenoid of valve 2357. If heavy duty contacts are used in the micro-switch of float switch assembly 2372, a relay is not necessary and float switch assembly 2372 can be wired in series circuit with a 12 volt DC onboard battery supply and a lighted on-off toggle switch. If light duty contacts are used in the micro-switch of float switch assembly 2372, use of a relay is necessary, using float switch assembly 2372 as a trigger to energize that relay to provide switched power to valve 2357 without the current load being applied to the light duty contacts of the micro-switch which could damage them.

After the service equipment operator has filled the fresh fluid reservoir 328 with an adequate supply of fresh fluid 329 and emptied the used fluid receiver 326 of used fluid 327, fluid exchanger 2325 is connected to the power steering system to be serviced using the proper adapters required. The engine is started to render the power steering system operative which automatically starts the fluid exchange and the steering wheel is rotated to the left all the way and then to the right all the way and then back in quick succession and in reverse order if so desired. Used fluid 327 is discharged into used fluid receiver 326 from used fluid exchange hose 354 under positive fluid power provided by the power steering pump at its outlet port while fresh fluid 329 is delivered out of fresh fluid reservoir 329 and into the fresh fluid exchange hose 366 under low pressure power provided by the power steering pump at its inlet port. This exchange of the fresh fluid 329 of fluid exchanger 2325 for the used fluid 327 of the power steering system occurs with the rates of flow and volumes of flow of the fresh fluid 329 and the used fluid 327 being approximately equivalent due to the control provided by the power steering pump. This fluid exchange continues until the supply of fresh fluid 329 becomes depleted which causes float 2371 to move to its downward position resulting in the disconnection of current to the solenoid of valve 2357 which allows valve 2357 to return to its default position under the power of the spring contained within valve 2357. This results in the establishing of a fluid connection between used fluid conduit assembly 2354 and fresh fluid conduit 2356 and the simultaneous disconnection of fresh fluid supply conduit 2324 from the fresh fluid reservoir 329 and the disconnection of the conduit assembly 2354 from the used fluid reservoir 326. This establishes a closed circuit fluid circulation circuit between the outlet and the inlet ports of the power steering pump. This closed circuit fluid circulation circuit provides time for the service equipment operator to turn of the engine of the vehicle without rushing or worrying about infusing air into the power steering system to become entrained. If the power supply for fluid exchanger 2325 becomes interrupted for any reason while fluids are being exchanged, valve 2357 returns to its spring fed default position 2490 in which communication is established between inactivated inlet port 2361 and common outlet port 2362 with activated inlet port 2263 closed. This keeps air from being infused and entrained into the power steering fluid if a power outage occurs for any reason.

FIG. 24 depicts an alternative embodiment, fluid exchanger 2425, which has a float operated electrical/hydraulic fluid control valve which is a two position, four port electric solenoid valve. A valve with this port and flow configuration is manufactured in several forms ranging from small spool valves inserted into machined valve bodies to very heavy duty spool valves which are operated by electric solenoids or are pilot operated by fluid or compressed air. An especially well designed and moderately priced 2 position-4 way cartridge spool valve and valve body combination with an easily replaceable solenoid which can have one of a number of voltages selected is currently manufactured by HydraForce and is an appropriate choice for this valve. Of course, one could use a much larger spool valve for a fluid control valve or even a small custom made one, which can be designed to be pilot operated which can have a mechanical float attached to its remotely located pilot valve for remotely controlling the spool's position in the control valve, using the fluid circuit's fluid power generated by the fluid circuit's pump as low pressure from its inlet port or as positive pressure from its outlet port.

FIG. 24 is shown with the solenoid of valve 2457 energized by relay assembly 2275 and float switch assembly 2272 to block fluid communication between used fluid inlet port 2483 and fresh fluid outlet port 2484. Float switch 2272 is in its upward position in which the contacts of its upper micro-switch are closed by the adjacent proximity of the pair of magnets 2269. The internal contacts of flow switch 2251 are closed by the flow of used fluid 327 through it. When the contacts of flow switch 2251 are closed the magnetic winding 2277 of relay assembly 2275 is energized to provide current to switched power lead 2210. The upper switch leads 2211 of float switch 2272 are wired in a series circuit with the solenoid of valve 2257 and when float 2271 is in its upward position due to an adequate level of fresh fluid 329, the solenoid of valve 2257 is energized by current. This turns on valve 2257 and blocks fluid communication between the used fluid conduit assembly 2254 and the fresh fluid conduit assembly 2356, establishing a fluid exchanging condition in fluid exchanger 2225. This fluid exchanging condition of fluid exchanger 2225 is characterized by a fluid connection between fresh fluid conduit assembly 2356, fresh fluid supply conduit 2480 and the fresh fluid reservoir 328, and simultaneous second fluid connection between used fluid conduit assembly 2255, flow switch 2251, used fluid conduit 2454, used fluid conduit 2479 and the used fluid receiver 326.

When the level of fresh fluid 329 becomes depleted, the electrical contacts of the upper micro-switch of float switch 2272 become disconnected and current is removed from the solenoid of valve 2257. The return spring of valve 2257 places it in its default mode, port configuration 2490 which establishes a fluid connection between used fluid exchange hose 354 and fresh fluid exchange hose 366 while blocking used fluid outlet 2481 and fresh fluid inlet port 2482, thereby establishing a closed fluid circulation circuit between the outlet and inlet ports of the power steering pump. While fluid exchanger 2425 is in this closed fluid circulation circuit with the power steering pump rendered operative under power of the vehicle's engine, the blinking red LED 2274 and the pulsing 100 decibel buzzer 2255 are activated. LED 2274 and buzzer 2255 alert the service equipment operator that the fluid exchange is now completed and the vehicle's engine can be turned off. If the power supply for fluid exchanger 2425 becomes interrupted for any reason while fluids are being exchanged, valve 2457 returns to its spring fed default position 2490 which establishes fluid communication between used fluid inlet port 2483 and fresh fluid outlet port 2484. This keeps air from being infused and entrained into the power steering fluid if a power outage occurs for any reason.

Additionally, it may be appreciated that the present invention may find further applicability to fluid exchange devices outside of the automotive or transportation industries. For example, the fluid exchanger could be readily adapted to exchange the fluid of any hydraulic circuit by removing its reservoir and positioning the exchanger approximately at or above the level of the pump's negative pressure fluid inlet or suction conduit which supplies the hydraulic system's pump. In addition, an auxiliary demand pump can be arranged to the fresh fluid exchange hose (or conduit) to assist and insure that the fluid inlet line stays supplied with fresh fluid even if the fluid exchanger is positioned below the level of the fluid inlet line of the hydraulic system's pump, below the whole hydraulic system, or even located at a distance from the hydraulic system's pump which would typically be farther than the power of the negative pressure provided from the pump's inlet would normally support. The pressure and delivery of the fluid pumped from the fluid exchanger's fresh fluid reservoir through the auxiliary pump can be controlled and regulated in a number of suitable ways. An adjustable automatic relief valve circuit can be added to the auxiliary pump to bypass fluid from it's outlet port back into its inlet port or the fresh fluid reservoir, and can be set to provide a pressure high enough to keep the hydraulic system's pump supplied.

Various arrangements and types of auxiliary pumps can be arranged to the fresh fluid exchange hose (conduit) which will automatically provide boost when the fluid pressure drops below a selected minimal setting. As long as the connections are secure and fluid and air tight between the fluid exchanger's fresh fluid exchange hose (conduit) and the hydraulic pump's low pressure supply conduit, and between the fluid exchanger's used fluid hose (conduit) and the hydraulic pump's return conduit to its reservoir (which has been disconnected), the overall pressure of the fresh fluid delivered to the hydraulic pump's low pressure supply conduit can be substantially greater than occurring in normal operation without harming the hydraulic pump or hydraulic system since the hydraulic pump will typically only ingest fluid within a certain given range of flow rates depending on the temperature of the fluid. Using the fluid changer with an auxiliary boost pump in this manner removes the need for any mechanism to balance the fresh and used fluid flow rates and volumes to be approximately equivalent, since the hydraulic pump provides the necessary regulation.

A boost pump may be applied to boost the pressure and delivery of fresh fluid through the fresh fluid exchange hose and a fluid vent can be provided at the adapter for connecting the fresh fluid exchange hose to the low or negative pressure, suction conduit of the inlet side of the circuit being serviced. This fluid vent is then connected by an additional return conduit to vent back into the fresh fluid reservoir. In this way adequate fresh fluid can be supplied to a fluid circuit's reservoir which has been sealed or directly connected to the circuit's low pressure pump inlet side conduit without having to use a demand type pump with an automatic shut-off. This method also allows the fluid exchanger to be remotely positioned at any level including floor level and allows the use of a much larger fresh fluid reservoir and used fluid receiver.

The alternative embodiment of FIG. 25, fluid exchanger 2525 operates in substantially the same way as the alternative embodiment of FIG. 24 except that a boost pump 2520 has been added to fresh fluid conduit 2356. When fluid exchanger 2525 is connected, the vehicle's engine is started. This renders the power steering pump operative and delivers used fluid to circulate through used fluid exchange conduit 354 to start to flow back through fresh fluid conduit 2356 which then triggers flow switch 2251 which in turn energizes the magnetic winding 2277 of relay 2275 which energizes switched power lead 2410. Due to the position of float switch 2272, pump 2520 is energizes as fluid control valve 2457 is shifted from its 2490 position to its 2491 position (as shown if FIG. 25). This causes used fluid to be delivered from hose end 115 into and through used fluid exchange hose 354 and then into the used fluid receiver 326 and fresh fluid to be delivered from the fresh fluid reservoir to reservoir 100 of the power steering system at a rate of flow somewhat higher than the rate at which is pumped by pump 105 of the power steering system. This excess fresh fluid 329 which enters reservoir 100 of the power steering system is vented back to the fresh fluid reservoir 328. Fluid exchanger 2525 of FIG. 25 shows the use of an electrical/hydraulic fluid control valve 2457 and an electric float switch 2272 controlling it. When using a boost pump on the fluid exchanger such as the embodiment of fluid changer 2525 which pressurizes the fresh fluid being delivered, If one is changing the fluid of a power steering system which uses a cap adapter that is held in place primarily by the low pressure provided by the power steering pump (see FIGS. 11-12), it is necessary to use a cap adapter which has an adjustable outside collar which extends downward and around the filler neck (such as filler neck 1002 of FIGS. 11-12) which can be hand tightened to be held securely in place even with the use of fresh fluid which has been positively pressurized.

A mechanical/hydraulic fluid control valve and a mechanical float valve (as used in FIG. 3-5 or FIG. 16-17, or FIG. 20) can be substituted for fluid control valve 2457 and electric float switch 2272 if an additional magnetically operated micro-switch 462 and magnet are used with a relay in coordination with a flow switch 2251 on the a used fluid conduit to activate pump 2520 when the fresh fluid supply is adequate and the power steering pump is operative. One advantage of the alternate embodiment of FIG. 25, Fluid exchanger 2525 is that is can be constructed as a larger floor model which can be positioned below the power steering reservoir being serviced and can be constructed to be positioned at a substantial distance from the vehicle. It can also be constructed to be mounted on or within a service truck which can travel to the site location of the vehicle or machinery needing their power steering systems serviced.

Additional advantages and modifications will readily occur to those of average skill in the art. The invention in its broader aspects is, therefore, not limited to the specific details, representative apparatus and illustrative examples shown and described. Accordingly, departures from such details may be made without departing from the spirit of scope of the applicant's general inventive concept.

Parts List

Figure 26:
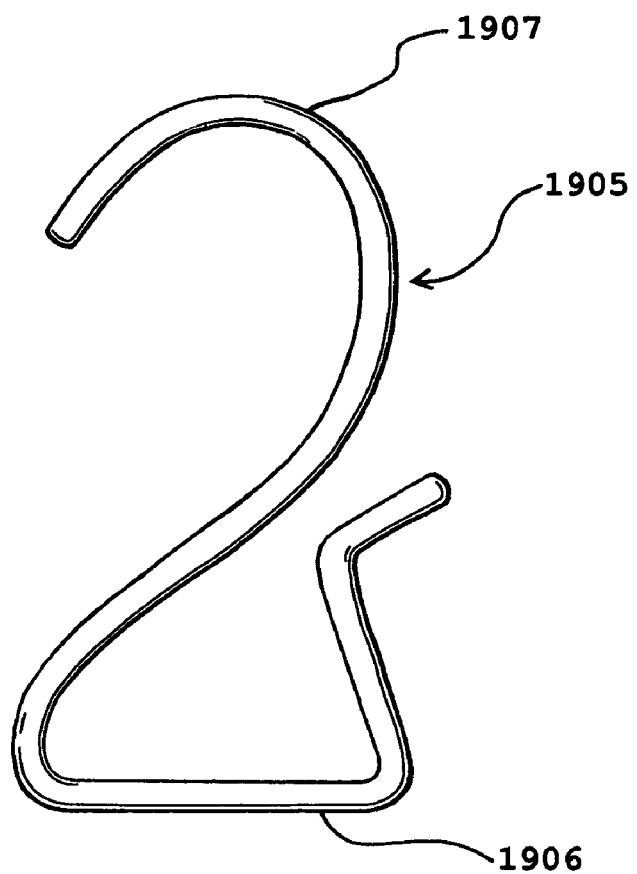
FIG. 26 depicts a hook bracket which can be used to hang the fluid exchanger from the raised of the vehicle being serviced.
Figure 27:
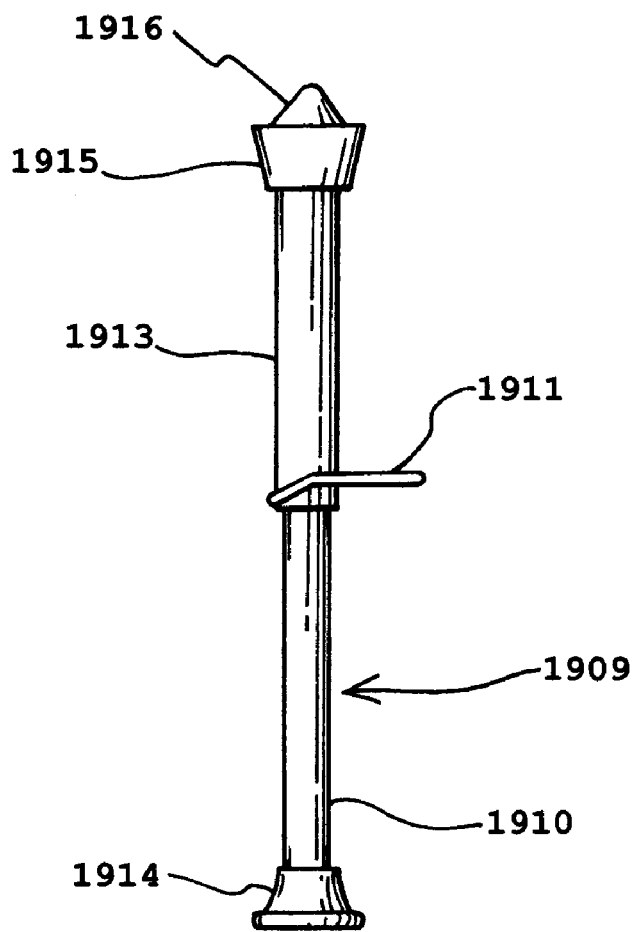
FIG. 27 depicts an adjustable hood rod which can be used to hold the hood open of the vehicle being serviced if the vehicle does not have a hood rod and the technician wants to hang the fluid exchanger from the hood.

FIG. 1
100 reservoir
101 fluid
102 filler neck
103 cap
104 dipstick
105 pump
106 reservoir outlet conduit
107 inlet port
109 outlet port
110 pressure conduit
111 inlet port
112 steering gear assembly
113 outlet port
114 fluid return conduit
115 hose end
116 reservoir return port
117 hose clamp
118 pulley
119 belt
120 ferrule
192 combination pump reservoir assembly FIG. 2
117 hose clamp
120 ferrule
200 reservoir
201 fluid
202 filler neck
203 cap
205 pump
206 reservoir outlet port
207 pump inlet port 208 pump supply hose
209 pump outlet port
210 pressure conduit
211 inlet port
212 rack and pinion steering mechanism
213 outlet port
214 fluid return conduit
215 hose end
216 reservoir return port
218 pulley
219 belt FIG. 3
325 power steering fluid exchanger
326 used fluid receiver
327 used fluid
328 fresh fluid reservoir
329 fresh fluid
330 top cover piece
331 vent
332 filler neck
333 cap
334 strainer
335 retainer cap
336 post
337 retainer cap
338 post
339 handle
340 skirt base
341 set of four footpads
342 ball valve
343 valve operating lever
344 45 degree connector
345 ball valve
346 valve operating lever
347 45 degree connector
349 bottom common wall
350 check valve
351 street tee
352 hose barb
353 90 degree hose barb
354 used fluid exchange hose
355 small female quick connect
356 used fluid hose
366 fresh fluid exchange hose
367 large female quick connect
457 fluid control valve
458 hose barb
462 magnetically operated micro-switch
463 90 degree hose barb
472 float FIG. 4
457 fluid control valve
458 hose barb
459 valve body
460 threaded hex plug
461 valve slide
462 magnetically operated micro-switch
463 90 degree hose barb
464 inlet port/fresh fluid channel
465 seal
468 threaded top end
469 magnet
470 float shaft
471 threaded end
472 float
473 retainer nut 474 alignment groove
475 alignment pin
476 collar
477 O'ring gland
478 threaded orifice
479 used fluid inlet port
480 fresh fluid delivery port
481 O'ring
482 female thread
483 valve bore
484 orifice
499 side port FIG. 5
457 fluid control valve
458 hose barb
459 valve body
460 threaded hex plug
461 valve slide
462 magnetically operated micro-switch
463 90 degree hose barb
464 inlet port/fresh fluid channel
465 seal
468 threaded top end
469 magnet
470 float shaft
471 threaded end
472 float
473 retainer nut
474 alignment groove
475 alignment pin
476 collar
477 O'ring gland
478 threaded orifice
479 used fluid inlet port
480 fresh fluid delivery port
481 O'ring
482 female thread
483 valve bore
484 orifice
499 side port FIG. 6
457 fluid control valve
458 hose barb
459 valve body
460 threaded hex plug
461 valve slide
462 magnetically operated micro-switch
463 90 degree hose barb
464 inlet port/fresh fluid channel
465 seal
468 threaded top end
469 magnet
470 float shaft
471 threaded end
472 float
473 retainer nut
474 alignment groove
475 alignment pin
476 valve slide rim
478 threaded orifice
479 used fluid inlet port
480 fresh fluid delivery port
481 O'ring
482 female thread
483 valve bore
484 orifice 499 side port
585 O'ring
586 threaded orifice FIG. 7
100 fluid reservoir
101 fluid
102 filler neck
105 pump
109 pump outlet port
110 pressure conduit
114 fluid return conduit
115 hose end of fluid return conduit
116 reservoir return port
117 hose clamp
118 pulley
119 belt
120 ferrule
192 combination pump reservoir assembly
323 cap
325 power steering fluid exchanger
326 used fluid receiver
327 used fluid
328 fresh fluid reservoir
329 fresh fluid
331 vent
332 filler neck
333 cap
334 strainer
339 handle
340 skirt base
341 set of four footpads
342 ball valve
343 valve operating lever
345 ball valve
346 valve operating lever
354 used fluid exchange hose
355 small female quick connect
366 fresh fluid exchange hose
367 large female quick connect
472 float
786 port plug
787 ⅜" male tube adapter
788 small male quick connect
789 cap adapter
790 large male quick connect FIG. 8
117 hose clamp
786 port plug
787 ⅜" male tube adapter
788 small male quick connect
789 reservoir cap adapter
790 large male quick connect FIG. 9
117 hose clamp
200 fluid reservoir
206 reservoir outlet port
208 pump supply hose
215 hose end of fluid return conduit
216 reservoir return port
325 power steering fluid exchanger
326 used fluid receiver
327 used fluid
328 fresh fluid reservoir
329 fresh fluid
331 vent 332 filler neck
333 cap
334 strainer
339 handle
340 skirt base
341 set of four footpads
342 ball valve
343 valve operating lever
345 ball valve
346 valve operating lever
354 used fluid exchange hose
355 small female quick connect
366 fresh fluid exchange hose
367 large female quick connect
472 float
787 ⅜" male tube adapter
788 small male quick connect
790 large male quick connect
991 ⅝" male tube adapter FIG. 10
117 hose clamp
787 ⅜" male tube adapter
788 small male quick connect
790 large male quick connect
991 ⅝" male tube adapter FIG. 11
117 hose clamp
1000 fluid reservoir
1002 filler neck
1003 cap
1006 reservoir outlet port
1008 pump supply conduit
1015 hose end of fluid return conduit
1016 return port of reservoir FIG. 12
117 hose clamp
325 power steering fluid exchanger
786 port plug
787 ⅜" male tube adapter
788 small male quick connect
790 large male quick connect
1000 fluid reservoir
1002 filler neck
1006 reservoir outlet port
1008 pump supply conduit
1015 hose end
1016 reservoir return port
1185 cap adapter
1187 O'ring
1188 O'ring FIG. 13
117 hose clamp
1200 fluid reservoir
1202 filler neck
1203 cap
1205 pump
1209 pump outlet port
1210 pressure conduit
1215 hose end of fluid return conduit
1216 reservoir return port
1292 combination pump reservoir assembly
1293 O'ring
1294 cap retainer ring FIG. 14
117 hose clamp
786 port plug
787 ⅜" male tube adapter
788 small male quick connect
790 large male quick connect
1200 fluid reservoir
1202 filler neck
1203 cap
1209 pump outlet port
1210 pressure conduit
1215 hose end of fluid return conduit
1216 reservoir return port
1292 combination pump reservoir assembly
1294 cap retainer ring
1395 reservoir cap adapter
1396 O'ring
1397 O'ring FIG. 15
117 hose clamp
787 ⅜" male tube adapter
788 small male quick connect
790 large male quick connect
1200 fluid reservoir
1202 filler neck
1205 pump
1209 pump outlet port
1210 high pressure conduit
1215 hose end of fluid return conduit
1216 reservoir return port
1491 ⅜ hose
1292 combination pump reservoir assembly
1294 cap retainer ring
1495 suction tight cap
1496 O'ring
1497 O'ring
1498 ⅜ female hose adapter FIG. 16
117 hose clamp
326 used fluid receiver
327 used fluid
328 fresh fluid reservoir
329 fresh fluid
349 bottom common wall
350 check valve
354 used fluid exchange hose
366 fresh fluid exchange hose
460 threaded hex plug
462 magnetically operated micro switch
469 magnet
473 retainer nut
475 middle threaded alignment pin
481 O'ring
1500 fresh fluid delivery port
1501 threaded orifice
1502 fluid power port
1503 fluid vent
1504 lower threaded end
1521 float ball
1522 wire float cage
1523 fresh fluid supply port
1524 fresh fluid supply conduit
1525 power steering fluid exchanger
1548 used fluid inlet port
1554 used fluid conduit assembly
1557 fluid control valve
1559 valve body
1561 valve slide
1565 seal
1566 fresh fluid exchange conduit
1568 threaded top end
1570 float shaft
1571 upper threaded end
1572 float
1574 alignment groove
1576 rim
1577 O'ring gland
1578 threaded orifice
1579 used fluid outlet port
1580 fresh fluid inlet port
1582 female thread
1583 valve bore
1584 orifice
1586 threaded orifice
1599 fluid channel FIG. 17
117 hose clamp
326 used fluid receiver
327 used fluid
328 fresh fluid reservoir
329 fresh fluid
349 bottom common wall
350 check valve
354 used fluid exchange hose
366 fresh fluid exchange hose
460 threaded hex plug
462 magnetically operated micro switch
469 magnet
473 retainer nut
475 middle threaded alignment pin
481 O'ring
1500 fresh fluid delivery port
1501 threaded orifice
1502 fluid power inlet port
1503 fluid vent
1504 lower threaded end
1521 float ball
1522 wire float cage
1523 fresh fluid supply port
1524 fresh fluid supply conduit
1525 power steering fluid exchanger
1548 used fluid inlet port
1554 used fluid conduit assembly
1557 fluid control valve
1559 valve body
1561 valve slide
1565 seal
1566 fresh fluid exchange conduit
1568 threaded top end
1570 float shaft
1571 upper threaded end
1572 float
1574 alignment groove
1576 rim
1577 O'ring gland
1578 threaded orifice
1579 used fluid outlet port
1580 fresh fluid inlet port
1582 female thread
1583 valve bore
1584 orifice
1599 fluid channel FIG. 18
117 hose clamp
326 used fluid receiver
327 used fluid
328 fresh fluid reservoir
329 fresh fluid
349 bottom common wall
350 check valve
354 used fluid exchange hose
366 fresh fluid exchange hose
460 threaded hex plug
462 magnetically operated micro switch
469 magnet
473 retainer nut
475 middle threaded alignment pin
481 O'ring
1500 fresh fluid delivery port
1501 threaded orifice
1502 fluid power inlet port
1503 fluid vent
1504 lower threaded end
1521 float ball
1522 wire float cage
1523 fresh fluid supply port
1524 fresh fluid supply conduit
1525 power steering fluid exchanger
1548 used fluid inlet port
1554 used fluid conduit assembly
1557 fluid control valve
1559 valve body
1561 valve slide
1565 seal
1566 fresh fluid exchange conduit
1568 threaded top end
1570 float shaft
1571 upper threaded end
1572 float
1574 alignment groove
1576 rim
1577 O'ring gland
1578 threaded orifice
1579 used fluid outlet port
1580 fresh fluid inlet port
1582 female thread
1583 valve bore
1584 orifice
1586 threaded orifice
1599 fluid channel FIG. 19
117 hose clamp
326 used fluid receiver
327 used fluid
328 fresh fluid reservoir
329 fresh fluid
349 bottom common wall
354 used fluid exchange hose
361 fresh fluid exchange hose
460 threaded hex plug
462 magnetically operated micro-switch
469 magnet
473 retainer nut
475 alignment pin
481 O'ring
1504 lower threaded end
1521 float ball
1522 wire cage
1523 fresh fluid supply port
1565 seal
1570 float shaft
1571 upper threaded end
1572 float
1576 rim
1900 fresh fluid outlet port
1901 threaded orifice
1902 fluid power port
1903 fluid vent
1906 power port
1923 fresh fluid supply port
1924 fresh fluid supply conduit
1925 power steering fluid exchanger
1948 used fluid inlet port
1950 used fluid outlet port
1951 used fluid discharge port
1954 used fluid conduit
1955 used fluid conduit assembly
1956 fresh fluid conduit
1957 fluid control valve
1959 valve body
1961 valve slide
1968 threaded top end
1969 top small bore
1974 alignment groove
1977 O'ring gland
1978 threaded orifice
1980 fresh fluid inlet port
1982 female thread
1983 valve bore
1984 orifice
1986 threaded orifice
1998 side fluid channel
1999 cross fluid channel FIG. 20
117 hose clamp
326 used fluid receiver
327 used fluid
328 fresh fluid reservoir
329 fresh fluid
349 bottom common wall
354 used fluid exchange hose
361 fresh fluid exchange hose
460 threaded hex plug
462 magnetically operated micro-switch
469 magnet
473 retainer nut
475 alignment pin
481 O'ring
1504 lower threaded end
1521 float ball
1522 wire cage
1523 fresh fluid supply port
1565 seal
1570 float shaft
1571 upper threaded end
1572 float
1576 rim
1900 fresh fluid outlet port
1901 threaded orifice
1902 fluid power port
1903 fluid vent
1906 power port
1923 fresh fluid supply port
1924 fresh fluid supply conduit 1925 power steering fluid exchanger
1948 used fluid inlet port
1950 used fluid outlet port
1954 used fluid conduit
1955 used fluid conduit assembly
1956 fresh fluid conduit
1957 fluid control valve
1959 valve body
1961 valve slide
1968 threaded top end
1969 top small bore
1974 alignment groove
1977 O'ring gland
1978 threaded orifice
1980 fresh fluid inlet port
1982 female thread
1983 valve bore
1984 orifice
1986 threaded orifice
1998 side fluid channel
1999 cross fluid channel FIG. 21
117 hose clamp
326 used fluid receiver
327 used fluid
328 fresh fluid reservoir
329 fresh fluid
349 bottom common wall
350 check valve
354 used fluid exchange hose
361 fresh fluid exchange hose
460 threaded hex plug
473 retainer nut
475 alignment pin
481 O'ring
1504 lower threaded end
1521 float ball
1522 wire float cage
1523 fresh fluid supply port
1565 seal
1570 float shaft
1571 upper threaded end
1572 float
1576 rim
2101 threaded orifice
2103 fluid vent
2124 fresh fluid supply conduit
2125 power steering fluid exchanger
2148 used fluid inlet port
2154 used fluid conduit
2157 fluid control valve
2159 valve body
2161 valve slide
2168 threaded top end
2169 top small bore
2177 O'ring gland
2180 fresh fluid inlet port
2182 female thread
2183 valve bore
2199 fluid channel FIG. 22
177 hose clamp
326 used fluid receiver
327 used fluid
328 fresh fluid reservoir
329 fresh fluid 349 bottom common wall
350 check valve
354 used fluid exchange hose
361 fresh fluid exchange hose
1521 float ball
1522 wire cage
1523 fresh fluid supply port
2210 switched power lead
2211 pair of upper micro-switch leads
2212 pair of lower micro-switch leads
2225 power steering fluid exchanger
2251 flow switch
2254 used fluid conduit assembly
2255 buzzer
2256 fresh fluid conduit assembly
2257 2 position-2 way solenoid valve
2258 battery pack
2259 battery pack socket
2260 used fluid conduit
2261 inlet port
2262 outlet port
2269 pair of magnets
2270 relay base
2271 float
2272 float switch assembly
2273 float shaft
2274 LED
2275 relay assembly
2277 magnetic winding FIG. 23
117 hose clamp
326 used fluid receiver
327 used fluid
328 fresh fluid reservoir
329 fresh fluid
349 bottom common wall
350 check valve
354 used fluid exchange hose
361 fresh fluid exchange hose
2324 fresh fluid supply conduit
2353 fresh fluid supply port
2354 used fluid conduit assembly
2356 fresh fluid conduit
2357 2 position three-way solenoid valve
2361 inactivated inlet port
2362 common outlet port
2263 activated inlet port
2269 pair of magnets
2270 relay base
2275 relay assembly
2277 magnetic windings
2325 power steering fluid exchanger
2371 float
2372 float switch assembly
2373 float shaft FIG. 24
117 hose clamp
326 used fluid receiver
327 used fluid
328 fresh fluid reservoir
329 fresh fluid
349 bottom common wall
354 used fluid exchange hose
361 fresh fluid exchange hose
2251 flow switch
2255 buzzer 2269 pair of magnets
2270 relay base
2271 float
2272 float switch assembly
2273 float shaft
2274 LED
2275 relay
2277 magnetic windings
2356 fresh fluid conduit
2410 switched power terminal
2411 pair of upper micro-switch leads
2412 pair of lower micro-switch leads
2425 power steering fluid exchanger
2450 used fluid inlet port
2453 reservoir outlet port
2454 used fluid conduit
2455 used fluid conduit
2457 2 position 4 way solenoid valve
2458 power supply
2479 used fluid conduit
2480 fresh fluid supply conduit
2481 used fluid outlet port
2482 fresh fluid inlet port
2483 used fluid inlet port
2484 fresh fluid outlet port
2485 current
2486 neutral
2490 default inactivated mode
2491 activated mode FIG. 26
1905 hanger bracket
1906 bracket base
1907 hook FIG. 27
1909 adjustable hood support rod
1910 base rod section
1911 releasable latch
1913 top rod section
1914 bottom rod pad
1915 top rod pad
1916 nipple

We claim:

1. A method for exchanging a circulating fluid of a hydraulic system with a reservoir with a return port for receiving said fluid for pressure dissipation and a supply port for delivering said fluid after said pressure dissipation, a fluid pump providing negative pressure to said fluid to deliver said fluid into an inlet port while simultaneously providing positive pressure to said fluid to deliver said fluid through an outlet port, and a mechanism with a working port for receiving said fluid for actuation and a discharge port for discharging said fluid after said actuation, a supply conduit connecting said supply port to said inlet port, a working conduit connecting said outlet port to said working port, a return conduit connecting said discharge port to said return port, said method comprising steps of:
providing a fresh fluid reservoir
providing a used fluid receiver
providing a fresh fluid exchange conduit
providing a used fluid exchange conduit
providing an adequate supply of fresh fluid to the fresh fluid reservoir
emptying the used fluid receiver of used fluid
turning off the engine of the vehicle to render the power steering pump inoperative
connecting the fresh fluid exchange conduit to fluidly communicate with the supply conduit
connecting the used fluid exchange conduit to fluidly communicate with the return conduit
starting the engine of the vehicle to render the power steering pump operative
providing a fluid control valve which is controlled by a float which when placed in its first position connects the fresh fluid exchange conduit to the fresh fluid reservoir and connects the used fluid exchange conduit to the used fluid receiver, and when placed in its second position connects the used fluid exchange conduit to the fresh fluid exchange conduit while disconnecting the fresh fluid reservoir from the fresh fluid exchange conduit and disconnecting the used fluid receiver from the used fluid exchange conduit.

2. The method of claim 1 including the step of:
providing a float in the fresh fluid reservoir which is responsive to the level of fresh fluid in the fresh fluid reservoir and which directs the fluid control valve into its first position upon attainment an adequate supply of fresh fluid in the fresh fluid reservoir, and directs the fluid control valve into its second position upon depletion of the fresh fluid supply.

3. The method of claim 2, wherein the float is a mechanical float and is connected to the valve slide of the fluid control valve.

4. The method of claim 2, wherein the float is an electrical float switch, and the fluid control valve is actuated by an electrical solenoid, and the electrical float switch is connected to the solenoid of the fluid control valve.

5. The method of claim 1 including the step of:
providing a float in the used fluid receiver which is responsive to the level of used fluid in the used fluid reservoir which directs the fluid control valve, and directs the fluid control valve into its first position upon attainment an approximately empty used fluid receiver, and directs the fluid control valve into its second position upon the used fluid receiver attainment of an approximately full used fluid receiver.

6. The method of claim 5, wherein the float is a mechanical float and is connected to the valve slide of the fluid control valve.

7. The method of claim 5, wherein the float is an electrical float switch, and the fluid control valve is actuated by an electrical solenoid, and the electrical float switch is connected to the solenoid of the fluid control valve.

8. The method of claim 1 including the steps of:
disconnecting the return hose from the return port
providing a plug for the return port
installing the plug on the return port
removing the reservoir cap
topping off the reservoir with fluid
providing a reservoir cap adapter
installing the reservoir cap on the reservoir and connecting it to the fresh fluid exchange conduit to deliver fluid
providing a return conduit adapter
connecting the return conduit to the return conduit at on end and to the used fluid exchange conduit at the other end to receive fluid
removing the reservoir cap adapter
removing the plug from the return port
removing the adapter from the return conduit
reconnecting the return conduit to the return port
checking the level of fluid in the reservoir and adjusting upward or downward if necessary
replacing the reservoir cap.

9. The method of claim 1 including the steps of:
emptying the reservoir
disconnecting the return hose from the return port
disconnecting the supply conduit from the supply port
providing a return conduit adapter
connecting the return conduit adapter to the return conduit at one end and to the used fluid exchange conduit at the other end to receive fluid
providing a supply conduit adapter
connecting the supply conduit adapter to the supply conduit at one end and to the fresh fluid exchange conduit at the other end.

10. In an apparatus for exchanging a circulating fluid of a hydraulic system with a reservoir with a return port for receiving said fluid for pressure dissipation and a supply port for delivering said fluid after said pressure dissipation, a fluid pump providing negative pressure to said fluid to deliver said fluid into an inlet port while simultaneously providing positive pressure to said fluid to deliver said fluid through an outlet port, and a mechanism with a working port for receiving said fluid for actuation and a discharge port for discharging said fluid after said actuation, a supply conduit connecting said supply port to said inlet port, a working conduit connecting said outlet port to said working port, a return conduit connecting said discharge port to said return port, said apparatus comprising:
   a fresh fluid reservoir
   a used fluid receiver
   a fresh fluid exchange conduit
   a used fluid exchange conduit
   a fluid control valve which has a first position and a second position with the first position connecting the used fluid exchange conduit to the used fluid receiver and with the
   second position connecting the used fluid exchange conduit to the fresh fluid
   exchange conduit while disconnecting the fresh fluid reservoir from the fresh fluid
   exchange conduit and disconnecting the used fluid receiver from the used fluid
   exchange conduit
   a float which directs the fluid control valve from its first position to its second position and from its second position to its first position.

11. The apparatus of claim 10, wherein the float is placed in the fresh fluid reservoir and is responsive to the level of fresh fluid in the fresh fluid reservoir and which directs the fluid control valve into its first position upon attainment an adequate supply of fresh fluid in the fresh fluid reservoir, and directs the fluid control valve into its second position upon depletion of the fresh fluid supply.

12. The apparatus of claim 1, wherein the float is a mechanical float and the fluid control valve has a valve slide by which it is operated and the float is attached to the valve slide.

13. The apparatus of claim 1, wherein the float is an electrical float switch and the fluid control valve is operated by an electric solenoid, and the float switch is wired to the electric solenoid.

* * * * *